US008655689B1

(12) United States Patent
Gareis

(10) Patent No.: US 8,655,689 B1
(45) Date of Patent: Feb. 18, 2014

(54) SYSTEM, METHOD AND PROGRAM PRODUCT FOR MODELING FUND MOVEMENTS

(71) Applicant: Island Intellectual Property LLC, Manhasset, NY (US)

(72) Inventor: David Edgar Gareis, Maplewood, NJ (US)

(73) Assignee: Island Intellectual Property LLC, Manhasset, NY (US)

( * ) Notice: Subject to any disclaimer, the term of this patent is extended or adjusted under 35 U.S.C. 154(b) by 0 days.

(21) Appl. No.: 13/650,927

(22) Filed: Oct. 12, 2012

Related U.S. Application Data

(60) Provisional application No. 61/546,730, filed on Oct. 13, 2011.

(51) Int. Cl.
*G06Q 40/00* (2012.01)
*G06Q 40/08* (2012.01)

(52) U.S. Cl.
CPC ..................... *G06Q 40/08* (2013.01)
USPC ........ 705/4; 705/30; 705/34; 705/40; 705/41; 705/42; 705/45; 235/379; 235/380; 235/385; 235/437; 235/470; 713/186

(58) Field of Classification Search
USPC .......... 705/30, 34, 40, 41, 42, 45, 4; 235/379, 235/380, 385, 437, 470; 713/186; 726/27; 709/227
See application file for complete search history.

(56) References Cited

U.S. PATENT DOCUMENTS

| | | | |
|---|---|---|---|
| 4,232,367 A | 11/1980 | Youden et al. | |
| 4,346,442 A | 8/1982 | Musmanno | |
| 4,376,978 A | 3/1983 | Musmanno | |
| 4,597,046 A | 6/1986 | Musmanno et al. | |
| 4,674,044 A | 6/1987 | Kalmus et al. | |
| 4,694,397 A | 9/1987 | Grant et al. | |
| 4,700,297 A | 10/1987 | Hagel et al. | |
| 4,751,640 A | 6/1988 | Lucas et al. | |
| 4,774,663 A | 9/1988 | Musmanno et al. | |

(Continued)

FOREIGN PATENT DOCUMENTS

| | | |
|---|---|---|
| JP | 10-049590 A | 2/1998 |
| WO | WO-95/23379 A1 | 8/1995 |

(Continued)

OTHER PUBLICATIONS

U.S. Appl. No. 12/453,387, filed May 8, 2009, Bruce Bent et al.

(Continued)

*Primary Examiner* — Tien Nguyen
(74) *Attorney, Agent, or Firm* — Foley & Lardner LLP

(57) ABSTRACT

A method, system and program product, the method comprising accessing, databases, comprising: aggregated account information for FDIC accounts; client account information for each of the respective client accounts, wherein the client account represents funds of the respective client held in the one or more aggregated deposit accounts holding funds of the respective client, the client account information; capacity caps; and obtaining, high, second and lowest stratification balances held in respective depository institutions; calculating for depository institutions a respective total balance in the program; calculating respective excess capacities for respective depository institutions; modifying, parameters selected from the group of a number of client accounts, additional client account funds, a total number of the depository institutions participating in the program, and the capacity caps for one or more of the depository institutions.

19 Claims, 8 Drawing Sheets

(56) References Cited

U.S. PATENT DOCUMENTS

| | | |
|---|---|---|
| 4,953,085 A | 8/1990 | Atkins |
| 4,985,833 A | 1/1991 | Oncken |
| 5,126,936 A | 6/1992 | Champion et al. |
| 5,206,803 A | 4/1993 | Vitagliano et al. |
| 5,220,501 A | 6/1993 | Lawlor et al. |
| 5,235,507 A | 8/1993 | Sackler et al. |
| 5,262,942 A | 11/1993 | Earle |
| 5,270,922 A | 12/1993 | Higgins |
| 5,291,398 A | 3/1994 | Hagan |
| 5,297,032 A | 3/1994 | Trojan et al. |
| 5,424,938 A | 6/1995 | Wagner et al. |
| 5,631,828 A | 5/1997 | Hagan |
| 5,644,727 A | 7/1997 | Atkins |
| 5,649,116 A | 7/1997 | McCoy et al. |
| 5,671,363 A | 9/1997 | Cristofich et al. |
| 5,689,650 A | 11/1997 | McClelland et al. |
| 5,710,889 A | 1/1998 | Clark et al. |
| 5,765,144 A | 6/1998 | Larche et al. |
| 5,774,880 A | 6/1998 | Ginsberg |
| 5,781,654 A | 7/1998 | Carney |
| 5,802,499 A | 9/1998 | Sampson et al. |
| 5,806,048 A | 9/1998 | Kiron et al. |
| 5,806,049 A | 9/1998 | Petruzzi |
| 5,812,987 A | 9/1998 | Luskin et al. |
| 5,826,243 A | 10/1998 | Musmanno et al. |
| 5,848,400 A | 12/1998 | Chang |
| 5,852,811 A | 12/1998 | Atkins |
| 5,864,685 A | 1/1999 | Hagan |
| 5,875,437 A | 2/1999 | Atkins |
| 5,878,258 A | 3/1999 | Pizi et al. |
| 5,878,405 A | 3/1999 | Grant et al. |
| 5,884,285 A | 3/1999 | Atkins |
| 5,890,141 A | 3/1999 | Carney et al. |
| 5,893,078 A | 4/1999 | Paulson |
| 5,903,881 A | 5/1999 | Schrader et al. |
| 5,905,974 A | 5/1999 | Fraser et al. |
| 5,940,809 A | 8/1999 | Musmanno et al. |
| 5,941,996 A | 8/1999 | Smith et al. |
| 5,946,667 A | 8/1999 | Tull et al. |
| 5,950,175 A | 9/1999 | Austin |
| 5,974,390 A | 10/1999 | Ross |
| 5,978,779 A | 11/1999 | Stein et al. |
| 6,014,642 A | 1/2000 | El-Kadi et al. |
| 6,016,482 A | 1/2000 | Molinari et al. |
| 6,026,438 A | 2/2000 | Piazza et al. |
| 6,032,133 A | 2/2000 | Hilt et al. |
| 6,041,314 A * | 3/2000 | Davis ................. 705/41 |
| 6,044,371 A * | 3/2000 | Person et al. ............. 1/1 |
| 6,047,324 A * | 4/2000 | Ford et al. ............ 709/227 |
| 6,049,782 A | 4/2000 | Gottesman et al. |
| 6,052,673 A | 4/2000 | Leon et al. |
| 6,088,685 A | 7/2000 | Kiron et al. |
| 6,092,056 A | 7/2000 | Tull et al. |
| 6,105,005 A | 8/2000 | Fuhrer |
| 6,108,641 A | 8/2000 | Kenna et al. |
| 6,112,191 A | 8/2000 | Burke |
| 6,119,093 A | 9/2000 | Walker et al. |
| 6,131,810 A | 10/2000 | Weiss et al. |
| 6,154,770 A | 11/2000 | Kostakos |
| 6,189,785 B1 | 2/2001 | Lowery |
| 6,192,347 B1 | 2/2001 | Graff |
| 6,226,623 B1 | 5/2001 | Schein et al. |
| 6,317,783 B1 | 11/2001 | Freishtat et al. |
| 6,324,523 B1 | 11/2001 | Killeen et al. |
| 6,363,360 B1 | 3/2002 | Madden |
| 6,374,231 B1 | 4/2002 | Bent et al. |
| 6,408,336 B1 | 6/2002 | Schneider et al. |
| 6,513,020 B1 | 1/2003 | Weiss et al. |
| 6,970,843 B1 | 11/2005 | Forte |
| 7,089,202 B1 | 8/2006 | McNamar et al. |
| 7,103,556 B2 | 9/2006 | Del Rey et al. |
| 7,124,101 B1 | 10/2006 | Mikurak |
| 7,133,840 B1 | 11/2006 | Kenna et al. |
| 7,203,845 B2 | 4/2007 | Sokolic et al. |
| 7,206,761 B2 | 4/2007 | Colvin |
| 7,216,100 B2 | 5/2007 | Elliott |
| 7,321,874 B2 | 1/2008 | Dilip et al. |
| 7,321,875 B2 | 1/2008 | Dilip et al. |
| 7,328,179 B2 | 2/2008 | Sheehan et al. |
| 7,376,606 B2 | 5/2008 | Jacobsen |
| 7,383,223 B1 | 6/2008 | Dilip et al. |
| 7,383,227 B2 | 6/2008 | Weinflash et al. |
| 7,392,222 B1 | 6/2008 | Hamilton et al. |
| 7,401,037 B2 * | 7/2008 | Arena et al. .............. 705/35 |
| 7,440,914 B2 | 10/2008 | Jacobsen |
| 7,505,937 B2 | 3/2009 | Dilip et al. |
| 7,509,286 B1 | 3/2009 | Bent et al. |
| 7,519,551 B2 | 4/2009 | Bent et al. |
| 7,529,709 B2 * | 5/2009 | Volchek et al. ........... 705/38 |
| 7,536,340 B2 | 5/2009 | Dheer et al. |
| 7,536,350 B1 | 5/2009 | Bent et al. |
| 7,596,522 B1 | 9/2009 | Jacobsen |
| 7,603,307 B2 | 10/2009 | Jacobsen |
| 7,640,199 B1 * | 12/2009 | Hyland ................... 705/35 |
| 7,657,761 B2 | 2/2010 | Sokolic et al. |
| 7,668,771 B1 | 2/2010 | Bent et al. |
| 7,668,772 B1 | 2/2010 | Bent et al. |
| 7,672,886 B2 | 3/2010 | Bent et al. |
| 7,672,901 B1 | 3/2010 | Bent et al. |
| 7,672,902 B1 | 3/2010 | Bent et al. |
| 7,680,716 B1 | 3/2010 | Bent et al. |
| 7,680,734 B1 | 3/2010 | Bent et al. |
| 7,716,131 B2 | 5/2010 | Bent et al. |
| 7,720,755 B1 | 5/2010 | Coyle |
| 7,729,987 B1 | 6/2010 | Wakim et al. |
| 7,752,107 B1 | 7/2010 | Bent et al. |
| 7,752,129 B2 | 7/2010 | Bent et al. |
| 7,756,767 B2 | 7/2010 | Cluse et al. |
| 7,769,688 B1 | 8/2010 | Bent et al. |
| 7,788,235 B1 | 8/2010 | Yeo |
| 7,797,207 B1 | 9/2010 | Dilip et al. |
| 7,809,640 B1 | 10/2010 | Bent et al. |
| 7,814,017 B2 | 10/2010 | Vancini et al. |
| 7,837,100 B2 | 11/2010 | Bonalle et al. |
| 7,849,003 B2 | 12/2010 | Egnatios et al. |
| 7,860,771 B2 | 12/2010 | Colvin |
| 7,873,571 B1 | 1/2011 | Wehmer |
| 7,873,573 B2 | 1/2011 | Realini |
| 7,873,677 B2 | 1/2011 | Messing et al. |
| 7,886,969 B2 | 2/2011 | Antoo et al. |
| 7,895,098 B2 | 2/2011 | Beard |
| 7,895,099 B2 | 2/2011 | Whiting et al. |
| 7,899,743 B2 | 3/2011 | Jacobsen |
| 7,899,745 B1 | 3/2011 | Jacobsen |
| 7,899,746 B1 | 3/2011 | Jacobsen |
| 7,899,747 B1 | 3/2011 | Jacobsen |
| 7,904,372 B2 | 3/2011 | Whiting et al. |
| 7,917,433 B2 | 3/2011 | Jacobsen |
| 7,921,057 B1 | 4/2011 | Jacobsen |
| 7,933,821 B1 | 4/2011 | Bent et al. |
| 7,945,511 B2 | 5/2011 | O'Brien et al. |
| 7,996,308 B1 | 8/2011 | Bent et al. |
| 8,015,085 B2 | 9/2011 | Blagg et al. |
| 8,019,667 B1 | 9/2011 | Bent et al. |
| 8,019,668 B1 | 9/2011 | Bent et al. |
| 8,032,456 B1 | 10/2011 | Bent et al. |
| 8,036,986 B2 | 10/2011 | Jacobsen |
| 8,051,004 B2 | 11/2011 | Jacobsen |
| 8,051,005 B2 | 11/2011 | Jacobsen |
| 8,086,508 B2 | 12/2011 | Dheer et al. |
| 8,090,651 B2 | 1/2012 | Winslow et al. |
| 8,103,582 B1 | 1/2012 | Zettner |
| RE43,246 E | 3/2012 | Bent et al. |
| 8,150,766 B1 | 4/2012 | Bent et al. |
| 8,191,156 B2 | 5/2012 | Kubo |
| 8,234,188 B1 * | 7/2012 | Phillips et al. .......... 705/30 |
| 8,239,321 B1 | 8/2012 | Bent et al. |
| 8,260,697 B1 | 9/2012 | Bent et al. |
| 8,260,705 B1 | 9/2012 | Bent et al. |
| 8,290,859 B1 | 10/2012 | Bent et al. |
| 8,290,860 B1 | 10/2012 | Bent et al. |
| 8,290,861 B1 | 10/2012 | Bent et al. |
| 8,311,916 B1 | 11/2012 | Bent et al. |
| 8,311,939 B1 | 11/2012 | Bent et al. |

(56) References Cited

U.S. PATENT DOCUMENTS

| | | | |
|---|---|---|---|
| 8,352,342 B1 | 1/2013 | Bent et al. | |
| 8,355,985 B1 | 1/2013 | Bent et al. | |
| 8,359,267 B1 | 1/2013 | Bent et al. | |
| 8,370,236 B1 | 2/2013 | Bent | |
| 8,380,621 B1 | 2/2013 | Bent et al. | |
| 8,386,382 B1 | 2/2013 | Bent | |
| 8,386,383 B1 | 2/2013 | Bent | |
| 8,401,962 B1 | 3/2013 | Bent | |
| 8,452,702 B1 | 5/2013 | O'Donnell | |
| 8,458,089 B1 | 6/2013 | Gareis | |
| 2001/0023414 A1 | 9/2001 | Kumar et al. | |
| 2001/0032182 A1 | 10/2001 | Kumar et al. | |
| 2002/0007330 A1 | 1/2002 | Kumar et al. | |
| 2002/0046144 A1 | 4/2002 | Graff | |
| 2002/0069147 A1 | 6/2002 | Sheehan et al. | |
| 2002/0082981 A1 | 6/2002 | Madden | |
| 2002/0087454 A1 | 7/2002 | Calo et al. | |
| 2002/0091637 A1 | 7/2002 | Bent | |
| 2002/0095592 A1 | 7/2002 | Daniell et al. | |
| 2002/0128951 A1 | 9/2002 | Kiron et al. | |
| 2002/0161707 A1 | 10/2002 | Cole et al. | |
| 2002/0165757 A1 | 11/2002 | Lisser | |
| 2002/0174048 A1 | 11/2002 | Dheer et al. | |
| 2002/0178098 A1 | 11/2002 | Beard | |
| 2002/0194099 A1 | 12/2002 | Weiss | |
| 2003/0023529 A1 | 1/2003 | Jacobsen | |
| 2003/0041003 A1* | 2/2003 | Kayser, III | 705/37 |
| 2003/0065642 A1 | 4/2003 | Zee | |
| 2003/0080185 A1 | 5/2003 | Werther | |
| 2003/0135437 A1 | 7/2003 | Jacobsen | |
| 2003/0149646 A1 | 8/2003 | Chen et al. | |
| 2003/0163403 A1 | 8/2003 | Chen et al. | |
| 2003/0177092 A1 | 9/2003 | Paglin | |
| 2003/0191702 A1 | 10/2003 | Hurley | |
| 2003/0200174 A1 | 10/2003 | Star | |
| 2003/0208438 A1 | 11/2003 | Rothman | |
| 2003/0236728 A1 | 12/2003 | Sunderji et al. | |
| 2004/0039674 A1 | 2/2004 | Coloma | |
| 2004/0107157 A1 | 6/2004 | Bleunven et al. | |
| 2004/0111361 A1 | 6/2004 | Griffiths et al. | |
| 2004/0128229 A1 | 7/2004 | Raines et al. | |
| 2004/0128235 A1 | 7/2004 | Kemper et al. | |
| 2004/0138974 A1 | 7/2004 | Shimamura et al. | |
| 2004/0153398 A1 | 8/2004 | Baumgartner et al. | |
| 2004/0162773 A1 | 8/2004 | Del Rey et al. | |
| 2004/0177036 A1 | 9/2004 | Nutahara et al. | |
| 2004/0249741 A1 | 12/2004 | Understein | |
| 2005/0044035 A1 | 2/2005 | Scott | |
| 2005/0044038 A1 | 2/2005 | Whiting et al. | |
| 2005/0091137 A1 | 4/2005 | Woeber | |
| 2005/0102225 A1 | 5/2005 | Oppenheimer et al. | |
| 2005/0102226 A1 | 5/2005 | Oppenheimer et al. | |
| 2005/0108120 A1 | 5/2005 | Malka et al. | |
| 2005/0108149 A1 | 5/2005 | Bent et al. | |
| 2005/0114246 A1 | 5/2005 | Coloma | |
| 2005/0154662 A1 | 7/2005 | Langenwalter | |
| 2005/0228733 A1 | 10/2005 | Bent et al. | |
| 2006/0004655 A1 | 1/2006 | Alexander et al. | |
| 2006/0047593 A1 | 3/2006 | Naratil et al. | |
| 2006/0106703 A1 | 5/2006 | Del Rey et al. | |
| 2006/0155644 A1 | 7/2006 | Reid et al. | |
| 2006/0167773 A1 | 7/2006 | Yang et al. | |
| 2006/0212385 A2 | 9/2006 | Bent et al. | |
| 2006/0212389 A2 | 9/2006 | Bent et al. | |
| 2006/0213980 A1 | 9/2006 | Geller et al. | |
| 2006/0273152 A1 | 12/2006 | Fields | |
| 2006/0282356 A1 | 12/2006 | Andres et al. | |
| 2007/0043666 A1 | 2/2007 | Burdette | |
| 2007/0083938 A1 | 4/2007 | Aoki et al. | |
| 2007/0118449 A1 | 5/2007 | De La Motte | |
| 2007/0130065 A1 | 6/2007 | Staab et al. | |
| 2007/0143196 A1 | 6/2007 | Colvin | |
| 2007/0255655 A1 | 11/2007 | Kemper et al. | |
| 2007/0271174 A2 | 11/2007 | Bent et al. | |
| 2007/0276752 A1 | 11/2007 | Whiting et al. | |
| 2007/0288400 A1 | 12/2007 | Menon | |
| 2008/0015985 A1 | 1/2008 | Abhari et al. | |
| 2008/0046358 A1* | 2/2008 | Holm-Blagg et al. | 705/39 |
| 2008/0065532 A1 | 3/2008 | De La Motte | |
| 2008/0077996 A1* | 3/2008 | Kubo | 726/27 |
| 2008/0097899 A1 | 4/2008 | Jackson et al. | |
| 2008/0120228 A1 | 5/2008 | Bent et al. | |
| 2008/0133280 A1 | 6/2008 | Ziegler | |
| 2008/0133396 A1 | 6/2008 | De La Motte | |
| 2008/0195534 A1 | 8/2008 | Landis et al. | |
| 2008/0222053 A1 | 9/2008 | Jacobsen | |
| 2008/0288398 A1 | 11/2008 | Maricondi | |
| 2009/0006985 A1 | 1/2009 | Fong et al. | |
| 2009/0012899 A1 | 1/2009 | Friesen | |
| 2009/0024496 A1* | 1/2009 | Balachandran et al. | 705/34 |
| 2009/0138412 A1 | 5/2009 | Jacobsen | |
| 2009/0241197 A1 | 9/2009 | Troyansky | |
| 2009/0327154 A1 | 12/2009 | Van Vooren et al. | |
| 2010/0268668 A1 | 10/2010 | Burdette | |
| 2010/0274687 A1 | 10/2010 | Ghosh et al. | |
| 2010/0274718 A1 | 10/2010 | Ghosh et al. | |
| 2011/0106703 A1 | 5/2011 | Jay et al. | |
| 2011/0208640 A1 | 8/2011 | Geoghegan et al. | |
| 2011/0246359 A1 | 10/2011 | O'Brien et al. | |
| 2011/0270720 A1 | 11/2011 | Manohar | |
| 2011/0276473 A1 | 11/2011 | Blok | |
| 2012/0078750 A1 | 3/2012 | Watkins | |
| 2013/0054429 A1* | 2/2013 | Minor et al. | 705/30 |

FOREIGN PATENT DOCUMENTS

| | | |
|---|---|---|
| WO | WO-99/18529 A1 | 4/1999 |
| WO | WO-02/42952 A1 | 5/2002 |
| WO | WO-03/012580 A2 | 2/2003 |
| WO | WO-2005/006111 A2 | 1/2005 |

OTHER PUBLICATIONS

U.S. Appl. No. 12/453,388, filed May 8, 2009, Bruce Bent et al.
U.S. Appl. No. 12/622,979, filed Nov. 20, 2009, Bruce Bent et al.
U.S. Appl. No. 12/622,979, filed Nov. 20, 2009, Bruce Bent.
U.S. Appl. No. 12/638,544, filed Dec. 15, 2009, Bruce Bent.
U.S. Appl. No. 12/794,448, filed Jun. 4, 2010, Bruce Bent et al.
U.S. Appl. No. 12/794,448, filed Jun. 4, 2010, Bruce Bent.
U.S. Appl. No. 12/794,545, filed Jun. 4, 2010, Bruce Bent et al.
U.S. Appl. No. 12/829,961, filed Jul. 2, 2010, Bruce Bent, et al.
U.S. Appl. No. 13/032,456, filed Feb. 22, 2011, David Edgar Gareis.
U.S. Appl. No. 13/032,467, filed Feb. 22, 2011, Thomas O'Donnell.
U.S. Appl. No. 13/228,031, filed Sep. 8, 2011, Thomas O'Donnell.
U.S. Appl. No. 13/237,699, filed Sep. 20, 2011, Bruce Bent.
U.S. Appl. No. 13/248,647, filed Sep. 29, 2011, Bruce Bent.
U.S. Appl. No. 13/529,540, filed Jun. 21, 2012, Bruce Bent.
U.S. Appl. No. 13/562,961, filed Jul. 31, 2012, Bruce Bent.
U.S. Appl. No. 13/591,793, filed Aug. 22, 2012, Bruce Bent.
U.S. Appl. No. 13/591,818, filed Aug. 22, 2012, Bruce Bent.
U.S. Appl. No. 13/650,927, filed Oct. 12, 2012, David Edgar Gareis.
U.S. Appl. No. 13/651,932, filed Oct. 15, 2012, Bruce Bent.
U.S. Appl. No. 13/710,999, filed Dec. 11, 2012, Bruce Bent II.
U.S. Appl. No. 13/715,370, filed Dec. 14, 2012, Bruce Bent.
U.S. Appl. No. 13/733,645, filed Jan. 3, 2013, Bent.
U.S. Appl. No. 13/735,631, filed Jan. 7, 2013, Bent.
U.S. Appl. No. 13/736,515, filed Jan. 8, 2013, Bent.
U.S. Appl. No. 13/759,434, filed Feb. 5, 2013, Bent.
U.S. Appl. No. 13/801,501, filed Mar. 13, 2013, Bent.
U.S. Appl. No. 13/801,874, filed Mar. 13, 2013, Bent.
U.S. Appl. No. 13/828,468, filed Mar. 14, 2013, Gareis.
U.S. Appl. No. 13/828,929, filed Mar. 14, 2013, Gareis.
U.S. Appl. No. 13/829,309, filed Mar. 14, 2013, O'Donnell.
U.S. Appl. No. 13/829,747, filed Mar. 14, 2013, O'Donnell.
U.S. Appl. No. 13/829,974, filed Mar. 14, 2013, Bent.
U.S. Appl. No. 13/830,143, filed Mar. 14, 2013, Bent.
U.S. Appl. No. 13/839,890, filed Mar. 15, 2013, Bent.
U.S. Appl. No. 13/840,685, filed Mar. 15, 2013, Bent.
U.S. Appl. No. 13/841,778, filed Mar. 15, 2013, Bent.
U.S. Appl. No. 13/842,360, filed Mar. 15, 2013, Bent.
U.S. Appl. No. 13/842,630, filed Mar. 15, 2013, Bent.

(56) References Cited

OTHER PUBLICATIONS

"Bank of Oak Ridge to Offer FDIC Insurance on up to $1.5 Million," Dialog Web Command Mode, 2 Sheets, Sep. 25, 2003, http://www.dialogweb.com/cgi/dwclient.

"Man Bites Dog: Funds Move Into Banking," IBC's Money Fund Selector, 2 Sheets, Nov. 6, 1998.

"Reverse Ups Insurance Limit on Money Market Account," Thomson Financial Inc., Mutual Fund Market News, 1 Sheet, Aug. 26, 2002.

"The Bank of New York adds a $300,000 FDIC-Insured Money Market Account Option to its Dividend Income Checking Account," PR Newswire Associations, Inc., PR Newswire, 2 Sheets, Apr. 18, 2002.

"The Reverse Funds to Offer up to $600,000 of FDIC Insurance on Reserve Insured Deposits; Addressing Investor Needs for Increased Safety, Flexibility and a Competitive Yield," Business Wire, Inc. Business Wire, 2 Sheets, Aug. 13, 2002.

12 CFR Part 329—Interest on Deposit, Source: 51 FR 10808, Mar. 31, 1986, 5 Sheets.

AB 2011 Assembly Bill—Bill Analysis, Senate Amendments, http://www.leginfo.ca.gov/pub/bill/asm/ab_2001-2050/ab_2011_cfa_20060811_161755_asm_floor.html, 2006, pp. 1-3.

AB 2011 Assembly Bill—Bill Analysis, Senate Rules Committee, Third Reading, http://www.leginfo.ca.gov/pub/bill/asm/ab_2001-2050/ab2011_cfa_20060705_161454_sen_floor.html, 2006, pp. 1-7.

AB 2011 Assembly Bill—Chaptered, http://www.leginfo.ca.gov/pub/bill/asm/ab_2001-2050/ab_2011_bill_20060925_chaptered.html, 2006, pp. 1-3.

AB 2011 Assembly Bill—Enrolled, http://www.leginfo.ca.gov/pub/bill/asm/ab_2001-2050/ab_2011_bill_20060816_enrolled.html, 2006, pp. 1-3.

AB 2011 Assembly Bill—History, Complete Bill History, http://www.leginfo.ca.gov/pub/bill/asm/ab_2001-2050/ab_2011_bill_20060925_history.html, 2006, p. 1.

About iMoneyNet, Inc., About iMoneyNet's Money Funds Division, 4 Sheets, Aug. 21, 2003, http://www.ibcdata.com/about.htm.

Adler, Joe, "Promontory to Roll Out Deposit Service Insuring Liquid Funds", American Banker, Feb. 22, 2010, 1 sheet.

An iMoneyNet Special Report, Brokerage Cash Sweep Options: The Shift from Money Funds to FDIC-Insured Bank Deposit Accounts, by Peter G. Crane & Michael F. Krasner, iMoneyNet, Nov. 2004, 66 pages.

Anderson et al. "Retail Sweep Programs and Bank Reserves," Federal Reserve Bank of St. Louis Review, Bell & Howell Information and Learning Company, vol. 83, Issue 1, 24 Sheets, Jan. 1, 2001.

Announcing Changes in Automatic "Sweep" Investment Options, LPL Financial Services, Linsco/Private Ledger, Member NASD/SIPC, 26 Sheets.

Bank Deposit Program, Online http://web.archive.org/web/20030620100115/http:/www.smithbarney.com/products_servi, Jan. 19, 2001, 4 Sheets.

Bent, "Bruce Bent Makes Money Market Funds Act Like Bank Accounts," Equity BBDP, Oct. 5, 1998, 3 Sheets.

Blackwell, "ABA to Approve System for Sharing Deposit Coverage," American Banker, 2 Sheets, Feb. 11, 2003.

Blackwell, "New Pitch: Deposit Insurance Sharing," American Banker Online, 4 Sheets, Jan. 21, 2003.

Board of Governors of the Federal Reserve System, 1984 Fed. Res. Interp. Ltr. LEXIS 56, Nov. 16, 1984, 3 Sheets.

Board of Governors of the Federal Reserve System, 1988 Fed. Res. Interp. Ltr. LEXIS 141, Jun. 22, 1988, 3 Sheets.

Board of Governors of the Federal Reserve System, 1989 Fed. Res. Interp. Ltr. LEXIS 154, Jun. 21, 1989, 2 Sheets.

Board of Governors of the Federal Reserve System, 1989 Fed. Res. Interp. Ltr. LEXIS 77, Mar. 14, 1989, 2 Sheets.

Board of Governors of the Federal Reserve System, 1990 Fed. Res. Interp. Ltr. LEXIS 94, Feb. 1, 1990, 1 Sheet.

Board of Governors of the Federal Reserve System, 1991 Fed. Res. Interp. Ltr. LEXIS 232, Jan. 30, 1991, 2 Sheets.

Board of Governors of the Federal Reserve System, 1994 Fed. Res. Interp. Ltr. LEXIS 156, Jun. 24, 1994, 3 Sheets.

Board of Governors of the Federal Reserve System, 1994 Fed. Res. Interp. Ltr. LEXIS 314, Oct. 17, 1994, 2 Sheets.

Board of Governors of the Federal Reserve System, 1994 Fed. Res. Interp. Ltr. LEXIS 419, Oct. 14, 1994, 4 Sheets.

Britt, "Struggling with Sweep Accounts," America's Community Banker, vol. 6, No. 12, 11 Sheets, Dec. 1, 1997.

California Independent Bankers, ICBA Independent Community Bankers of America, Banker Bulletin, 2006, CIB 16th Annual Convention, vol. 4, issue 6, http://www.cib.org/banker_bulletin.htm.

Campbell, Andrew, et al.; A new standard for deposit insurance and government guarantees after the crisis; Journal of Financial Regulation and Compliance, vol. 17 No. 3, 2009; pp. 210-239.

Capital Briefs: Corporate Checking Account Relief Sought, American Banker, vol. 162, Jul. 28, 1997, 1 Sheet.

Certificate of Deposit Registry Service: Keeping Deposits in the Corn Patch, Banknews, 2 Sheets. Mar. 2003.

Chapelle et al. "Peering Into Tomorrow: At the Threshold of a New Century, Brokers and Others Discuss Where They were Going," Securities Data Publishing on Wall Street, 6 Sheets, Dec. 1, 1999.

Chapelle, "Merrill's Rivals Say They, Too. Offer Services Beyond Banking," Securities Data Publishing on Wall Street, 2 Sheets, Feb. 1, 2003.

CMA, Insured Savings Account Fact Sheet, Merrill Lynch, Pierce, Fenner & Smith Incorporated, 1997, pp. 49-57.

CMA, Insured Savings Account Fact Sheet, Merrill Lynch, Pierce, Fenner & Smith Incorporated, Jul. 1994, pp. 47-54.

CMA, The Investor Credit Line Service, Cost-Effective Financing for the '90s, Merrill Lynch, Pierce, Fenner & Smith Incorporated, 1997, pp. 36-46.

CMA, The Merrill Lynch Cash Management Account Financial Service, Insured Savings Account Participating Depository Institutions, Merrill Lynch, Pierce, Fenner & Smith Incorporated, Mar. 1995, 2 Sheets.

CMA, The Merrill Lynch Cash Management Account Financial Service, Insured Savings Account Participating Depository Institutions, Merrill Lynch, Pierce, Fenner & Smith Incorporated, Nov. 1992, 2 Sheets.

CMA, The Merrill Lynch Cash Management Account Financial Service, Merrill Lynch, Pierce, Fenner & Smith Incorporated, Jan. 1997, 35 Sheets.

Litigation Notice After Payment of Issue Fee filed in Parent U.S. Appl. No. 10/382,946, Apr. 3, 2009, 160 pages.

Coyle, "A Look at commercial Demand Deposit Options," America's Community Banker, vol. 9, Issue 2, Bell & Howell Information and Learning Company, 9 Sheets, Feb. 1, 2000.

Crockett, "Big Banks Found Stepping Up Marketing of 'Sweep' Accounts," American Banker, vol. 159, No. 198, American Banker Inc., 3 Sheets, Oct. 13, 1994.

Cynamon et al.; Redefining the Monetary Aggregates: A Clean Sweep; Eastern Economic Journal, vol. 32, No. 4, Fall 2006; pp. 661-672.

Declaration of Mr. Bruce Bent II, Vice Chairman and Registrant of Applicant on the date of first commercial use of the service providing interest and FDIC insurance for checking accounts by means of a system using money market deposit accounts (MMDA's) of Oct. 23, 1997.

Declaration of Mr. Bruce Bent II, Vice Chairman and Registrant of Applicant. (3 Sheets) and Exhibits A, B, C and D; Feb. 27, 2007 (6 Sheets).

Deposit Growth Strategies for Financial Institutions, New Sweep Account Helps Retain $40 Million in Business Deposits, vol. 7, No. 12, The Reserve Funds, May 2001, 1 Sheet.

Deutsche Bank Insured Deposit Program, Marketing Literature 2007, 3 pages.

DI 48, Excerpts of Transcript of Hearing, U.S. Dist. Ct., District of Delaware, Civil Action No. 82-680, Apr. 8, 1983, 5 sheets.

DI 56, Interrog. Response, U.S. Dist. Ct. District of Delaware, Civil Action No. 82-680, May 20, 1983, 15 Sheets.

DI 99, Suppl. Interrogatory Response, U.S. Dist. Ct., District of Delaware, Civil Action No. 82-630, May 30, 1984, 6 Sheets.

(56) References Cited

OTHER PUBLICATIONS

Dreyfus Insured Deposit Program, Disclosure Statement and Terms and Conditions, Dreyfus A BNY Mellon Company, Jan. 2008, 8 Sheets.

Dreyfus Insured Deposit Program, Multiple List Program—Effective May 11, 2009, 1 Sheet.

Email from Olivia Kim to Charles Macedo on Jun. 9, 2010 with attachment of Lawsuit by Island Intellectual Property LLC, Lids Capital LLC, Double Rock Corporation, and Intrasweep LLC against Deutshe Bank Trust Company Americas and Total Bank Solutions, LLC, Defendant Deutsche Bank Trust Company America's responses to Intrasweep's common interrogatory Nos. 1-5, Confidential—Attorneys only, Civil Action No. 09 Civ. 2675 (VM) (AJP).

FDIC Federal Register Citations: Email from Bert Ely to Comments, Mar. 8, 2006, Subject: Large-Bank Deposit Insurance Determination Proposal—RIN 3064-AC98—Regs@fdic.gov. Attached, also from FDIC Federal Register Citations: Email From American Banker, by Bert Ely, Feb. 24, 2006, Viewpoint: FDIC's Account-Link Plan a Pointless, Costly Threat.

FDIC, Federal Deposit Insurance Corporation, Letter to Mr. Ronald Rexter, Feb. 28, 2003, From Michelle M. Borzillo, Counsel Supervision and Legislation Section, 2 Sheets.

Federal Register: Oct. 9, 1997 (vol. 62, No. 196), pp. 52809-52868. http://www.fdic.gov/news/news/inactivefinancial/1997/fil97111b.html.

Financial Services Industry, "WebWatch: Trading Company Bundles CDs for Better Rates," Community Banker, Jun. 2002, online, http://findarticles.com/p/articles/mi_qa5344/is_200206/ai_n21313883/.

Finistar Reg. No. 2,939,558, Registered Apr. 12, 2005.

Finistar, Providing FDIC Insured Funds as a Stable Source of Deposits to Commercial Banking Institutions, 16 Sheets, www.Finistar.com.

Fredrickson, "Rising Rates Rescue Money Fund Firm Reserve Profits by Picking Niches," Crain's New York Business, Crain Communications Inc., vol. 20, Issue 51, 2 Sheets, Dec. 20, 2004.

Frost Bank, Member FDIC, Checking Accounts, 1 Sheet, Sep. 19, 2003, https://www.frostbank.com/cgi-bin/ecomm/frost1/scripts/products/product_detail.jsp?BV_....

Garmhausen, "Matching Small Banks with Large Muni Deposits," American Banker, Online The Financial Services Resource, Oct. 4, 2005, 4 pages, http://www.finstar.com/docs/AmericanBanker.html.

Garton, Thomas W.; Are LLC Banks in the Cards? Stay Tuned; Fredrikson & Byron, P.A.; Jun. 2003; http://www.fredlaw.com/articles/banking/bank_0306_twig.html; 2 pages.

Heavyweight Funding, Bankers News, Mar. 4, 2003, vol. II, Issue No. 5, 2 Sheets.

Hencke, "New Rules for FDIC deposit Insurance", ABA Bank Compliance, vol. 20, No. 7, Jul./Aug. 1999, pp. 31-37.

Hencke, Christopher; New Rules for FDIC Deposit Insurance; ABA Bank Compliance, Jul./Aug. 1999, 20,7; pp. 31-37.

Hoffman, "Reserve's FDIC-Insured Account Draws Regionals; But some see little need for insurance," Crain Communications Inc., Investment News, 2 Sheets, Jun. 4, 2001.

IDC Deposits, online, http://idcdeposits.com/, 2009, 1 Sheet.

In The Know, Important Information About Your Account, Smith Barney Citigroup, 2005, 6 Sheets.

Insured Bank Deposit Program Summary Information Statement, Information Statement, and list of Eligible Program Banks Effective Feb. 10, 2005, 11 pages.

Insured Cash Account Program Disclosure Booklet, LPL Financial Services, Linsco/Private Ledger, Member NASD/SIPC, Apr. 2006, 14 pages.

*Island Intellectual Property LLC et al. v. Deutsche Bank AG, et al.*; Memorandum and Order; Case 1:09-cv-02675-KBF; Doc. 289; Feb. 14, 2012; pp. 1-28.

*Island Intellectual Property LLC et al. v. Deutsche Bank AG, et al.*; Order; Case 1:09-cv-02675-KBF; Doc. 221; Feb. 14, 2012; pp. 1-34.

*Island Intellectual Property LLC et al. v. Deutsche Bank Trust Company Americas, et al.*; Declaration of Charles R. Macedo 2 in support of Plaintiffs' motions in limine Nos. 4-6; Case 1:09-cv-02675-KBF; Doc. 260; Feb. 3, 2012; pp. 1-3 and Exhibits.

*Island Intellectual Property LLC et al. v. Deutsche Bank Trust Company Americas, et al.*; Defendants' opposition to Plaintiffs' motion in limine #3 to preclude defendants' expert Richard T. Powers from testifying that the Merrill Lynch CMA/ISA product includes omnibus accounts. Case 1:09-cv-02675-KBF; Doc. 269; Feb. 6, 2012; pp. 1-18.

*Island Intellectual Property LLC et al. v. Deutsche Bank Trust Company Americas, et al.*; Defendants' opposition to Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 284; Feb. 10, 2012; pp. 1-12.

*Island Intellectual Property LLC et al. v. Deutsche Bank Trust Company Americas, et al.*; Memorandum and Order; Case 1:09-cv-02675-KBF; Doc. 265; Feb. 6, 2012; pp. 1-22.

*Island Intellectual Property LLC et al. v. Deutsche Bank Trust Company Americas, et al.*; Plaintiffs' brief in support of their motion in limine #3 to preclude defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF; Doc. 247; Jan. 30, 2012; pp. 1-20.

*Island Intellectual Property LLC et al. v. Deutsche Bank Trust Company Americas, et al.*; Plaintiffs' memorandum of law in support of motion in limine #4 to preclude evidence and argument regarding Plaintiffs' confidential Oct. 18, 2000 presentation to American Enterprises Investment Services at trial; Case 1:09-cv-02675-KBF; Doc. 262; Feb. 6, 2012; pp. 1-10.

*Island Intellectual Property LLC et al. v. Deutsche Bank Trust Company Americas, et al.*; Plaintiffs' motion in limine #4 to preclude evidence and argument regarding Plaintiffs' confidential Oct. 18, 2000 presentation to American Enterprises Investment Services at trial; Case 1:09-cv-02675-KBF; Doc. 257; Feb. 3, 2012; pp. 1-10.

*Island Intellectual Property LLC et al. v. Deutsche Bank Trust Company Americas, et al.*; Plaintiffs' Notice of Motion and Motion in Limine #3 to preclude Defendants' expert Richard T. Powers from testifying that the Merrill Lynch CMA/ISA product includes omnibus accounts based on 17-year old double hearsay that is uncorroborated and in contravention of documentary and oral evidence of record; Case 1:09-cv-02675-KBF, Doc. 246; Jan. 30, 2012; pp. 1-2.

*Island Intellectual Property LLC et al. v. Deutsche Bank Trust Company Americas, et al.*; Plaintiffs' notice of motion and motion in limine #3 to preclude testimony of Gilbert Schwartz; Case 1:09-cv-02675-KBF; Doc. 259; Feb. 3, 2012; pp. 1-2.

*Island Intellectual Property LLC et al. v. Deutsche Bank Trust Company Americas, et al.*; Plaintiffs' notice of motion and motion in limine #4 to preclude evidence and argument regarding Plaintiffs' confidential Oct. 18, 2000 presentation to American Enterprises Investment Services at trial; Case 1:09-cv-02675-KBF; Doc. 256; Feb. 3, 2012; pp. 1-2.

Jong et al., "The Valuation and Hedging of Variable Rate Savings Accounts," University of Amsterdam, Nov. 15, 2001, 23 Sheets.

Keenan, "Tapping Brokerages for Alternative to CDs," American Banker, The Financial Services Daily, 3 Sheets, Feb. 18, 2004.

Knight-Ridder; Money Matters, Tips you can use—Limits Apply as FDIC Insurance Covers Depositor, Not Account; Chicago Tribune; Feb. 4, 1998; 2 pages.

Lake Forest Bank & Trust Company, Introducing MaxSafe Deposit Accounts with up to $3.75 Million in FDIC Insurance, www.lakeforestbank.com/maxsafe, Nov. 21, 2008, 2 Sheets.

Lavine, "Check Out High-Yield Checking Accounts," Broward Daily Business Review, vol. 39, No. 102, 2 Sheets, Apr. 27, 1998.

Lawsuit by *Island Intellectual Property LLC, Lids Capital. LLC, Double Rock Corporation and Intrasweep LLC*, against *Promontory Interfinancial Network, LLC, Deutsche Bank AG, Deutsche Bank Trust Company Americas and Total Bank Solutions, LLC*, Complaint, Apr. 14, 2009, Case No. 09 CV 3750.

Lawsuit by *Carlo DeBlasio et al.* against *Merrill Lynch & Co., Inc. et al.*, Declaration of Andrew W. Stern, including Exhibits A, B, C, D, E and F, Nov. 12 2007, Case No. 07-cv-318 (RJS) (Document 59).

(56) References Cited

OTHER PUBLICATIONS

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, including: "Client Commitment"; "Get Started Today"; "Total Merrill"; "Guideline for Business Conduct"; "Commitment to Clarity"; "Cash Management Account"; "Information Statement Regarding Changes to Interest Rates on Deposits in Merrill Lynch Banks", Fe.

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 72).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 73).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 74).

Lawsuit by *Carlo DeBlasio et al.* against *Merrill Lynch & Co., Inc. et al.*, Declaration of Joel P. Laitman in Support of Plaintiffs' Memorandum of Law in Opposition to Defendants' Motion for Dismissal of the Second Amended Class Action Complaint, Including: . . . Feb. 5, 2008 (Document 75).

Lawsuit by *Carlo DeBlasio et al.* against *Merrill Lynch & Co., Inc. et al.*, Declaration of Kenneth I. Schacter, including Exhibits A, B, C, D, F, G, H, I, J, K, L, M, N, O, P, Q and R, Nov. 14 2007, Case No. 07-cv-318 (RJS) (Document 69).

Lawsuit by *Carlo DeBlasio et al.* against *Merrill Lynch & Co., Inc. et al.*, Declaration of Mathew J. Terry in Support of Motion to Dismiss by Defendants Wachovia Corporation, Wachovia Securities, LLC, Wachovia Bank, N.A., and Wachovia Bank of Delaware, N.A., including Exhibits A, B, C and D, Nov. 14 2007, Case No. 07-318 (RJS) (Document 67).

Lawsuit by *Carlo DeBlasio et al.* against *Merrill Lynch & Co.*, Inc. et al., Declaration of Scott D. Musoff in Support of the Merrill Lynch Defendants' Motion to Dismiss the Second Amended Class Action Complaint, ECF Case, Nov. 12 2007, Case No. 07-cv-318 (RJS) (Document 64).

Lawsuit by *Carlo DeBlasio et al.* against *Merrill Lynch & Co., Inc. et al.*, Reply Declaration of Kenneth Schacter including Exhibits S and T, Mar. 6, 2008, Case No. 07-cv-318 (RJS) (Document 81).

Lawsuit by *Carlo DeBlasio et al.* against *Merrill Lynch & Co., Inc. et al.*, Second Amended Class Action Complaint, Jury Trial Demanded, Introduction and Summary of Allegations, Jun. 11, 2007, Case No. 07-cv-318-VM.

Lawsuit by *Carlo DeBlasio et al.* against *Merrill Lynch & Co., Inc. et al.*, Supplemental Declaration of Matthew J. Terry in Support of Motion to Dismiss by Defendants Wachovia Corp., Wachova Securities, LLC, Wachovia Bank N.A., and Wachovia Bank of Delaware, N.A., including Exhibits A and B, Mar. 6, 2008, Case No. 07-cv-318 (RJS) (Document 79).

Lawsuit by *Carlo DeBlasio, et al.* against *Merrill Lynch & Co., Inc., et al.*, Opinion and Order Regarding Motions, Jul. 27, 2009, Case No. 07 CIV 318(RJS).

Lawsuit by *Island Intellectual Property LLC* against *Clearview Correspondent Services, LLC, et al.*; Complaint for Patent Infringement; Civil Action No. 1:11-cv-448 (LO/TRJ); Apr. 26, 2011; 55 pages.

Lawsuit by *Island Intellectual Property LLC* against *First Southwest Company*; Complaint for Patent Infringement; Civil Action No. 1:11-cv-00371-UNA; Apr. 26, 2011; 42 pages.

Lawsuit by *Island Intellectual Property LLC* and *Intrasweep LLC against Deutsche Bank Trust Company Americas and Total Bank Solutions, LLC, Deutsche Bank Trust Company Americas'* answer to plaintiffs' Feb. 23, 2010 complaint and counterclaims, May 4, 2010, Civil Action No. 09 Civ. 2675 (VM) (AJP)(Document 111).

Lawsuit by *Island Intellectual Property LLC and Intrasweep LLC* against *Deutsche Bank Trust Company Americas and Total Bank Solutions, LLC, Total Bank Solutions, LLC's* answer to plaintiffs' Feb. 23, 2010 complaint and counterclaims, May 4, 2010, Civil Action No. 09 Civ. 2675 (VM) (AJP)(Document 112).

Lawsuit by *Island Intellectual Property LLC and Intrasweep LLC* against *Institutional Deposits Corp.*, Complaint for Patent Infringement, Jury Trial Demanded, Nov. 4, 2009, Civil Action No. 09 CV 3079.

Lawsuit by *Island Intellectual Property LLC and Intrasweep LLC* against *Institutional Deposits Corp.*, Consent Order, Apr. 21, 2010, Case No. 09-CV-3079 (Document 44).

Lawsuit by Island Intellectual Property LLC and Intrasweep LLC, Answer of Defendant Institutional Deposits Corp. to Complaint for Patent Infringement, Dec. 10, 2009, Case No. 09 CV 03079 (JEC), (Document 16).

Lawsuit by *Island Intellectual Property LLC and Lids Capital LLC* against *Deutsche Bank Trust Company Americas and Total Bank Solutions, LLC, Deutsche Bank Trust Company* answer to plaintiffs' Mar. 16, 2010 complaint and counterclaims, May 4, 2010, Civil Action No. 09 Civ. 2675 (VM) (AJP) (Document 113).

Lawsuit by *Island Intellectual Property LLC and Lids Capital LLC* against *Deutsche Bank Trust Company Americas and Total Bank Solutions, LLC, Total Bank Solutions, LLC's* answer to plaintiffs' Mar. 16, 2010 complaint and counterclaims, May 4, 2010, Civil Action No. 09 Civ. 2675 (VM)(Document 114).

Lawsuit by *Island Intellectual Property LLC et al.* v. *Deutsche Bank Trust Company Americas et al.*; Joint Statement of Claims and Defenses to be Presented at Trial Set for Feb. 27, 2012; Jan. 16, 2012; Case 1:09-cv-02675-KBF (Document 227).

Lawsuit by *Island Intellectual Property LLC et al.*, against *Deutsche Bank Trust Company Americas, et al.*; Expert Report of Richard T. Powers Concerning Invalidity of U.S. Pat. Nos. 7,509,286; 7,519,551; 7,536,350; 7,668,771; 7,668,772, 7,672,886; and 7,680,734; and Exhibits A-R; Civil Action No. 09 Civ. 2675(VM)(AJP), Oct. 28, 2010; 1,119 pages.

Lawsuit by *Island Intellectual Property LLC* v. *Clearview Correspondent Services, LLC, et al.*; Branch Banking & Trust Company's Answer to Complaint and Counterclaims; Civil Action No. 1:11-cv-448-LO-IDD; Jun. 20, 2011; 13 pages.

Lawsuit by *Island Intellectual Property LLC* v. *Clearview Correspondent Services, LLC, et al.*; Clearview Correspondent Services, LLC's Answer to Complaint and Counterclaims; Civil Action No. 1:11-cv-448-LO-IDD; Jun. 20, 2011; 12 pages.

Lawsuit by *Island Intellectual Property LLC* v. *Clearview Correspondent Services, LLC, et al.*; Scott & Stringfellow, LLC's Answer to Complaint and Counterclaims; Civil Action No. 1:11-cv-448-LO-IDD; Jun. 20, 2011; 12 pages.

Lawsuit by *Island Intellectual Property LLC* v. *First Southwest Company*; First Southwest Company's Answer to Complaint and Counterclaims; Civil Action 1:11-cv-371-SD; Jun. 20, 2011; 11 pages.

Lawsuit by *Island Intellectual Property LLC, et al.* against *Deutsche Bank Trust Company Americas, et al.*,. Defendant Deutsch Bank Trust Company Americas' Responses to Double Rock's Interrogatories Nos. 1-10; May 2010; Civil Action No. 09 Civ. 2675 (VM)(AJP).

Lawsuit by *Island Intellectual Property LLC, et al.* against *Deutsche Bank Trust Company Americas, et al.*; Expert Report of Ivan Zatkovich Regarding Validity and Enforceability of the Asserted Claims of the Patents-in-Suit; Civil Action No. 09 Civ. 2675 (VM)(AJP); Nov. 23, 2010; 192 pages. The redacted items were designated as confidential in a Protective Order in this case.

Lawsuit by *Island Intellectual Property LLC, et al.* against *Deutsche Bank Trust Company Americas, et al.*; Expert Report of the Honorable Gerald J. Mossinghoff and Exhibits A-E; Civil Action No. 09 Civ. 2675 (VM)(AJP); Nov. 23, 2010; 107 pages.

Lawsuit by *Island Intellectual Property LLC, et al.* against *Deutsche Bank Trust Company Americas*; Defendant Total Bank Solutions, LLC's Responses to Double Rock's Common Interrogatory Nos. 110 to Defendants; May 2010; Civil Action No. 09 Civ. 2675 (VM)(AJP).

Lawsuit by *Island Intellectual Property LLC, et al.* v. *Deutsche Bank Trust Company Americas et al.*; Declaration of Olivia M. Kim in

(56) References Cited

OTHER PUBLICATIONS

Support of Defendants' Motion for Summary Judgment of Invalidity Under 35 U.S.C. § 101; Oct. 6, 2011; Case 1:09-cv-02675-VM, Document 197.
Lawsuit by *Island Intellectual Property LLC, et al.* v. *Deutsche Bank Trust Company Americas, et al.* Plaintiffs' Memorandum of Law in Opposition to Defendants' Motion for Summary Judgment of Invalidity Under 35 U.S.C. § 101; Nov. 2, 2011; Case 1:09-cv-02675-VM, Document 201.
Lawsuit by *Island Intellectual Property LLC, et al.* v. *Deutsche Bank Trust Company Americas, et al.*; Defendants Reply in Support of Their Motion for Summary Judgment of Invalidity Under 35 U.S.C. § 101; Nov. 15, 2011; Case 1:09-cv-02675-VM, Document 208.
Lawsuit by *Island Intellectual Property LLC, et al.* v. *Deutsche Bank Trust Company Americas, et al.*; Defendants' Response to Plaintiffs' Statement of Additional Material Facts in Support of Plaintiffs' Opposition to Defendants' Motion for Summary Judgment of Invalidity Under 35 U.S.C. § 101; Nov. 15, 2011; Case 1:09-cv-02675-VM, Document 209.
Lawsuit by *Island Intellectual Property LLC, et al.* v. *Deutsche Bank Trust Company Americas, et al.*; Order; Dec. 7, 2011; Case 1:09-cv-02675-VM, Document 212.
Lawsuit by *Island Intellectual Property LLC, et al.* v. *Deutsche Bank Trust Company Americas, et al.*; Special Master's Report and Recommended Decision on Defendants' Summary Judgment Motion of Invalidity Under 35 U.S.C. § 101; Dec. 19, 2011.
Lawsuit by *Island Intellectual Property LLC, et al.* v. *Deutsche Bank Trust Company Americas, et al.*; Supplemental Declaration of Olivia M. Kim in Support of Defendants' Opening and Reply Claim Construction Briefs; Nov. 15, 2011; Case 1:09-cv-02675-VM, Document 207.
Lawsuit by *Island Intellectual Property LLC, et al.*, against *Deutsche Bank Trust Company Americas, et al.*; Defendant Deutsche Bank Trust Company Americas' Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by *Island Intellectual Property LLC, et al.*, against *Deutsche Bank Trust Company Americas, et al.*; Defendant Total Bank Solutions, LLC's Fifth Supplemental Responses to Island IP's First Set of Common Interrogatories to All Defendants (No. 7); Case No. 09 Civ. 2675 (VM)(AJP); Sep. 16, 2010; 9 pages.
Lawsuit by *Island Intellectual Property LLC, Intrasweep LLC and Double Rock Corporation* against *Deutsche Bank AG, Deutsche Bank Trust Company Americas and Total Bank Solutions, LLC*, Complaint for Patent Infringement, May 19, 2009, Case No. 09 CIV 4673.
Lawsuit by *Island Intellectual Property LLC, Lids Capital LLC, and Double Rock Corporation* against *Deutsche Bank AG, Deutsche Bank Trust Company Americas and Total Bank Solutions, LLC*, including Cover Sheet, Summons, Complaint and Rule 7.1 Statement, Mar. 24, 2009, Case No. 09 CV 2677.
Lawsuit by *Island Intellectual Property LLC, Lids Capital LLC, and Double Rock Corporation* against *Promontory Interfinancial Network, LLC and MBSC Securities Corporation*, including Cover Sheet, Summons, Complaint and Rule 7.1 Statement, Mar. 24, 2009, Case No. 09 CV 2675.
Lawsuit by *Island Intellectual Property LLC, Lids Capital LLC, Double Rock Corporation and Intrasweep LLC* against *Deutsche Bank AG, Deutsche Bank Trust Company Americas and Total Bank Solutions, LLC*, Stipulated Dismissal of Deutsche Bank AG Without Prejudice, Nov. 19, 2009, Civil Action No. 09 CIV 2675 (VM) (AJP) (Document 79).
Lawsuit by *Island Intellectual Property LLC, Lids Capital LLC, Double Rock Corporation and Intrasweep LLC* against *Deutsche Bank Trust Company Americas and Total Bank Solutions, LLC, Deutsche Bank Trust Company Americas'* First Amended Answer to Consolidated First Amended Complaint and Counterclaims, Dec. 4, 2009, Civil Action No. 09 CIV 2675 (VM) (AJP), (Document 86).
Lawsuit by *Island Intellectual Property LLC, Lids Capital LLC, Double Rock Corporation and Intrasweep LLC* against *Deutsche Bank Trust Company Americas and Total Bank Solutions, LLC, Total Bank Solutions, LLC's* First Amended Answer to Consolidated First Amended Complaint and Counterclaims Dec. 4, 2009, Civil Action No. 09 CIV 2675 (VM) (AJP) (Document 87).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Answer and Counter Claims, Answer of Defendant MBSC Securities Corporation, Jun. 25, 2009, Case No. 09 CV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Answer and Counter Claims, Answer of Defendant Promontory Interfinancial Network, LLC, Jun. 25, 2009, Case No. 09 CV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Consolidated First Amended Complaint, Jury Trial Demanded, Jun. 11 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank AG's Answer to Consolidated First Amended Complaint, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Deutsche Bank Trust Company Americas' Answer to Consolidated First Amended Complaint and Counter Claims, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Jury Trial Demanded, Total Bank Solutions, LLC's Answer to Consolidated First Amended Complaint and Counterclaims, Jun. 25, 2009, Civil Action No. 09 CIV 2675.
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Stipulated Dismissal of Counts I-III of Defendant Promontory Interfinancial Network, LLC's, Counterclaim with Prejudice, Oct. 19, 2009, (Document 68).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, Stipulation and Order, Oct. 29, 2009, Case No. 09 CV 2675 (VM) (AJP) (Document 73).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Deutsche Bank Trust Company Americas' Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant MBSC Securities Corporation's Counterclaims, Jul. 9, 2009, Civil Action No. 09 CIV 2675 (VM).

(56) References Cited

OTHER PUBLICATIONS

Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Promontory Interfinancial Network LLC's Counterclaims, Jul. 9, 2009, Civil Action No. 09 CIV 2675 (VM).
Lawsuit by *Island Intellectual Property LLC, Lids Capital LLC, Double Rock Corporation and Intrasweep LLC* against *Promontory Interfinancial Network LLC, MBSC Securities Corporation, Deutsche Bank AG, Deutsche Bank Trust Company Americas and Total Bank Solutions, LLC*, The Island Plaintiffs' Reply to Defendant Total Bank Solutions, LLC's Counterclaims, Jul. 9, 2009, Civil Action No. 09 CIV 2675 (VM).
Lawsuit by *Promontory Interfinancial Network, LLC* against *Double Rock Corporation p/k/a Reserve Management Corporation and Lids Capital LLC*, Amended Complaint, Mar. 27, 2009, Civil Action No. 1:09 CV 316.
Lawsuit by *Promontory Interfinancial Network, LLC* against *Double Rock Corporation p/k/a Reserve Management Corporation*, Complaint, Mar. 24, 2009, Civil Action No. 1:09 CV 316.
Lawsuit by *Promontory Interfinancial Network, LLC* against *Double Rock Corporation p/k/a Reserve Management Corporation, Island Intellectual Property LLC, Lids Capital LLC and Intrasweep LLC*, Amended Complaint, Apr. 15, 2009, Civil Action No. 3:09 CV 217.
Lawsuit by *Promontory Interfinancial Network, LLC* against *Double Rock Corporation p/k/a Reserve Management Corporation, Island Intellectual Property LLC, Lids Capital LLC and Intrasweep LLC*, Complaint, May 19, 2009, Civil Action No. 3:09 CV 322.
Lawsuit by *Promontory Interfinancial Network, LLC* against *Double Rock Corporation, p/k/a Reserve Management Corporation, Island Intellectual Property LLC and Lids Capital LLC*, including Cover Sheet, Summons and Complaint, Apr. 14, 2009, Civil Action No. 3:09 CV 217.
Letter from Gilbert T. Schwartz, Skadden, Arts, Slate, Meagher & Flom to Oliver Ireland, Associate General Counsel, Board of Governors of the Federal Reserve System; Dec. 18, 1987; 19 sheets.
Letter From Jamey Basham, Attorney, LEXSEE 1990 FDIC Interp. Ltr., Lexis 1, Federal Deposit Insurance Corporation, FDIC-90-02, Jan. 3, 1990, 2 Sheets.
Letter From Joseph A. DiNuzzo, Counsel, Oct. 20, 1999, FDIC, Federal Deposit Insurance Corporation, 1 Sheet.
Letter From Merle Y. Waldman, LEXSEE 1985 Sec No- Act., Lexis 1593, Securities Exchange Act of 1934—Section 15(a), Jan. 8, 1985, 11 Sheets.
Letter from Michael Bradfield, General Counsel, Board of Governors of the Federal Reserve System, Nov. 16,1984, 4 Sheets.
Letter From Oliver I. Ireland, Associate General Counsel, Board of Governors of the Federal Reserve System, Jun. 22, 1988, 5 Sheets.
Letter From Roger A. Hood, Assistant General Counsel, Jul. 16, 1986, FDIC, Federal Deposit Insurance Corporation, Legal Division, 1 Sheet.
Letter from Roger M. Zaitzeff, Seward & Kissel to Gilbert T. Schwartz, Associate General Counsel, Board of Governors of the Federal Reserve System; May 10, 1983, 5 sheets.
Letter from Stephanie Martin, Assoc. General Counsel, Board of Governors of the Federal Reserve System, Apr. 22, 2004, 8 Sheets.
Letter From William W. Wiles, Secretary of the Board, Board of Governors of the Federal Reserve System, Jun. 22, 1983, 6 Sheets.
Letter To Mr. James E. Creekman, Group Vice President, From Oliver Ireland, Associate General Counsel, Aug. 1, 1995, 4 Sheets.
Letter To Mr. Jonathan L. Levin, Esq., From Oliver Ireland, Associate General Counsel, Oct. 18, 1996, 2 Sheets.
Letter To Mr. L.P. Fleming, Jr., Esq., From Oliver Ireland, Associate General Counsel, Feb. 7, 1995, 3 Sheets.
Letter To Ms. Brenda L. Skidmore, Senior Vice President, From Oliver Ireland, Associate General Counsel, Aug. 30, 1995, 4 Sheets.
Letter to William R. Burdette, CEO, Apr. 6, 2009, FDIC, Federal Deposit Insurance Corporation, 2 pages.
Letter to William R. Burdette, CEO, Nov. 15, 2007, FDIC, Federal Deposit Insurance Corporation, 5 Sheets.
Liberman et al., Market Watch, "How Important are Banks?" FDIC Insurance on Deposits Just One Continuing Advantage, Oct. 17, 2006, 3 Sheets.
Martens, Don W.; letter to Hon. Victor Marrero re. supplement to letter of Nov. 28, 2011 on tentative rulings on claim construction in *Island Intellectual Property LLC et al. v. Deutsche Bank Trust Co., et al.*; Nov. 28, 2011; Case 1:09-cv-02675-VM; Document 211.
Martens, Don W.; letter to Hon. Victor Marrero re. tentative rulings on claim construction in *Island Intellectual Property LLC et al. v. Deutsche Bank Trust Co., et al.*; Nov. 28, 2011; Case 1:09-cv-02675-VM, Document 210.
McReynolds et al. "Unusual Products for Unusual Times," Securities Data Publishing on Wall Street, 6 Sheets, May 1, 2001.
McReynolds, "The Power of Cash: Ho-hum cash can be great product (and lead to more business) in troubled times," Securities Data Publishing on Wall Street, 3 Sheets, Jun. 1, 2002.
Merriam-Webster Online Dictionary, 10th Edition, Definition of "Associated", Jan. 30, 2009, 2 Sheets.
Merrill Lynch & You, "Financial Services the Way You Want, When You Want Them," Jan. 2000; 4 Sheets.
Merrill Lynch Announces Beyond Banking, The Power of Advice for Smarter Cash Management, Jan. 8, 2 Sheets.
Merrill Lynch, Pierce, Fenner & Smith Incorporated, "Information Statement," 2000, 12 Sheets.
Merrill Moves CMA Cash to Bank, Street Talk, On Wall Street, Nov. 2000, p. 26.
Money Fund Report, Bank of New York Adds Insured Sweeps Option, Friday, May 3, 2002, The Reserve Funds, 1 Sheet.
Money Fund Report, IBC Financial Data, Inc., Nov. 6, 1998, 1 Sheet.
Money Fund Report, Insured Cash Sweep Options Proliferate, Friday, Jun. 1, 2001, The Reserve Funds, 1 Sheet.
Money Market Insight's, Goldman Sachs May Create Bank to Offer Insured Cash Sweeps, Aug. 2002 Issue, 3 Sheets.
MUNK, Merrill Makes New Push Into Traditional Banking, Dow Jones Newswires, Jan. 3, 2003, 1 Sheet.
Mutual Fund Dealers Association, 1 page, (http://www.mfda.ca/.
Mutual Funds Magazine, Bargain Basement Funds, Oct. 1997, 1 Sheet.
Mutual Funds Magazine, Bargain Basement Funds, Oct. 1997, 2 Sheets.
News Article: "Regulators Support Demand Deposit Bill", Regulatory Compliance Watch—Mar. 9, 1998; 2 Sheets, vol. 9, No. 10.
Northbrook Bank & Trust Company, Introducing our MaxSafe CD with up to $700,000 of FDIC Insurance, Nov. 12, 2002, 4 Sheets.
Northbrook Bank & Trust Company, Seven Times the Security of a Normal CD, Introducing our MaxSafe CD, Nov. 25, 2002, 4 Sheets.
O'Brian, "Money-Market Funds Suit Many Investors, But Proud Creator Frets About Extra Risk," Re-Printed From The Wall Street Journal, Monday, Dow Jones & Company, Inc., Nov. 25, 2002, 2 Sheets.
On Wall Street, Helping Brokers Build a More Successful Business, The Power of Cash, Jun. 2002, 2 Sheets.
On Wall Street, Helping Brokers Build a More Successful Business, Unusual Products for Unusual Times, May 2001, 2 Sheets.
Online, www.usabancshares.com, Brave New World, 1999, 2 Sheets.
Part: 2, Monetary Policy and Reserve Requirements, Subpart—Regulation D, Board Interpretations of Regulation D, Transaction Accounts—Linked to Time Deposits, vol. 1, Federal Reserve Regulatory Service, 2 Sheets.
Potter, "As Sweep Accounts Continue to Grow, So do Community Bank Options," America's Community Banker, vol. 9, Issue 8, Bell & Howell Information and Learning Company, 3 Sheets, Aug. 1, 2000.
Promontory Interfinancial Network, Promontory Interfinancial Network Announces New Deposit Placement Service, Jan. 21, 2003, 3 Sheets.
Promontory Interfinancial Network: http://www.promnetwork.com/index.html, 2003.
Promontory Interfinancial Network: Frequently Asked Questions (FAQs), Feb. 5, 2003, 5 pages.
Reserve Insured Deposits, United States Patent and Trademark Office, Reg. No. 2,694,910, Registered Mar. 11, 2003, 1 Sheet.

(56) References Cited

OTHER PUBLICATIONS

Reserve Management Corporation, Reserve Insured Deposits, Serial No. 76/315,600, Issued.
Ring, National /Global, "Amex Spans The Globe in Retail Bank Buildup," Nov. 27, 2000, 1 Sheet.
Scottrade Bank Deposit Program—Terms, Conditions & Disclosures; Author unknown; Aug. 2011; pp. 1-3.
Share, "New Service Skirts FDIC's $100K Limit," Dialog Web Command Mode, 2 Sheets, Jun. 13, 2003, http://www.dialogweb.com/cgi/dwclient.
Smith, "IBAA Won't Push Interest-Bearing Checking for Business; Says Too Few Members Want It," The American Banker, 2 Sheets, Apr. 18, 1996.
Stafford, "New Bank Program Allows $1 Million in Insured Deposits," Dialog Web Command Mode, 3 Sheets, Aug. 24, 2003, http://www.dialogweb.com/cgi/dwclient.
Sweeping Your Firm Into FDIC Insured Deposits, Harken Financial Services, Aug. 4, 2006, 8 Sheets.
Testimony of Bruce R. Bent, CEO of The Reserve Funds, Before The Financial Institutions and Consumer Credit Subcommittee House Financial Services Committee U.S. House of Representative, Hearing on H.R. 758 and H.R. 859, Mar. 5, 2003, 4 Sheets.
The Depository Trust Company, B#: 3875, Oct. 1, 2002, Settlement\Underwriting, From: Denise Russo, Director, Underwriting, 6 Sheets.
The Insured Savings Account, Issuer Guide to Offering MMDAs Through Merrill Lynch, Merrill Lynch Money Markets, Inc., "Operational Guide to The Merrill Lynch MMDA Program 1986", Sep. 1986 3 Sheets.
The Pershing Press, Dreyfus Insured Deposit Program, Issue 2, Aug. 2008, http://www.pershing.com/news/pershing_press/news_466244.html, 1 Sheets.
The Reserve Fund, Study of U.S. Patent No. 6,374,231, 1 Sheet.
The Reserve Funds Press Release, "The Reserve Funds and Frontier Bank Partner to Offer Revolutionary Banking Product," 5 Sheets, Aug. 1, 2000.
The Reserve Funds, Objectives, Observations & Strategies for American Enterprises Inv., Oct. 18, 2000, 11 Sheets.
The Reserve Funds, NJBA Endorses New Sweep Account Offers New Jersey Banks Deposit Growth, Retention, for Immediate Release, May 23, 2001, 1 Sheet.
The Reserve Funds, Reserve Management and Irwin Union Bank and Trust Company Partner to Offer the Reserve Return Sweep, for Immediate Release, Mar. 8, 2001, 2 Sheets.
The Reserve, "Company History," 3 Sheets, Oct. 4, 2006, http://www.ther.com/aboutus/history.shtml.
The Reserve, "Reserve Insured Deposits Program," 2 Sheets, Oct. 4, 2006, http://www.ther.com/bank/bank_insdep.shtml.
The Reserve, "Reserve Insured Deposits," 2 Sheets, Oct. 4, 2006, http://www.ther.com/ps/ps_fif.shtml.
The Reserve, "What Sets Us Apart," 2 Sheets, Oct. 4, 2006, http://www.ther.com/bank/bank_wsua.shtml.
The Unmatched Sweep Solution From The Cash Management Expert, 2 Sheets.
Total Bank Solutions, Bank Sweep FAQs; http://www.totalbanksolutions.com/sweepbnkfaqs.htm, Sep. 23, 2005, 2 pages.
Total Bank Solutions, Bank Sweep FAQs, http://www.totalbanksolutions.com/sweepbnkfaqs.htm, Nov. 2, 2005, 3 pages.
Total Bank Solutions, Bank Sweep Products, Deutsche Bank, http://www.totalbanksolutions.com/banksweep.htm, Sep. 23, 2005, 1 page.
Total Bank Solutions, Bank Sweep Products, http://www.totalbanksolutions.com/banksweep.htm, Appendix 3, Oct. 18, 2005, 2 pages.
Total Bank Solutions, Bank Sweep Products, http://www.totalbanksolutions.com/banksweep.htm, Nov. 2, 2005, 2 pages.
Total Bank Solutions, Brokerage Sweep FAQs, http://www.totalbanksolutions.com/brokerfaqs.htm, Nov. 2, 2005, 3 pages.
Total Bank Solutions, Brokerage Sweep, http://www.totalbanksolutions.com/brokersweep.htm, Nov. 2, 2005, 1 page.
Total Bank Solutions, Deposit Bank FAQs, http://www.totalbanksolutions.com/depositbnkfaqs.htm, Nov. 2, 2005, 2 pages.
Total Bank Solutions, Deposits, Deutsche Bank, http://www.totalbanksolutions.com/deposits.htm, Sep. 23, 2005, 1 page.
Total Bank Solutions, Deposits, http://www.totalbanksolutions.com/deposits.htm, Nov. 2, 2005, 2 pages.
Total Bank Solutions, Deutsche Bank Insured Deposit Program, DB Insured Deposit Program Features, http://www.totalbanksolutions.com/features.htm, Sep. 23, 2005, 2 pages.
Total Bank Solutions, Deutsche Bank Insured Deposit Program, http://www.totalbanksolutions.com/, Sep. 23, 2005, 1 page.
Total Bank Solutions, http://www.totalbanksolutions.com/, Mar. 16, 2007, 8 pages.
Total Bank Solutions, http://www.totalbanksolutions.com/overview.htm, Nov. 2, 2005, 1 page.
Total Bank Solutions, Insured Deposit Program Features, http://www.totalbanksolutions.com/features.htm, Nov. 2, 2005, 2 pages.
Total Bank Solutions, Insured Deposit Program, http://www.totalbanksolutions.com/Insureddeposits.htm, Nov. 2, 2005, 2 pages.
Total Bank Solutions, Partners & Affiliates, http://www.totalbanksolutions.com/partners.htm, Nov. 2, 2005, 3 pages.
Total Bank Solutions, Partners & Affiliates, http://www.totalbanksolutions.com/partners.htm, Oct. 25, 2005, 3 pages.
Total Bank Solutions, Strategtic Partners, Nov. 2, 2005, 1 page.
Total Bank Solutions, TBS Deposit Account, About Our Broker Products, http://www.totalbanksolutions.com/brokerproducts.htm, Sep. 7, 2005, 2 pages.
Total Bank Solutions, TBS Management Team, http://www.totalbanksolutions.com/management.htm, Appendix 1, Oct. 18, 2005, 1 page.
Total Bank Solutions, TBS Management Team, http://www.totalbanksolutions.com/management.htm, Nov. 2, 2005, 2 pages.
Total Bank Solutions, TBS Management Team, http://www.totalbanksolutions.com/management.htm, Oct. 25, 2005, 2 pages.
TotalBank Solutions, TBS Bank Deposit Account, Oct. 2004, 7 pgs.
TotalBank Solutions, web.archive.org/web/20050126044216/http://totalbanksolutions.com, Jan. 26, 2005, 2 pgs.
USA Mutual Partners Insured Cash Shelter Account Terms and Conditions, 11 pages, 2009 USA Mutuals Partners, Inc.
Wachovia Securities, Important Information for Clients Concerning Changes in Automatic "Sweep" Arrangements, Oct. 1, 2003, 6 sheets.
Waddell, "Sweeping Clean," Advisor, The Advisor to Advisors, 2 Sheets.
Wilson, "How Cash Management Services Can Help Your Bank Cultivate New Relationships with Commercial Customers," America's Community Banker, vol. 10, Issue 5, Bell & Howell Information and Learning Company, 8 Sheets, May 1, 2001.
Memorandum from Ken Johnson re: Insured Deposit Products, Aug. 18, 1992, 3 pgs.
Memorandum from John E. Oncken re: Insured Savings Update, Jun. 15, 1990, 7 pgs.
Memorandum from John E. Oncken re: Brokered Deposit Issue vs. Insured Savings, Mar. 22, 1990, 8 pgs.
Memorandum from Ed Piner re: Insured Savings Product Update, Feb. 1, 1990, 4 pgs.
Insured Savings Correspondent Agreement with Exhibits A-D, 28 pgs.
First City, Texas Insured Savings Agency Agreement with Exhibits A-B and Insured Savings Program, 10 pgs.
Product Bulletin from Bill McCain, Subject: Insured Savings Product Announcement, May 8, 1989, 7 pgs.
Insured Savings Project Team Meeting, Feb. 2, 1989, 16 pgs.
Insured Savings Product Description, Product Name: Insured Savings, Product Description: U.S. Patent #4,985,833, 3 pgs.
Letter to Tim C. Lear, Sep. 20, 1988, 1 pg., with Memorandum from Ed Piner, re: Insured Savings Product, Nov. 9, 1988, and Letter from Tara L. Cyr, Dec. 9, 1988, 1 pg.
Automatic Insured Deposit Method, Patent Application Information, Jul. 11, 1988, 17 pgs.
Insured Savings, Overview & Marketing Plan, Dec. 6, 1988, 23 pgs.
Memorandum from Dick Zinser, re: A First City-Austin deposit program to hold existing customers' deposits, Mar. 17, 1988, 7 pgs.

(56) References Cited

OTHER PUBLICATIONS

Insured Savings Remote Site Sweep Procedures, 3 pgs.
Letter to Malcolm L. Duke, Dec. 27, 1989 with Insured Savings Correspondent Agreement, Exhibits A-D, and Letter to Malcolm L. Drake, Nov. 21, 1989, 37 pgs.
Memorandum from Ken Johnson, re: Attached Insured Savings Letters, Jul. 5, 1990, 1 pg.
Letter to Jerry Crutsinger, Jul. 3, 1990, 1 pg.
Letter to Bill Goertz, Jul. 3, 1990, 1 pg.
Letter to Susan Goodwin, Jul. 3, 1990, 1 pg.
Insured Savings Rate Change Notice, 1 pg.
Addendum to Insured Savings Agency Agreement, 1 pg.
Letter to Paula Martin, Jul. 3, 1990, 1 pg.
Letter to John Lovell, Jul. 3, 1990, 1 pg.
Insured Savings Balance Limits form, 1 sheet.
Email from John Oncken re: Depository Levels at Insured Savings Depositories, Nov. 2, 1989, 1 pg.
Cash Management Balance Monitoring Agreement Form 1 sheet.
Memorandum from Ed Piner, Subject: Discontinuation of Automatic Balance Monitoring in conjunction with Insured Savings Accounts, May 21, 1991, 1 pg.
Blank form letter from Edward N. Piner, May 24 1991, 1 pg.
Letter from First City National Bank of Austin, Sep. 20, 1982, 5 pgs.
First City, Texas—Austin, Special Products, Feb. 20, 1992, with Schedule A & Schedule B, 6 pgs.
Alliance Insured Account, Information Statement, Sep. 1999, 6 sheets.
Lawsuit by Carlo DeBlasio et al. and Merrill Lynch & Co., Inc. et al., Opinion and Order, Jul. 27, 2009, Civil Action No. 07 CIV. 318, 47 pgs.
Lawsuit by Carlo DeBlasio et al. and Merrill Lynch & Co., Inc. et al., Second Amended Class Action Complaint, Jury Trial Demanded, Jun. 11, 2007, Civil Action No. 07 cv 318, 137 pgs.
Investors MoneyAccount$^{SM}$ and Insurance Plus Service Agreement, Schedule A, Mar. 1994; 3 sheets.
Investors MoneyAccount$^{SM}$ (an FDIC-insured money market account), Apr. 1996; 4 sheets.
Investors MoneyAccount$^{SM}$ The FDIC-Insured Money Market with an Important Plus., Apr. 1996; 2 sheets.
Investment Company Act of 1940—Section 3(a)(1), 2(a)(36); Securities Act of 1933—Section 2(1), Nov. 29, 1985, Kempter Financial Services, Inc., 9 pgs.
Insured Money Account Program Agreement and Disclosure Statement, Mar. 2000; 11 sheets.
First National Bank in Brookings, Certificates of Deposit, Jul. 17, 2009 5 sheets.
Summary of Commentary on Current Economic Conditions by Federal Reserve Districts, Jan. 1985, 44 pgs.
Board of Governors of the Federal Reserve System, Blank Form Letter, Apr. 22, 2004, 8 pgs.
FDIC Law, Regulations, Related Acts, 4000—Advisory Opinions, FDIC-93-35, Jun. 28, 1993, 2 sheets.
§204.134, 12 CFR Ch. 11 (Jan. 1, 2009 Edition), 2 sheets.
Money Fund $$ Moving to Bank Deposits, 6 *FRC Monitor*, Dec. 2003, 2 sheets.
Crane, P. & Krasner, Mike, *An iMoney Net Special Report*™, "Brokerage Cash Sweep Options: The Shift from Money Funds to FDIC-Insured Bank Deposit Accounts", Nov. 2004, 64 pgs.
The May 1998 Senior Financial Officer Survey, *Board of Govenors of the Federal Reserve System*, with Appendix A, 48 pgs.
Interest Rate Review © A Publication of *Meyer Weekly Interest Rate Survey*, A Look At Tiers, vol. II, No. 4, Apr. 1987, 6 pgs.
Interest Rate Review © A Publication of *Meyer Weekly Interest Rate Survey*, A Study of Historical Rates and Yields, vol. II, No. 6, Jun. 1987, 8 pgs.
Blank form letter to Oliver Ireland, Oct. 7, 1994, 1 pg.
Letter to L.P. Fleming, Jr. Esq., Feb. 7, 1995, 3 pgs.
Letter to James E. Creekman, Aug. 1, 1995, 4 pgs.
Letter to Brenda L. Skidmore, Aug. 30, 1995, 4 pgs.
Merrill Lynch & Co., Inc. Form 10-K405 (Annual Report (Regulation S-K, item 405)), Filed Mar. 14, 2002 for the Period Ending Dec. 28, 2001, with Schedules, Exhibits, and 2001 Annual Report, 248 pgs.
Merrill Lynch & You, "Financial Services The Way You Want, When You Want Them," Jan. 2000 4 Sheets.
Merrill Lynch, Information Statement Regarding Changes to Interest Rates on Deposits in the Merrill Lynch Banks, Document 64-14, Nov. 12, 2007, Case 1:07-cv-00318, 2 sheets.
Street Talk, "Merrill Moves CMA Cash to Bank", *On Wall Street*, Nov. 2000, 1 sheet.
Quest Insured Account, *QUESTessentials*, May 17, 1994; 3 sheets.
Quest Insured Account, *Information Statement*, 5 sheets.
OCC Insured Bank Deposit Account, Jun. 1993; 3 sheets.
Insured Bank Deposit Account, *Information Statement*, Jul. 1, 2000, 2 sheets.
Letter from Marilyn J. Hensle, announcing Salomon Smith Barney Bank Deposit Program.$^{SM}$, with Q&A, Aug. 16, 2000; 14 sheets.
Bank Deposit program Disclosure Statement, *Salomon Smith Barney*, 3 sheets.
FDIC Law, Regulations, Related Acts, 4000—Advisory Opinions, FDIC-87-25, Oct. 22, 1987, 1 sheet.
FDIC Law, Regulations, Related Acts, 4000—Advisory Opinions, FDIC-86-21, Jul. 23, 1986, 2 sheets.
The Merrill Lynch Cash Management Account, Financial Service, 18 pgs.
The Insured Savings Account, Issuer Guide to Offering MMDAs through Merrill Lynch, Jul. 1986; 27 pgs.
Insured Savings Account Fact Sheet, The Merrill Lynch Cash Management Account Financial Service, Apr. 1987, 11 pgs.
CMA Insured Savings Account Fact Sheet, Jul. 1994, 9 pgs.
A Guide to Your CMA Account, 1995, 19 pgs.
Insured Savings Account Fact Sheet, The Merrill Lynch Cash Management Account Financial Service, 1985, 4 pgs.
CMA Insured Savings Account Fact Sheet, 1997, 13 pgs.
Blackwell, Rob, Salomon's Sweep Plan Raises FDIC Fund Alarm, *American Banker*, Dec. 6, 2000, 2 pgs.
Insured Deposit Account (IDA), May 21, 1996, 11 pgs.
An Introduction to the Smith Barney *Insured Deposit Account*, 1995, 8 pgs.
Memorandum from Ted Hamilton re: Insured Deposit Account, Oct. 10, 1995, 13 pgs.
The Insured Deposit Account: "*Money in the Bank*", 1997, 2 sheets.
Merrill Joins Money Market Account, CMA; Broker Begins Testing With 12 Institutions, *Lexis Nexis*, Sep. 23, 1983, 4 pgs.
Form 8-K Merill Lynch & Co Inc—MER, Filed: Mar. 7, 2002, Report of unscheduled material events or corporate changes, 41 pgs.
Lawsuit by *Island Intellectual Property LLC and Intrasweep LLC* against *Deutsche Bank Trust Company Americas and Total Bank Solutions*, Complaint for Patent Infringement, Jury Trial Demanded, Feb. 23, 2010, Case No. 10 CV 1518, (Document 1).
Lawsuit by *Island Intellectual Property LLC and Lids Capital LLC* against *Deutsche Bank Trust Company Americas Total Bank Solutions*, Complaint for Patent Infringement, Jury Trial Demanded, Mar. 16, 2010, Case No. 10 CV 2268.
Quest Cash Management Services Memorandum to Tom Duggan, Re: Quest Insure Account, Nov. 16, 1993.
Bank Services, AMVest Financial ability for banker's and their clients, 6 pgs.
Federally "Insured Deposit Program", AmVest Capital, 1 sheet.
Federally Insured Deposit Program for Banks, AmVest capital, Jan. 15, 2010, 2 sheets.
Flow Chart, AmVest Capital, Dec. 9, 2009, 1 sheet.
Flow of Business for Federally Insured Deposit Program "FIDP", Deutsche Bank & Trust Company of the Americas, 1 sheet.
Participation Criteria for the FIDP, Federally Insured Deposit Program Participation Criteria, AmVest Capital, Jan. 15, 2010, 4 pgs.
Federally Insured Deposits/FAQ, Frequently Asked Questions on the Federally Insured Deposit Program, AmVest Capital, Jan. 15, 2010, 2 sheets.
Money Market Rates, Jan. 18, 2010, 2 sheets.
Money Market Rates, Jan. 6, 2010, 3 pgs.
Money Market Rates, Nov. 12, 2009, 3 pgs.

(56) References Cited

OTHER PUBLICATIONS

Scott & Stringfellow starts correspondent clearing business, News Release BB&T, Nov. 13, 2007, 2 sheets.
Curian Capital Introduces Custom Wealth Platform, Market Watch, Aug. 18, 2009, 3 pgs.
Ellie Behling, Curian Capital Introduces Custom Wealth Platform, Nov. 10, 2009, 3 sheets.
Curian Capital Introduces Custom Wealth Platform, Reuters, Aug. 18, 2009, 3 pgs.
Curian Capital Introduces Custom Wealth Platform, WSJ.com, Aug. 18, 2009, 3 pgs.
Curian Capital, LLC: Private Company Information, Business Week, Nov. 10, 2009, 3 pgs.
Curian Capital Introduces Custom Wealth Platform, Yahoo! Finance, Aug. 18, 2009, 3 pgs.
Bank Insured Deposit Program, D.A. Davidson & Co., Jan. 15, 2010, 2 sheets.
Bank Insured Deposit Program, D.A. Davidson & Co., Nov. 2, 2009, 2 sheets.
D.A. Davison & Co., Bank Insured Deposit Program, Disclosure Statement, 4 sheets.
First Southwest Company, First Southwest Company Bank Insured Deposit Program, Sep. 28, 2009, 11 pgs.
Manage Cash in an Online Stock Portfolio: Folio Investing, Jan. 15, 2010, 2 sheets.
Folio Investing: Brokerage Features >> Cash Investments>> FDIC. Plus Program, Jan. 14, 2010, 3 pgs.
Folio Investing: Brokerage Features >> Cash Investments>> Cash Seep Rates, Jan. 14, 2010, 2 sheets.
Folio Investing: Brokerage Features >> Cash Investments>> Cash Seep Banks, Jan. 15, 2010, 3 pgs.
Folio Investing: Brokerage Features >> Cash Investments>> Cash Sweep FAQ, Jan. 14, 2010, 3 pgs.
Folio Investing: Brokerage Features >> Cash Investments>> Cash Sweep FAQ, Jan. 18, 2010, 2 sheets.
Folio Investing: Brokerage Features >> Cash Investments>> Cash Sweep FAQ, Jan. 15, 2010, 2 sheets.
Folio Investing: Brokerage Features >> Cash Investments>> Sweep Terms & Conditions, Jan. 14, 2010, 2 sheets.
H.C. Denision Company, Sheboygan, WI, retrieved from internet Nov. 2, 2009; 1 sheet.
The LYRA Program with H.C. Denison Company, Sheboygan Wisconsin, Jan. 15, 2010, 2 sheets.
Current LYRA Program Rates, H.C. Denison Co., Jan. 15, 2010, 1 sheet.
Current LYRA Program Rates, H.C. Denison Co., Nov. 2, 2009, 1 sheet.
Current LYRA Program Banks, H.C. Denison Co. LYRA Program, Nov. 2, 2009, 1 sheet.
Authorization Form, H.S. Denison Company's Liquidity Insured Reserve Access Program (LYRA Program), Oct. 2009, 1 sheet.
Frequently Asked Questions for the LYRA Program, H.C. Denison Co., Jan. 15, 2010, 3 pgs.
Terms & Conditions for H.C. Denison Company's Liquidity Insured reserve Access Program (LYRA Program), Jan. 15, 2010, 4 pgs.
Terms & Conditions for H.C. Denison Company's Liquidity Insured reserve Access Program (LYRA Program), Nov. 2, 2009, 4 pgs.
The Hilliard Lyons Insured Deposit Program Disclosure Document, Hilliard Lyons, 10 pgs.
Current Rates, http://currentrates.hillard.com/ Jan. 6, 2010, 1 sheet.
Current Rates, http://currentrates.hillard.com/ Nov. 2, 2009, 1 sheet.
Current Rates, Market Info, Hilliard Lyons, Nov. 2, 2009, 4 pgs.
Legent Insured Deposit, www.legentclearing.co/mmf/phf, Nov. 2, 2009, 2 sheets.
Legent Insured Deposit Program—Summary of Terms and Conditions, Nov. 2008, 4 pgs.
Investment Account Application, Cleared Through Legent Clearing, 2 sheets.
Customer Agreement, Cleared Through Legent Clearing, 3 pgs.
Cash Management, Mesirow Financial—B/D and IA Services, www.mesirowfinancial.com/bdia/cas_mgmt.jsp, Jan. 15, 2010, 2 sheets.
Frequent Asked Questions: FDIC Sweep Program, optionsXpress, retrieved from internet Jan. 6, 2010; www.optionsxpress.com/welcom/faq/aq/fdc.aspx#rate.
Terms & Conditions for optionsXpress' Bank Insured Deposit Program, optionsXpress, 6 pgs.
Frequently Asked Questions: FDIC Sweep Program, optionsXpress, www.optionsxpress.com/welcom/faq/fdic.aspx, Jan. 6, 2010, 3 pgs.
Frequently Asked Questions: FDIC Sweep Program, www.optionsxpress.com/welcom/faq/fdic.aspx, Nov. 12, 2009, 2 sheets.
Money Fund and FDIC-Insured Bank Programs, Pershing, www.pershing.com/money_fund.htm, Jan. 15, 2010, 1 sheet.
Money Market Mutual Fund & FDIC-Insured Deposits Program Rates & Bank Lists, www.pershing.com/rates.html, Jan. 6, 2010m 6 pgs.
Money Market Mutual Fund and FDIC-Insured Deposit Program Rates & Bank List, Jan. 5, 2010; www.pershing.com/rates.html, 1 sheet.
Clearing firms used by the top independent broker-dealers, Investment News, www.investmentnews/article/20081214/CHART/812119919, Jan. 15, 2010, 4 sheets.
Objective investment advice Building trust, Wayne Strout, www.waynestrout.com/more)info, Jan. 18, 2010, 5 pgs.
Eagle sweep disclosure, first republic Securities Company, Jun. 1, 2009, 12 pgs.
The financial organizer, ProCash Plus, 12 pgs.
Insured deposit account program disclosure booklet, 16 pgs.
Update New FDIC product at IPI: Deutsche Bank Insured Deposit Program, Investment Professionals INC, Feb. 4, 2009, 11 pgs.
Insured cash account, http://lplfinancial.lpl.com/x68.xml, with LPL Financial insured cash account program disclosure booklet, LPL Financial Jan. 15, 2010, 23 pgs.
FAQs about the Deutsche Bank insured deposit program, Securities America, 3 pgs.
Insured deposit program, www.aigadvisorgroup.com/fdic/03.04.09.htm, Jan. 15, 2010, 3 pgs.
FlexInsured Account$^{SM}$, PrimeVest, http://primevest.com/flexInsured_account.asp, Jan. 14, 2010, 1 sheet.
FlexInsured$^{SM}$ Account disclosure statement, PrimeVest, 2009, 5 pgs.
An independent broker-dealer, Royal Alliance, http://www.royalalliance.com, Jan. 15, 2010, 1 sheet.
Brokerage products and services, www.steerneagee.com/sali/pcg/pages/products-services.aspx, Nov. 4, 2009, 2 sheets.
Terms and conditions for cash sweep, sterne agee, 2 sheets.
Client account agreement to Sterne Agee Clearing, Inc, Sterne, Agee & Leach, Inc and its authorized agents, Feb. 3, 2009, 5 pgs.
Valet a full service asset management account, http://valetaccount.com/visaTerms.ph9, Nov. 12, 2009, 6 pgs.
A sweet suite of business products brings our bank to you, AndroscogginBank, www.androscogginbank.com, 1 sheet.
We have your banking nees covered!, Greater Franklin, 2009, 2 sheets.
Insured MMA Seep Program, Circle Bank, www.circlebank.com/personalbanking)mma.aspx, Jan. 14, 2010, 2 sheets.
Insured MMA agency sweep agreement with rate sheet, Circle Bank, Dec. 3, 2009, 6 pgs.
Personal Banking—East West student plus program, East West Bank, www.eastwestbank.com/english/FDIC.asp, Nov. 10, 2009, 1 sheet.
Safe sound secure insured deposit programs, East West Bank, www.eastweatbank.com/English/SS_SIDPrograms.asp, Jan. 15, 2010, 2 sheets.
Money market insured deposit program, East West Bank, www.eastweatbank.com/English/MMarket_Insured.asp, Nov. 10, 2009, 1 sheet.
Insured deposit program bank list, www.eastweatbank.com/English/IDPB_list.htm, Nov. 10, 2009, 1 sheet.
FDIC information ofr United Commercial Ban, San Francisco, UCB, www.ibankunited.com/home.html, Nov. 12, 2009, 1 sheet.
Money market insured deposit program, Desert Community Bank, www.dck.org/MMarket_insured.html, Nov. 12, 2009, 1 sheet.

(56) References Cited

OTHER PUBLICATIONS

Insured deposit program bank list, www.dcbk.org/IDPB_list.htm, Nov. 12, 2009, 1 sheet.
Evolve and others team up with Deutsche Bank to provide higher FDIC coverage limits, www.insureddeposit online.com/content/view/31/86/, Nov. 12, 2009, 1 sheet.
Protect your cash portfolio!, http://insureddepositsonline.com, Jan. 15, 2010, 1 sheet.
Protect your cash portfolio!, www.insureddepositsonline.com/component/option.com_frontpage/Itemid,1/, Nov. 2, 2009, 1 sheet.
Participating bank analysis, Insured Deposit Program, Evolve Bank & Trust, www.insureddepositsonline.com/content/view/45/113/, Nov. 15, 2010, 1 sheet.
Frequently asked questions, Evolve Bank & Trust, www.insureddepositsonline.com/content/view/38/120/, Jan. 15, 2010, 3 pgs.
Strategic Partners, Insured Deposit Program, Evolve Bank & Trust, www.insureddepositsonline.com/content/view/37/114/, Jan. 15, 2010, 1 sheet.
Who the program Benefits, Insured Deposit Program, Evolve Bank & Trust, www.insureddepositsonline.com/content/view/43/115/, Jan. 15, 2010, 1 sheet.
How the program works, Insured Deposit Program, Evolve Bank & Trust, www.insureddepositsonline.com/content/view/47/112/, Jan. 15, 2010, 1 sheet.
This new bank is over 80 years old, Insured Deposit Program, Evolve Bank & Trust, www.insureddepositsonline.com/content/view/44/116/ Nov. 2, 2009, 1 sheet.
Temporary liquidity guarantee program, Evolve Bank & Trust, www.getevolved.com/index.php?option=com_content&task=view&id=67&itemid=263, Nov. 2, 2009, 1 sheet.
Contact us, Insured Deposit Program, Evolve Bank & Trust, www.insureddepositsonline.com/content/view/40/119/ Nov. 2, 2009, 1 sheet.
Over $12,5 million of FDIC deposit insurance available, Insured Deposit Program, Deutsche Bank, www.insureddepositsonline.com, 1 sheet.
How the program works, Insured deposit program, Evolve Bank & Trust, www.insureddepositsonline.com/content/view/47/112/, Nov. 4, 2009, 11 pgs.
Over $11 million of FDIC deposit insurance available, Insured Deposit Program, Deutsche Bank, www.insureddepositsonline.com, 1 sheet.
Bank insured agency deposit account program custodial account agreement, Evolve Bank & Trust, 8 pgs.
Insured deposit online, Deutsche Bank Insured Deposit Program, list of program banks, 2 sheets.
Insured deposit online, The Insured Deposit Program, Evolve Bank & Trust, retrieved from internet Apr. 3, 2009; 2 sheets.
Insured deposit online, Frequently asked questions, Evolve Bank & Trust, www.insureddepositsonline.com/content/section/3/71, May 14, 2009, 3 pgs.
Insured deposit online, The Insured Deposit Program, Evolve Bank & Trust, Apr. 3, 2009, 2 pgs.
Personal Banking, Insured Deposit Program, Pulaski Bank, www.pulaskibankstl.com/personal/checking-personalinsured.htm, Jan. 26, 2010, 1 sheet.
Personal Banking, Insured Deposit Program, Pulaski Bank, www.pulaskibankstl.com/personal/currentrates.htm Jan. 26, 2010, 2 sheets.
Up to $10 million of FDIC deposit insurance available, Insured Deposit Program, Pulaski Bank, 1 sheet.
Personal Banking, Insured Deposit Program, Pulaski Bank, www.pulaskibankstl.com/personal/checking-personalinsured.htm, Dec. 8, 2009, 1 sheet.
Personal Banking, Insured Deposit Program, Pulaski Ban, www.pulaskibankstl.com/personal/checking-personalinsured.htm, May 14, 2009, 1 sheet.
Up to $12.5 million of FDIC deposit insurance available, Insured Deposit Program, Pulaski Bank, 1 sheet.
Who can benefit from the insured deposit program?, Insured Deposit Program, Pulaski Bank, 2 sheets.
Insured agency deposit account terms and conditions, Pulaski Bank, 1 sheet.
Banks for DBTCA, 2 sheets.
Total Bank Solutions, Corporate overview, 1 sheet.
Total Bank Solutions, Deposit Institutions, www.totalbanksolutions.com/deposit.cfm, Jan. 15, 2010, 2 sheets.
Total Bank Solutions, Insured Deposit Program, www.totalbanksolutions.com/insured-deposit.cfm, Jan. 15, 2010, 3 pgs.
Total Bank Solutions, Source Institutions, www.totalbanksolutions.com/source.cfm, Jan. 15, 2010, 3 pgs.
Total Bank Solutions, FAQs, www.totalbanksolutions.com/faqs.cfm, Jan. 15, 2010, 2 sheets.
Total Bank Solutions, Insured Deposit Program, TBS overview, www.totalbanksolutions.com/overview.htm, Nov. 3, 2009, 1 sheet.
Total Bank Solutions, Insured Deposit Program, Total Bank Solutions, www.totalbanksolutions.com, Nov. 3, 2009, 1 sheet.
Total Bank Solutions, Insured Deposit Program, Bank Sweep Program, www.totalbanksolutions.com/insured-deposit.cfm, Jan. 15, 2010, 3 pgs.
Total Bank Solutions, Insured Deposit Program, Bank Sweep Program, www.totalbanksolutions.com/banksweep.htm, Nov. 3, 2009, 2 sheets.
Total Bank Solutions, Insured Deposit Program, Brokerage Sweeps, www.totalbanksolutions.com/brokersweep.htm, Nov. 3, 2009, 2 sheets.
Total Bank Solutions, Insured Deposit Program, Deposits, www.totalbanksolutions.com/Deposits.htm, Nov. 3, 2009, 1 sheet.
Total Bank Solutions, Insured Deposit Program, Bank Sweep Program, www.totalbanksolutions.com/banksweep.htm Mar. 6, 2009, 2 sheets.
Total Bank Solutions, Insured Deposit Program, Broker Sweep Program, www.totalbanksolutions.com/brokerweep.htm Mar. 6, 2009, 2 sheets.
Total Bank Solutions, Insured Deposit Program, Deposit, www.totalbanksolutions.com/deposit.htm, Mar. 6, 2009, 2 sheets.
Total Bank Solutions, Insured Deposit Program, Bank Sweep Program, www.totalbanksolutions.com/banksweep.htm, Mar. 6, 2009, 2 sheets.
Total Bank Solutions, Insured Deposit Program, www.totalbanksolutions.com, Mar. 6, 2009, 2 sheets.
Total Bank Solutions, Insured Deposit Program, Partners & Affiliates, www.totalbanksolutions.com/partners.htm, Sep. 11, 2009, 2 sheets.
Total Bank Solutions, Dennis C. Borecki, President, TBS Bank Deposit Account, 7 pgs.
Christopher McCrum, LinkedIn, http://74.125.93.132/search?=cache:5hs9cebUSjgJ:www.linkedin.com/pub/christopher-mccrum/ . . . , Nov. 2, 2009, 2 sheets.
Kentucky Bankers Association, Alternative for excess deposit coverage Free Webiners, http://209.235.145/cgi-bin/websuite/tcsassnwebsuite.pl? . . . , Nov. 2, 2009, 2 sheets.
Kentucky Bankers Association Detailed listening, http://member.kybanks.com/source/members . . . , Nov. 2, 2009, 1 sheet.
Letter from Ballard W. Cassady, Jr. President and Chief Executive Officer, Kentucky Bankers Association, Mar. 31, 2009, 1 sheet.
Oklahoma bankers association seeks extra security for deposits, http://findarticles.com/p/articles/mi_qn4182/is_20081128/ai_n31055289/, Nov. 2, 2009, 2 sheets.
Fast fax-back reply, Kentucky Bankers Association, 1 sheet.
Deutsche Bank, Deutsche Bank insured deposit program, Dec. 18, 2009; 3 pgs.
Deutsche Bank Insured Deposits, Bank list as of Dec. 18, 2009, 1 sheet.
DB Advisors, Deutsche Bank Group, Insured Deposit Program, 1 sheet.
Letter to Robert E. Feldman, Federal Deposit Insurance Corporation, re: Proposed rule on risk-based assessments (RIN#3064-AD35), Dec. 17, 2008, 4 pgs.
Deutsche Bank Alex. Brown insured deposit program (IDP), Dec. 1, 2009, 10 pgs.

(56) References Cited

OTHER PUBLICATIONS

CD's pass agencies as largest holding in MMFs: Repo plunges in sept., www.cranedata.us/archives/news/2009/10/, Nov. 3, 2009, 14 pgs.
Exhibit 1, Invalidity Chart: IMA and Insurance Plus Service Agreement, U.S. Patent No. 7,509,286, 21 pgs.
Exhibit 2, Invalidity Chart: Investors Money Account$^{SM}$ System, U.S. Patent No. 7,509,286, 26 pgs.
Exhibit 3, Invalidity Chart: Insured Money Account System, U.S. Patent No. 7,509,286, 26 pgs.
Exhibit 4, Invalidity Chart: U.S. Patent No. 4,985,833 (Oncken), U.S. Patent 7,509,286, 21 pgs.
Exhibit 5, Invalidity Chart: First City Bank of Texas' Insured Savings Program, U.S. Patent No. 7,509,286, 39 pgs.
Exhibit 6, Invalidity Chart: Quest Insured Account, U.S. Patent No. 7,509,286, 19 pgs.
Exhibit 7, Invalidity Chart: CIBC World Markets—Insured Bank Deposit Account, U.S. Patent No. 7,509,286, 16 pgs.
Exhibit 8, Invalidity Chart: Merrill Lynch CMA/ISA Service, U.S. Patent No. 7,509,286, 72 pgs.
Exhibit 9, Invalidity Chart: 1983 Fed Letter, U.S. Patent No. 7,509,286, 16 pgs.
Exhibit 10, Invalidity Chart: Merrill Lynch Banking Advantage Program ("MLBA Program"), U.S. Patent No. 7,509,286, 22 pgs.
Exhibit 11, Invalidity Chart: Merrill Lynch & You + MLBA Information Statement, U.S. Patent No. 7,509,286, 18 pgs.
Exhibit 12, Invalidity Chart: Smith Barney Insured Deposit Account, U.S. Patent No. 7,509,286, 22 pgs.
Exhibit 13, Invalidity Chart: Smith Barney Bank Deposit Program, U.S. Patent No. 7,509,286, 18 pgs.
Exhibit 14, Invalidity Chart: Alliance Insured Account, U.S. Patent No. 7,509,286, 16 pgs.
Exhibit 15, Invalidity Chart: Reserve's American Express Presentation, U.S. Patent No. 7,509,286, 16 pgs.
Exhibit 16, Invalidity Chart: U.S. Patent No. 7,376,606 (Jacobsen), U.S. Patent No. 7,536,350, 6 pgs.
Exhibit 17, Obviousness Combinations Chart, U.S. Patent No. 7,509,286, 351 pgs.
12 CFR Part 330; Simplification of Deposit Insurance Rules; Federal Register, vol. 63 Issue 90; May 11, 1998; pp. 1-31.
The Merrill Lynch Cash Management Account—Financial Service; Jan. 1985; 18 pages.
Lawsuit by *Island Intellectual Property LLC, et al.* v. *Deutsch Bank Trust Company Americas, et al.*; Defendant Deutsch Bank Trust Company Americas' Second Supplemental Responses to Double Rock's Interrogatories Nos. 2, 8 and 9, Jul. 2010, 65 pages.
Exhibit 2, Invalidity Chart: U.S. Pat. No. 4,985,833 (Oncken)—U.S. Pat. 7,668,771, Jul. 2010, 14 pages.
Exhibit 5, Invalidity Chart: Merrill Lynch Business Advantage Program—U.S. Pat. No. 7,668,772, Jul. 2010, 7 pages.
Exhibit 8, Invalidity Chart: Harken Financial Services Sweep Product—U.S. Pat. No. 7,668,771, Jul. 2010, 9 pages.
Exhibit 9, Invalidity Chart: Wayne Hummer—Insured Bank Deposit Program—U.S. Pat. No. 7,668,771, Jul. 2010, 12 pages.
Exhibit 10, Invalidity Chart: U.S. Patent Application Publication No. 2007/0043666 (Burdette), U.S. Pat. No. 7,668,771, Jul. 2010, 9 pages.
Letter to R.M. Zaitzeff, from W.W. Wiles, dated Jun. 22, 1983 (response to May 10, 1983 letter re: offering to MMDAs), 6 pages.
Letter to G.T. Schwartz, from O.I. Ireland, dated Jun. 22, 1988 (response to Dec. 18, 1987 letter re: proposed modifications to Merrill Lynch's CMA Program), 5 pages.
Information Statement, "Alliance Insured Account," Sep. 1999; 6 pages.
Invenstors MoneyAccount$^{SM}$ and Insurance Plus Service Agreement, attached Schedule A (List of Banks Participating in the Insurance Plus Service), IMAD Mar. 1994, 3 pages.
Investors Money Account$^{SM}$ (an FDIC-insured money market account), IMA-1 (Mar. 1994), 4 pages.

Investors MoneyAccount$^{SM}$, "The FDIC-Insured Money Market Investment with an Important Plus," IMA Oct. 1995, 2 pages.
1985 SEC No. Act. LEXIS 2756, Investment Company Act of 1940—Section 3(a)(1), 2(a)(36); Securities Act of 1933—Section 2(1), Nov. 29, 1985, Kemper Financial Services, Inc., 9 pages.
Insured Money Account Program Agreement and Disclosure Statement, (attached Schedule A—Deposit Account Terms), faxed Mar. 28, 2000; 10 pages.
First National Bank in Brookings, Certificates of Deposit [online] [retrieved on Jul. 17, 2009]. Retrieved from the Internet: Certificates of Deposit, <URL: http://web.archive.org/web/2000052412111/www.firstnb.com/cd.htm>; Multi-Bank CDs, <URL: http://web.archive.org/web/20000524132934/www.firstnb.com/mbcd.htm>, 5 pages.
Summary of Commentary on Current Economic Conditions by Federal Reserve Districts, Jan. 1985, 44 pages.
12 CFR Ch. II (Jan. 1, 2009 Edition), pp. 124-125.
Product Strategy, "Money Fund $$ Moving to Bank Deposits, Distributors Start to Install Bank Deposit Accounts to Replace Money Funds," 6 FRC Montior, Dec. 2003, 2 pages.
Board of Governors of the Federal Reserve System, "The May 1998 Senior Financial Officer Survey," May 1998, (attached Appendix A: Survey Questions and Responses; Appendix B: Glossary; Appendix C: Examples of Key Reserve Concepts), 48 pages.
Interest Rate Review, A Publication of the Meyer Weekly Interest Rate Survey, "A Look at Tiers," Apr. 1987, 6 pages, vol. 11, No. 4.
LexisNexis, The American Banker, "Merrill Joins Money Market Acocunt, CMA; Broker Begins Testing With 12 Institutions," Sep. 23, 1983, 4 pages.
Bent et al., Office Action, U.S. Appl. No. 10/071,053, with attached SB08, date considered Mar. 10, 2009, 2 pages.
Merrill Lynch & You, "Financial Services The Way You Want, When You Want Them," Jan. 2000, 16 pages.
Exhibit 1, "FA/FB Account 1997 First Transactions, TRX Types: PU, PP, TA, PT," Aug. 2003, p. 1-2.
Advertisement: Where Your Interest is?, Mutual Funds, Oct. 1997; 1 page.
Advertisement: It's 1997, Do You Know Where Your Interest Is?, Mutual Funds, Dec. 1993, p. 46.
USPTO Office Action, Interview Summary, U.S. Appl. No. 11/767,827, Date Mailed Sep. 23, 2009, 4 pages.
USPTO Office Action, Office Action Summary, U.S. Appl. No. 11/767,827, Date Mailed Jun. 5, 2009, 35 pages.
Service Mark Application, Applicant: Reserve Management Corporation, Mark: Reserve Insured Deposits, (attached Power of Attorney, Declaration, Drawing Page, Sep. 21, 2001, 6 pages.
Letter to C.R. Macedo, from R.L. Rainey, Re: Promotory Interfinancial Network, LLC, dated Jul. 22, 2008, (attached Attachments A-E), 35 pages.
Letter to C.R. Macedo, from R.L. Rainey, Re: Promotory Interfinancial Network, LLC, dated Oct. 16, 2008, (attached Attachments A-C), 22 pages.
Letter to C.R. Macedo, from R.L. Rainey, Re: Promotory Interfinancial Network, LLC, dated Feb. 23, 2009, (attached Exhibit A-B), 21 pages.
Merrill Lynch & Co., Inc., Form 10-K405 (Annual Report (Regulation S-K, item 405)), Filed Mar. 14, 2002 for the Period Ending Dec. 28, 2001, 248 pages.
Merrill Lynch, "Information Statement Regarding changes to Interest Rates on Deposits in the Merrill Lynch Banks," Nov. 12, 2007, 2 pages.
QUESTessentials, "Quest Insured Account," May 17, 1994, 3 pages.
Information Statement, "Quest Insured Account," (attached Appendix A), 5 pages.
OCC Insured Bank Deposit Account (attached are p. 2 of Quest for Value Funds Daily Data, Jun. 1993; OCC Insured Account Rate Table), 3 pages.
CIBC World Markets, "Insured Bank Deposit Account," Information Statement, Jul. 1, 2000, 2 pages.
Letter to Client, from M.J. Hensle, Re: Salomon Smith Barney Bank Deposit Program$^{SM}$, (attached Q&A: Important Information about the New Salomon Smith Barney Bank Deposit Program), Aug. 16, 2002, 14 pages.

(56) References Cited

OTHER PUBLICATIONS

Salomon Smith Barney, "Bank Deposit Program Disclousre Statement," 3 pages.
FDIC, FDIC Law, Regulations, Related Acts—4000—Advisory Opinions, Oct. 22, 1987, J. W. Via, Jr., Counsel [online] [Retrieved on Jan. 22, 2010]. Retrieved from the Internet: URL: <http://www.fdic.gov/regulations/laws/rules/4000-2560.html>, 1 page.
FDIC, FDIC Law, Regulations, Related Acts—4000—Advisory Opinions, Jun. 28, 1993, J. A. DiNuzzo, [online] [Retrieved on Jan. 22, 2010]. Retrieved from the Internet: URL: <www.fdic.gov/regulations/laws/rules/4000-8240.html>, 2 pages.
FDIC, FDIC Law, Regulations, Related Acts—4000—Advisory Opinions, Jul. 23, 1986, D. H. Jones [online] [Retrieved on Jan. 22, 2010]. Retrieved from the Internet: URL: <www.fdic.gov/regulations/laws/rules/4000-2120.html#fdic400086-21>, 2 pages.
Merrill Lynch—Pierce, Fenner & Smith, Inc., "The Merrill Lynch Cash Management Account®," Financial Service, Jan. 1985, 18 pages.
Merrill Lynch, "Insured Savings™ Account Fact Sheet," The Merrill Lynch Cash Management Account® Financial Service, 11 pages.
CMA, "A Guide to Your CMA Account," Jan. 1995, 38 pages.
American Banker, Salomon's Sweep Plan Raises FDIC Fund Alarm [online], Dec. 6, 2000 [retrieved on Apr. 13, 2009]. Retrieved on the Internet: <URL: http://www.americanbanker.com/printthis.html?id=2000120603YJGEZD>, 2 pages.
The Insured Deposit Account: "Money in the Bank," p. 5; Three Little Letters. Three Big Ways to Save in 1998, p. 4.
LexisNexis, The American Banker, Sep. 23, 1983, Merrill Joins Money Market Account, CMA; Broker Begins Testing With 12 Institutions, Byline: A. Arvan, 4 pages.
Merrill Lynch & Co Inc—MER, 10k Wizard, Form 8-K, "Report of Unscheduled Material Events or Corporate Changes," Filed Mar. 7, 2002, 51 pages.
Federal Reserve System, LEXSEE 51 FR 9632, "Definition of Deposit and Technical Amendments," Action: Final Rule, Mar. 20, 1986, 13 pages.
Federal Reserve System, LEXSEE 56 FR 15494, "Regulation D—Reserve Requirements of Depository Institutions," Action: Final Rule, Apr. 17, 1991, 5 pages.
Federal Reserve System, Part 201—Reserve Requirements of Depository Institutions (Regulation D)12 CFR Ch. II (Jan. 1, 2010 Edition), pp. 94-128, Pt. 204-Pt. 205.
Letter to G.T. Schwartz, from O.I. Ireland, dated Jun. 22, 1988, Re: response to letter of Dec. 18, 1987 regarding proposed modifications to Merrill Lynch's CMA Program, 5 pages.
Federal Reserve System, LEXSEE 47 FR 55207, "Reserve Requirements of Depository Institutions; Money Market Deposit Account," Dec. 8, 1982, Action: Final Rule, 5 pages.
Insured Bank Deposits™ Program Summary Information Statement, 11 pages.
Insured Bank Deposits™ Program Information Statement, (attached List of Eligible Program Banks, Effective May 9, 2002: New Account Application, Joint Account Agreement), 11 pages.
Wayne Hummer Investments, "Insured Bank Deposits™ Program, Frequently Asked Questions," 4 pages.
Memorandum to M. Peterson, J. Whitt, R. Wroten, E. Naumes, E. Deal, B. McCain, from J.E. Oncken, Jun. 15, 1990, Re: Insured Savings Update (with attachments), 7 pages.
Insured Savings, "Correspondent Agreement," including Exhibits A-D, 28 pages.
Insured Savings, "Project Team Meeting," Feb. 2, 1989, 21 pages.
Insured Savings, "Overview & Marketing Plan," Presented by: J.E. Oncken, Dec. 6, 1988, (including Exhibit A), 23 pages.
Letter to V.J. Best, from J.E. Oncken, dated Apr. 18, 1988, 2 pages.
Letter to M.L. Duke from K. Johnson, dated Dec. 27, 1989, (attached Insured Savings Correspondent Agreement, Exhibits A-D, letter to M.L. Duke from K. Johnson dated Nov. 21, 1989 and Account Information Sheet), 39 pages.
Memorandum to J. Oncken, J. Scurlock, B. Standefer, E. Piner, T. Cyr, from K. Johnson, dated Jul. 5, 1990, Re: Attached Insured Savings Letters (with attachments), 9 pages.
E.D.S.—First City Austin Electronic Mail, from J. Oncken, to T. Cyr, Re: Depository Levels at Insured Savings Depositories, Nov. 2, 1989, 1 page.
Cash Management Balance Monitoring Agreement and Memorandum from Ed Piner to Cash management Line of Business Representatives dated May 21, 1991(with attachments), 8 pages.
Merrill Lynch, Insured Savings Account Fact Sheet, The Merrill Lynch Cash Management Account® Financial Service, Jan. 1986, 4 pages.
Merrill Lynch Money Markets, Inc., Merrill Lynch Capital Markets, "The Insured Savings Account, Issuer Guide to Offering MMDAs through Merrill Lynch," Sep. 1986; 36 pages.
Merrill Lynch, The Merrill Lynch Capital Builder$^{SM}$ Account Financial Service, Insured Savings$^{SM}$ Account Participating Depsitory Institutions, 1996, 2 pages.
Insured Deposit Account, May 21, 1996, 14 pages.
An Introduction to the Smith Barney Insured Deposit Account, 8 pages.
Smith Barney Inc. Capital Markets, Dept Origination Group Memo, to J. Mandelbaum, from T. Hamilton, cc: R. Holloman, H. Bald, S. Becton, Re: Insured Deposit Account, Oct. 10, 1995; Smith Barney Inc. Capital Markets, Debt Origination Group Memo, to B. Holloman, from T. Hamilton, cc: W. Heinzerling, H. Morris, COPs, Re: New Product Proposal for Insured Deposit Account, Sep. 18, 1995, 2 pages.
Insured Deposit Account, Product Description for the Investor, Draft as of Sep. 20, 1995, 8 pages.
Modeling charts used in Sep. 2010; 5 pages.

* cited by examiner

SYSTEM, METHOD AND PROGRAM PRODUCT FOR MODELING FUND MOVEMENTS

CROSS-REFERENCE TO RELATED PATENT APPLICATIONS

This application claims priority from U.S. provisional Application 61/546,730, filed Oct. 13, 2011. This application is incorporated herein by reference in its entirety.

FIELD OF INVENTION

The present invention generally relates to a system, method and program product for modeling fund movements, such as for sweep programs, and/or for predicting available capacity in a deposit system.

SUMMARY

In embodiments, a method, system and program product are disclosed, the method comprising: accessing, using one or more computers, one or more electronic databases, stored on one or more computer-readable media, comprising: (i) aggregated account information for a plurality of government backed-insured and interest-bearing aggregated deposit accounts held in a plurality of depository institutions in a program, wherein funds from a plurality client accounts are held in the aggregated deposit accounts in the depository institutions in the program, the aggregated account information for a respective one of the aggregated deposit accounts comprising a balance of funds held in the respective aggregated deposit account; and (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account; (iii) depository institution information for respective of the depository institutions in the program, the depository information for a respective one of the depository institutions comprising a capacity cap for funds held therein from the program. In embodiments, for each respective one of a plurality of depository institutions participating in the program performing the steps: obtaining, using the one or more computers, for a high stratification a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions; obtaining, using the one or more computers, for a second stratification a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range; obtaining, using the one or more computers, for a lowest stratification a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range has a lower upper limit than the second range. In embodiments, the further steps are performed of calculating or having calculated, using the one or more computers, for each of the respective depository institutions, a respective total balance in the program, based at least in part on the total high stratification balance, the total second stratification balance, and the total lowest stratification balance, held in the respective depository institution; calculating or having calculated, using the one or more computers, a respective excess capacity for each of the respective depository institutions based at least in part on a difference between the capacity cap for the respective depository institution and the total balance for the respective depository institution; and modifying, based at least in part on the respective excess capacities of the respective depository institutions, one or more of parameters selected from the group of a number of client accounts, additional client account funds, a total number of the depository institutions participating in the program, and the capacity caps for one or more of the depository institutions.

In embodiments, further steps may be performed of allocating, using the one or more computers, funds of each of the high stratification client accounts, the second stratification client accounts and the lowest stratification client accounts across one or more of the depository institutions to obtain government backed insurance for the funds; summing for each of the depository institutions, using the one or more computers, the funds of the high stratification client accounts allocated to the respective depository institution, to obtain the total high stratification balance for the respective depository institution; summing for each of the depository institutions, using the one or more computers, the funds of the second stratification client accounts allocated to the respective depository institution, to obtain the total second stratification balance for the respective depository institution; and summing for each of the depository institutions, using the one or more computers, the funds of the lowest stratification client accounts allocated to the respective depository institution, to obtain the total lowest stratification balance for the respective depository institution.

In embodiments, further steps may be performed of determining, using the one or more computers, a current respective percentage of the high stratification client accounts, a current respective percentage of the second stratification client accounts, and a current respective percentage of the lowest stratification client accounts, relative to a total number of client accounts managed by the program, and determining an average balance of client accounts for the high stratification client accounts, an average balance of client accounts for the second stratification client accounts, and an average balance of client accounts for the lowest stratification client accounts; and modifying, using the one or more computers, one or more of the respective percentage and/or the average balance of client accounts in one or more of the stratifications to determine a need to change capacity caps for one or more of the depository institutions, and/or a need to change a number of depository institutions in the program, and/or a government backed insurance limit for the program, so that a change in the percentage of the client accounts in one or more of the stratifications and/or a change in the average balance of client accounts in one or more of the stratifications will receive government-backed insurance.

In embodiments, further steps may be performed of determining, using the one or more computers, a current respective percentage of the high stratification client accounts, a current respective percentage of the second stratification client accounts, and a current respective percentage of the lowest stratification client accounts, relative to a total number of client accounts in the program; determining an average balance of client accounts for the high stratification client accounts, an average balance of client accounts for the second stratification client accounts, and an average balance of client accounts for the lowest stratification client accounts; and calculating a projected new total balance of funds managed by the program for a given number of new client accounts to be added, based at least in part on the given number of new client accounts, the current number of client accounts, the percentage of the high stratification client accounts and the average balance for the high stratification client accounts, the percentage of the second stratification client accounts and the average balance for the second stratification client accounts, and the percentage of the lowest stratification client accounts and the average balance for the lowest stratification client accounts.

In embodiments, further steps may be performed of modifying one of the current respective percentages of the client accounts in the stratifications or the average balance of the client accounts in one or more of the stratifications; computing the other of the one or more of the stratifications or the average balance of client accounts in the respective stratifications using algorithms embedded in a first spreadsheet; and computing the excess capacity for respective ones of the depository institutions using algorithms embedded in a second spreadsheet.

In embodiments, further steps may be performed of revising one or more selected from the group of capacity cap, insurance limit for the program, and number of depository institutions participating in the program, based at least in part on the determining step; and calculating an allocation of funds, using the one or more computers, among the government backed insured, interest bearing aggregated deposit accounts of the depository institutions, based at least in part on the capacity cap, insurance limit for the program, and number of depository institutions participating in the program.

In embodiments, further steps may be performed of allocating, using the one or more computers, amounts of funds from multiple of the client accounts among multiple of the recipient depository institutions, so that a respective balance of funds allocated to each of the aggregated deposit accounts of the depository institutions substantially matches a sum of the respective balances of funds from the multiple of the respective client accounts allocated to this respective aggregated deposit account; and updating, using the one or more computers, one or more of electronic databases to update the respective balances of client account funds held in one or more of the recipient depository institutions in one or more aggregated deposit accounts therein based on the allocations.

In embodiments, further steps may be performed of generating and making accessible, using the one or more computers, transfer data based at least in part on the allocations.

In embodiments, further steps may be performed of generating data for a table, using the one or more computers, that lists for each of a plurality of the stratifications, an upper limit for the respective stratification, a lower limit for the respective stratification, a number of clients in the respective stratification, an average total balance of funds in the stratification, a percentage of a total balance managed by the program that is represented by the average total balance of funds in the respective stratification; and generating and providing or making accessible display data, using the one or more computers, based at least in part on the data in the table.

In embodiments, further steps may be performed of generating data for a table, using the one or more computers, that lists for each of the depository institutions participating in the program, the capacity cap, a measure derived from the total high stratification balance, a measure derived from the total second stratification balance, a measure derived from the total lowest stratification balance, a measure of the respective total balance in the program for the respective depository institution, and the excess capacity for the respective depository institution; and generating and providing or making accessible display data, using the one or more computers, based at least in part on the data in the table. In embodiments, the measure may be an average. In embodiments, measure may be the current total stratification balance for the respective stratification.

In embodiments, machine-executable instructions/programming code implementing algorithms embedded in Excel or other spreadsheets to generate tables.

In embodiments, system, is disclosed comprising: one or more computers configured to perform the following steps: accessing, using one or more computers, one or more electronic databases, stored on one or more computer-readable media, comprising: (i) aggregated account information for a plurality of government backed-insured and interest-bearing aggregated deposit accounts held in a plurality of depository institutions in a program, wherein funds from a plurality client accounts are held in the aggregated deposit accounts in the depository institutions in the program, the aggregated account information for a respective one of the aggregated deposit accounts comprising a balance of funds held in the respective aggregated deposit account; (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account; (iii) depository institution information for respective of the depository institutions in the program, the depository information for a respective one of the depository institutions comprising a capacity cap for funds held therein from the program. In embodiments, for each respective one of a plurality of depository institutions participating in the program, performing the steps: obtaining, using the one or more computers, for a high stratification a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions; obtaining, using the one or more computers, for a second stratification a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range; and obtaining, using the one or more computers, for a lowest stratification a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range has a lower upper limit than the second range. In embodiments, the further steps may be performed of calculating or having calculated, using the one or more computers, for each of the respective depository institutions, a respective total balance in the program, based at least in part on the total high stratification balance, the total second stratification balance, and the total lowest stratification balance, held in the respective depository institution; calculating or having calculated, using the one or more computers, a respective excess capacity for each of the respective depository institutions based at least in part on a difference between the capacity cap for the respective depository institution and the total balance for the respective depository institution; and modifying, based at least in part on the respective excess capacities of the respective depository institutions, one or more of parameters selected from the group of a number of client accounts, additional client account funds, a total number of the depository institutions participating in the program, and the capacity caps for one or more of the depository institutions.

BRIEF DESCRIPTION OF THE DRAWINGS

The above and related objects, features and advantages of the present invention, will be more fully understood by reference to the following detailed description of the exemplary embodiments of the present invention, when taken in conjunction with the following exemplary figures, wherein:

FIGS. 5A and 5B comprise an Excel spreadsheet modeling chart in accordance with embodiments of the invention.

DETAILED DESCRIPTION

In embodiments, an allocation modeling tool is disclosed which allows a provider of deposit sweep and fund transfer services to predict program capacity based on different actual and/or hypothetical scenarios.

In embodiments, the allocation tool uses as an input the recipient depository institution information and client information to perform modeling.

Figure 1A:
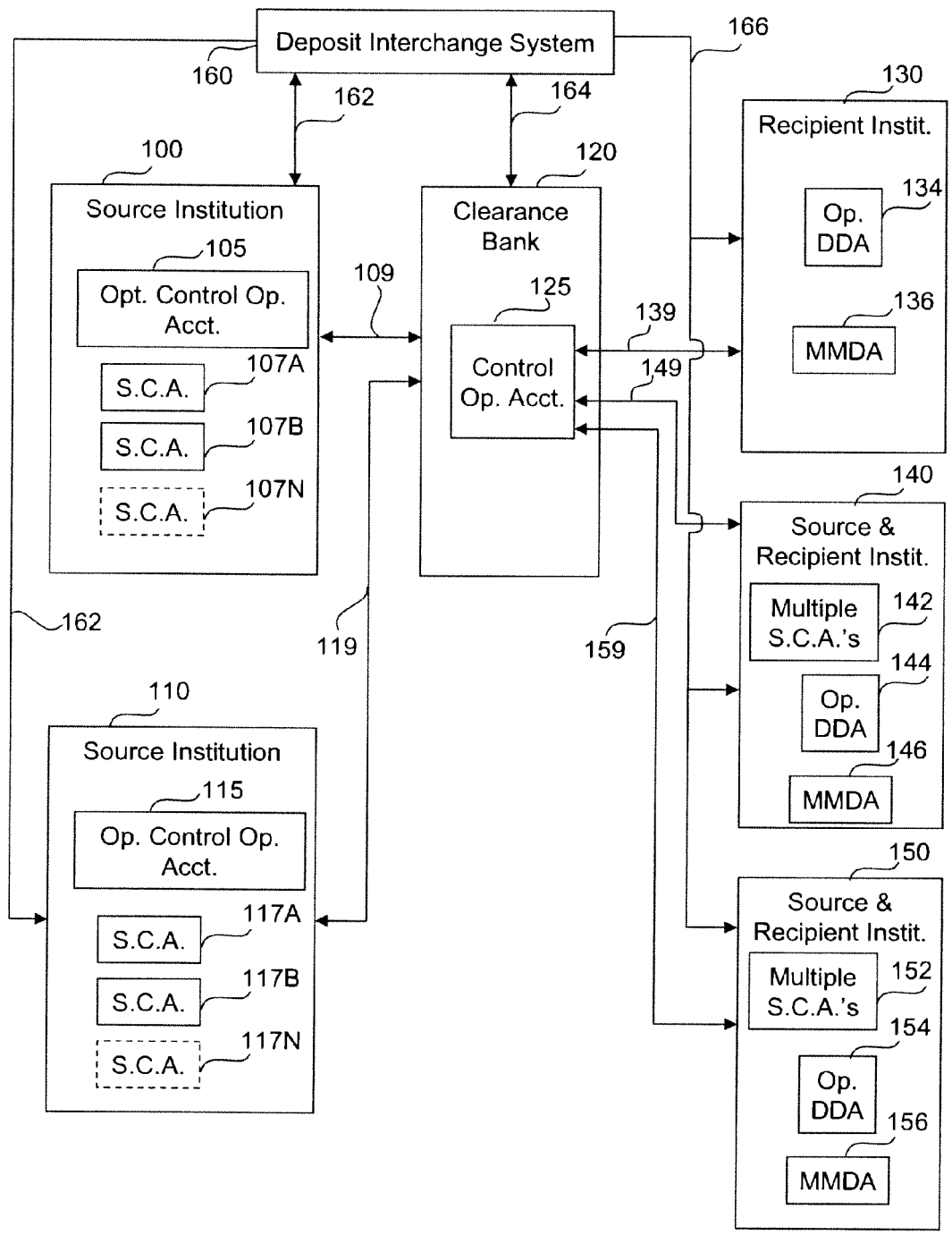
FIG. 1A is a schematic block diagram of an exemplary system in accordance with embodiments of the invention.
Figure 1B:
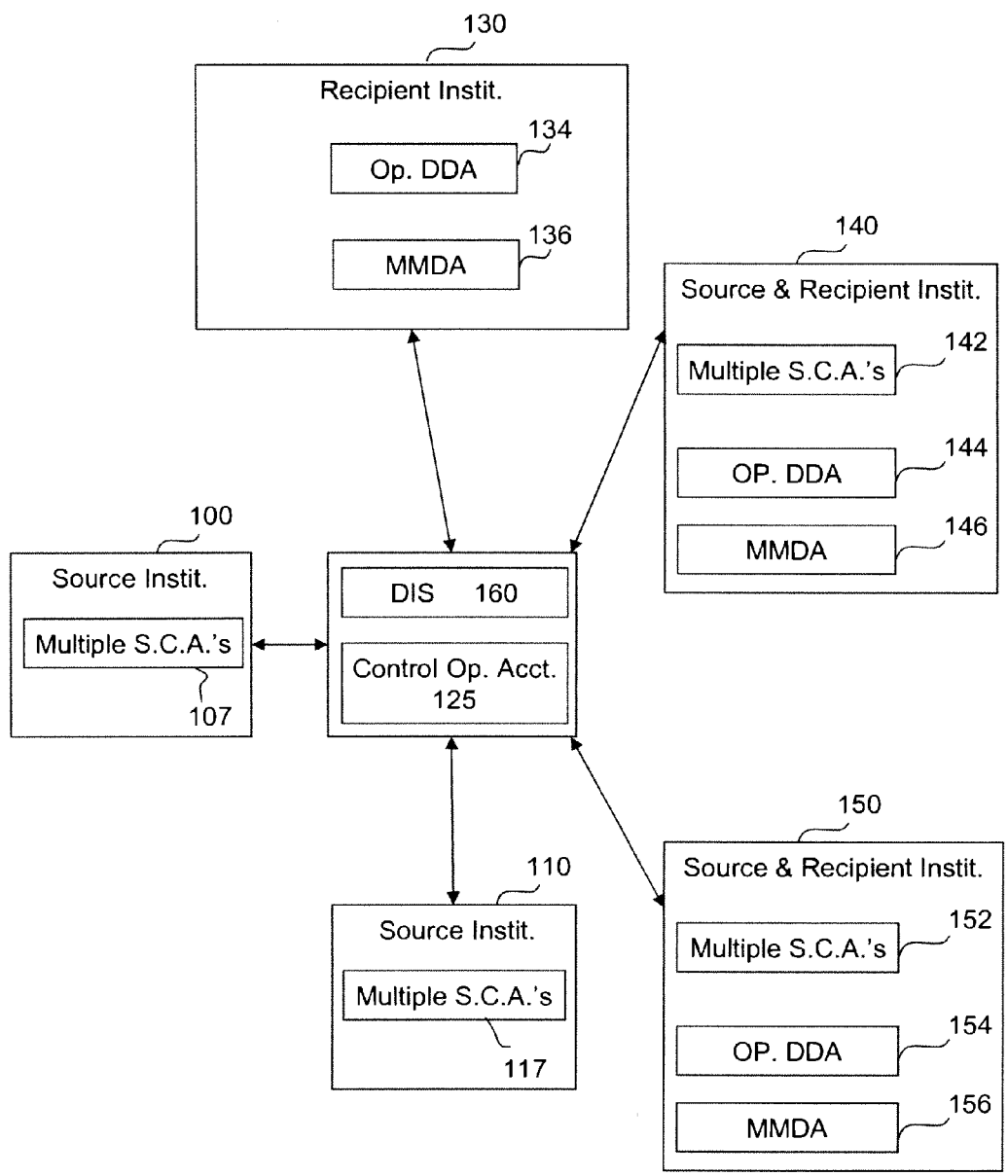
FIG. 1B is a schematic block diagram of an exemplary system in accordance with embodiments of the invention.
Figure 1C:
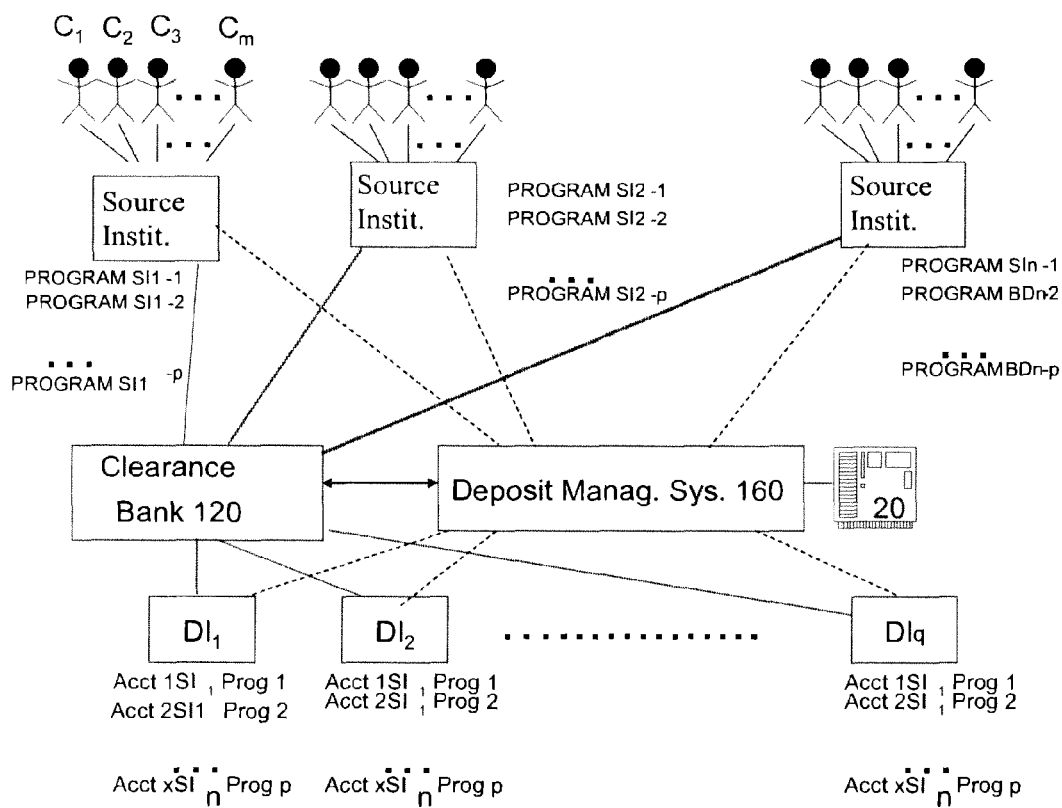
FIG. 1C is a schematic flow chart of an exemplary method in accordance with embodiments of the invention

In a typical deposit sweep system, one or more financial entities FE may participate in a program, which comprises source institutions and recipient depository institutions. In embodiments, there may also be intermediate institutions. FIGS. 1A, 1B and 1C illustrate exemplary embodiments of various kinds of deposit sweep programs. As discussed below, some financial institutions may play one or more roles, or multiple financial institutions may play the same role.

Source institutions may, by way of example, be banks, credit unions, registered investment advisors, broker dealers, asset managers, and other types of financial institutions, to name a few. Typically, the source institutions are the institutions that interact with the clients that are placing or authorizing the respective clients' funds to go into and/or be managed by the deposit management system. Note that a source institution may comprises a clearing institution for other source institutions, an investment advisors, and/or an intermediary for other source institutions. These terms will be discussed below.

Recipient depository institutions may be typically banks or other types of deposit institutions whose accounts are backed by some form of insurance, such as government-backed insurance, like Federal Deposit Insurance Corporation (FDIC) insurance in the case of banks, or the National Credit Union Share Insurance Fund (NCUSIF) in the case of credit unions. However, note that in embodiments some recipient depository institutions may hold financial instruments that are not insured.

One or more intermediary institutions may be used to facilitate the movement of funds between the source institution(s) and the recipient depository institution(s), and/or to perform various recordkeeping functions. Such intermediaries may perform record keeping and/or fund transfer functions, and may include a bank or clearance bank through which fund transfers may be facilitated, a clearing firm, an administrator that performs recordkeeping functions and/or provides data to facilitate fund transfers, and/or other entities that perform fund transfer or recordkeeping functions. Note that one or multiple entities may fulfill a single function or role and/or multiple functions or roles.

With respect to some types of source institutions, the source institution itself may clear its own client accounts or it may use another entity to clear its client accounts. If a source institution is a clearing entity, it may provide clearing services to other source institutions, such as broker-dealers, banks, financial advisors, to name a few. Such entities for which clearing services are performed by another entity are sometimes referred to as "correspondents." Under some guidelines, when a clearing entity is used to clear funds for one or more correspondents, the funds of the clearing entity and the one or more correspondents may be held together in an aggregated account such as an interest-bearing aggregated money market deposit account or an aggregated demand deposit account. In embodiments, the funds from each different correspondent may be segregated in a separate aggregated account.

In some deposit sweep systems, one entity may play the role of one or more of the above. For example, a source institution, such as a bank, may also be a recipient depository institution. Similarly, a source institution, like a broker-dealer, or a bank, may be affiliated with one or more of the recipient depository institutions. In embodiments, there may be no affiliation between the institutions, or an affiliation between only some of the institutions.

Further, an administrator for the system may also be either a source institution, a recipient depository institution, a clearance bank, or another entity participating in deposit sweep functions. Further, in embodiments one entity may play part of one role and another part of another role. For example, when a bank is an intermediary it may be used to facilitate the transfer of funds. But it also may be a source and/or a recipient depository institution. Such a bank, may or may not use a separate record keeper.

Likewise, a particular program may have one source institution or multiple source institutions. Similarly, a particular program may have one recipient depository institution or multiple recipient depository institutions.

A "program" comprises a deposit arrangement to make available government-backed insurance through one or more aggregated accounts, wherein such program may provide government-backed insurance in an amount greater than an insurance limit for funds held in a single depository institution, through the use of a plurality of government backed insured and interest-bearing aggregated deposit accounts, with the aggregated deposit accounts in different program depository institutions. Each program may include one or more insured deposit products, with one or more of the programs having different attributes, such as different insurance levels, different tier options and rates paid, and services, to name a few. In embodiments, the rates paid may be determined by such factors as the balance in the client's insured account, or may be determined by the total value of the client's brokerage account, or may be determined by the total value of a group of accounts for a particular household together, or may be determined by relationship pricing based on the number of products a client uses though a source institution (SI) or affiliated source institutions, to name a few. Each source institution may have a plurality of client accounts, S.C.A.'s, that invest in particular products that make up part of a particular program. The client accounts, S.C.A., $C_1, C_2, C_3, C_m$, may be for individuals or corporations or government entities, or any other form of entity. Thus, for example, as illustrated in FIG. 1C, a source institution may manage or participate in a number of programs PROGRAM SI1-1, PROGRAM SI1-2, . . . PROGRAM SI1-p, where each client account, S.C.A., of the source institution S11 invests in at least one of the products under at least one of the programs PROGRAM SI1-1-PROGRAM SI1-p. Examples of different kinds of programs that may be offered, include a program with cash management services, a program for high net worth individuals with a higher minimum balance requirement, a program paying a lower rate and offering more services, a no frills program with a higher rate and no services where for a fee, the client may get other services, to name a few. Note that in embodiments, a program may also manage some client funds that are held in investment instruments that are not government-backed insured instruments.

Each source institution may have one or more programs of its own, and/or may participate in one or more programs of other institutions. Each client may participate in one or more programs from a single source institution, or may participate in several different programs.

The present invention may be used in the context of these exemplary or other fund movement systems.

In the description to follow, the term "client account" refers to an account associated with client funds, such as, for example, consisting of funds of the client designated or determined for management by the deposit management system, to be described.

Referring to FIG. 1A, the present invention generally relates to a system, method and/or program product for processing one or more deposit sweep or other fund transfer programs wherein a deposit management system 160 receives/sweeps funds from some source institutions 100, 110, and deposits funds back to one or more other source institutions 140-150, e.g., financial institutions, such as banks, and allocates funds among recipient depository institutions. In embodiments. some of these financial entities (100, 110) may operate as only source institutions, some of these financial entities may operate as only recipient depository institutions (130), and some of these financial entities may operate as both source institutions and recipient depository institutions (140, 150). Embodiments of this invention may have application to financial institutions that operate as both source institutions and also operate as recipient depository institutions, or operate only as recipient depository institutions and hold one or more government-insured interest-bearing aggregated deposit accounts. In embodiments, the funds may be deposited to and redeemed from one or more government-insured interest-bearing aggregated deposit accounts held in these financial institutions. In embodiments, a portion of the client account funds may also be deposited in other investment vehicles held in or directed by another respective recipient depository institution. Although embodiments of the present invention apply to operations with respect to financial institutions that operate as recipient depository institutions and hold one or more of government backed insured and interest bearing aggregated accounts, other source-only institutions 100 and 110, such as broker-dealers, financial advisors, intermediaries and/or other financial institutions, may also be part of the system 160, and may supply funds to be used in the process.

The deposit management system 160, comprises one or more computers, which may be configured to perform one or more of the following tasks:

(a) obtaining information regarding transactions applied to client accounts at source institutions 100, 110, 140-150, in a particular time period, such as over a particular time range, such as a range of hours, a day, a week, a month or the like. Such information may be in the form of detailed individual transactions, summary transactions or combinations thereof. Transactions may include sweeps, checks, transfers to cover transactions, e.g., securities transactions or margin accounts, debit card transactions, credit card transactions, on-line bill paying transactions, touch tone bill paying data, ACH transactions, wire transactions, to name a few. In embodiments, such information may be obtained directly by processing one or more transactions, or indirectly by other means. In embodiments, such information may be received electronically in the form of a sweep file or other data transmission which may contain either detailed or summary information for each client account which has activity in a given time period. In embodiments, such information may be received in person, over the telephone, by fax or other distribution means, and entered by keying or scanning such information. One or more items of information may be obtained by one or more of these exemplary methods.

(b) obtaining net transfer information associated with the movement of funds from and/or to source institutions, clearance institutions and/or recipient depository institutions.

Such net transfer information may be received electronically either in connection with a sweep file or data transmission, and/or separately, and/or received in person, and/or over the telephone, by fax or other distribution means and entered by keying or scanning such information, and/or by calculating or by verifying the net transfer information by the deposit management system 160. The net transfer information may reflect one net transfer per institution, and/or multiple net transfers reflecting each separate transfer to be conducted between institutions. For example, a net transfer could reflect a single net transfer between a source institution and a clearance institution to reflect transactions occurring during a particular time period, such as a range of hours, a day, a week, a month or the like. A net transfer could also or alternatively reflect a plurality of net transfers between a clearance institution and different recipient depository institutions associated with a particular transfer of funds relating to transactions occurring during one or more particular time periods.

(c) obtaining first allocation information associated with the allocation of funds among various recipient depository institutions. The allocation information may be received electronically either in connection with a sweep file or data transmission and/or separately, received in person, over the telephone, by fax or other distribution means and entered by keying or scanning such information, and/or may be calculated and/or may be verified by the deposit management system 160. The allocation information may be calculated based at least in part on one or more criteria. Examples of such criteria are set forth in U.S. Pat. No. 7,509,286, U.S. Pat. No. 7,752,107, and U.S. application Ser. No. 12/638,544, filed on Dec. 15, 2009, which are hereby incorporated by reference in their entirety. The allocation information may be used in generating the net transfer information to and/or from recipient depository institutions.

(d) generating recommended and/or actual withdrawal/ transfer amount(s) and/or instructions and/or deposit/transfer amount(s) and/or instructions to and/or from source institutions and/or recipient institutions. In embodiments, the system may generate recommended and/or actual instructions to be carried out by source institutions, agents of source institutions, intermediaries and/or others. In embodiments, intermediaries may up-load or otherwise provide instructions to be approved, executed and/or performed by others.

(e) obtaining allocation information regarding funds held in particular aggregated deposit accounts at recipient depository institutions associated with particular client accounts. In embodiments, the allocation information may be calculated based at least in part on one or more criteria. Note that the order of the foregoing steps is not limiting on the invention.

As noted, each of a plurality of these source institutions that are also recipient depository institutions 130-150n in the deposit sweep management system 160 holds one or more interest-bearing aggregated deposit accounts 136, 146 and 156 (for example, an aggregated money market deposit account, e.g., MMDA), for holding funds associated with a plurality of clients accounts in the program. In embodiments, these aggregated deposit accounts may be insured, for example with government-backed insurance, such as Federal Deposit Insurance Corporation (FDIC) insurance in the case of, e.g., a bank, or National Credit Union Share Insurance Fund (NCUSIF) insurance in the case of, e.g., a credit union, to name a few. Note that in embodiments, some of the funds managed by the program may be held in other investment vehicles, such as one or more money funds, or one or more aggregated investment vehicles that are not insured.

In some embodiments, one or more of the recipient depository institutions with the interest-bearing aggregated deposit accounts 136, 146, 156, may also hold an optional transaction account 134, 144, 154, such as a demand deposit account (DDA) or a NOW account, for facilitating withdrawals from the interest-bearing aggregated deposit account 136, 146, 156, in the respective recipient depository institutions.

In an exemplary embodiment shown in FIG. 1A, information for a plurality of client accounts (107A, 107B, . . . 107N) associated with a source institution 100 is held in one or more databases, with each of a plurality of the respective client accounts held on behalf of different clients and comprising client funds managed by a program. In embodiments, the deposit management system 160 may maintain or have maintained electronic records corresponding to client accounts (107A, 107B, . . . 107N) in the one or more databases. In embodiments, a respective source institution 100 may have one or more control operating accounts. In embodiments, the control operating account 105 may be at the respective source institution 100. Alternatively or in addition, in embodiments, the control operating account for the source institution 100 may be at another financial institution, such as a clearance account 125 held in a clearance bank 120. In embodiments, funds may flow in and out of the client accounts (107A, 107B, . . . 107N), directly and/or via the control operating account 105 and/or via control operating account 125. Alternatively, in embodiments, the funds in one or more of the client accounts may flow directly between institutions without an internal and/or an external control operating account. In embodiments, fund flows may be via a combination of one or more control operating accounts and also directly between institutions without using an external control operating account. Note that this description may apply to all of the source institutions, including the source institutions 140-150n that are also recipient depository institutions.

FIG. 1B illustrates another exemplary embodiment of the overall system in a hub and spoke context, for ease of explanation. At the center or hub is the deposit management system 160, and a control operating account 125. The deposit management system 160 and control operating account 125 may be at the same or different institutions, consistent with the present invention. The source institutions 100 and 110 are illustrated as spokes, with each source institution comprising client accounts, as reflected in FIG. 1A. One or more of the source institutions may optionally also include a control operating account associated therewith in embodiments. The control operating account associated with the respective source institution may be at the respective source institution, or at another institution affiliated with the source institution, or at a different institution entirely. A source institution may also be the same as or affiliated with one or more institutions associated with the deposit management system 160, the control operating account 125, or a recordkeeper for the system.

Institutions 130, 140, and 150 are illustrated as yet other spokes in the figure. Financial institution 130 operates as a recipient depository institution comprising an MMDA 136 and an optional aggregated transaction account 134. Financial institutions 140-150 operate as source institutions in some fund transfers, and recipient depository institutions in other fund transfers. Institution 140 comprises multiple client accounts 142, as well as an optional aggregated transaction account 144, and an MMDA 146. Likewise, institution 150 comprises multiple client accounts 152, as well as an optional aggregated transaction account 154, and an MMDA 156. In embodiments, the deposit management system 160 may keep electronic records associated with the multiple client accounts 142, 152, and the like, or may access such records.

Other forms of deposit sweep systems may also be used with the present invention.

As an illustrative operation, a source institution may generate or receive fund transfer data. Note that how and where this data is generated is not limiting on the invention. For example, the fund transfer data may be generated by respective source institutions, and/or by the deposit management system 160 as part of a reallocation of funds among recipient depository institutions. See the discussion of examples of the fund transfer data obtained by the deposit management system 160, above.

Fund transfer data may comprise or may be based at least in part on data, such as one or more sweep reports, or one or more payment entity reports, or fund reallocation data, or client communications, and may be received electronically either in connection with a sweep file or data transmission and/or separately, and/or may be received in person, and/or over the telephone, by fax or other distribution means and entered by keying or scanning such information, and/or may be calculated or verified by the deposit management system 160. For example, the fund transfer data may represent information about respective client funds to be transferred out of the deposit management system or to be transferred to recipient depository institutions in the deposit management system. In embodiments, this information may comprise a net for each client account, of client transactions crediting/transferring funds to, and/or debiting/transferring funds from, the respective client account, determined over a period of time. In embodiments, the transfer amount may be verified, such as using the one or more computers of the deposit management system 160. Note that the amount of funds swept from a client account may or may not match the transaction amounts. For example, the sweep amount may comprise some amount above a threshold amount.

In embodiments, the one or more computers of the deposit management system 160 may be configured with programming code to select one or more of the recipient depository institutions, e.g., banks 130-150n, in the deposit management system 160, for deposits/transfers and/or withdrawal/transfers, based at least in part on the fund transfer data and on one or more parameters. In embodiments, the allocation may be based, at least in part, on the fact that a given recipient depository institution has contributed source funds to the deposit management system (when operating as a source institution). In embodiments, the allocation may be based, at least in part, on an amount of source funds contributed by the given prospective recipient depository institution (when operating as a source institution from its client accounts and/or other of its source institution funds), to interest-bearing aggregated deposit accounts or other accounts associated with the program. In embodiments, such reciprocity may be one-to-one. In embodiments, such reciprocity may be based at least in part on something other than one-to-one, and may be determined using an algorithm, or other means of determining the amount. In embodiments, the algorithm may be implemented electronically. In embodiments, it may be manually applied. Also, the reciprocity may only be applied for funds of a given set of client accounts, or for a given type of client accounts, such as accounts with municipal or other governmental funds. Also, the reciprocity may be applied only for selected source and/or recipient depository institutions. Examples of such arrangements are taught, for example, in U.S. Pat. No. 7,536,350, and application Ser. No. 11/641,046, filed Dec. 19, 2006, which are hereby incorporated by reference in their entirety for all purposes.

Another parameter that may be used to select one or more recipient depository institutions and to determine and allocate deposit/transfer amounts and/or withdrawal/transfer amounts, may be an amount of funds of a given client account already held in the particular recipient depository institution in the management system relative to a deposit limit associated with available insurance protection, such as a government-backed insurance like FDIC insurance or NCUSIF insurance, to name a few, or some other deposit limit set either by the program, the program participant, or otherwise, or relative to one or more client or source institution or intermediary institution selected parameters relating to an amount or a percentage of funds from that client account that may be held by a given recipient depository institution in the management system. Examples of such parameters are discussed for example in U.S. Pat. No. 7,672,886; U.S. Pat. No. 7,680,734; U.S. Pat. No. 7,752,107; U.S. Pat. No. 7,668,771; U.S. Pat. No. 7,752,129; U.S. Pat. No. 7,519,551; U.S. Pat. No. 7,680,734; U.S. Pat. No. 7,769,688; U.S. Pat. No. 7,809,640; U.S. Pat. No. 7,668,771; U.S. Pat. No. 7,672,901; and U.S. Pat. No. 8,150,766, each of which are incorporated by reference in their entirety for all purposes.

In embodiments, the deposit management system 160 may generate and/or send an electronic message or other communication to be received or accessed by the one or more recipient depository institutions, with the information about a prospective deposit/transfer or withdrawal/transfer, allocated to the respective recipient depository institution. This information may comprise the amount of the prospective deposit/transfer or withdrawal/transfer allocated to the respective recipient depository institution. In embodiments, this message may be generated and transmitted in person, by messenger, over the telephone, or by electronic communication either directly or indirectly.

In embodiments, the deposit management system 160 may generate and/or transmit transfer data directly and/or in conjunction with other agents to provide instructions to transfer funds to or from an insured and interest-bearing aggregated deposit account in one or more of the recipient depository institutions. Note that the transfer data may be sent directly by wire or other means to the recipient depository institution or may be sent by messenger or other method (to be discussed below) permitted by the banking regulations that does not count against the 6 withdrawal limit per month currently set forth in the banking regulations, or may be sent to the relevant source institution for subsequent communication to the respective recipient depository institution.

In embodiments, transfer data generated by or for the deposit management system 160 for the insured interest-bearing aggregated deposit account or other account holding funds may be communicated either directly or indirectly to the recipient institutions. In embodiments, the transfer data may be for presentation in a manner that does not count against the six transfer limit per month imposed by Federal regulations on interest bearing accounts, e.g., either in person, or by mail, or by messenger, or by telephone and distributed by mail, or by automated teller machine, or a combination thereof, so that the insured and interest-bearing status of the aggregated deposit accounts may be preserved. This manner of making embodiment may be implemented by ensuring that no more than some predetermined number of withdrawals are made using a method that implicates the 6 withdrawal limit and that all other withdrawals from that account during the month are made in a manner that does not count against the six transfer limit per month. In embodiments, the instructions may be generated electronically, and communicated in some convenient way to a messenger service, followed by a subsequent messenger delivery to the recipient depository institution. Note that in embodiments, the fund transfer data may be communicated by the deposit management system 160 to the respective source institution for provision to the messenger service.

In embodiments, in the event that the messenger does not timely deliver the MMDA withdrawal instructions, the respective recipient depository institution may use one of the 6 electronic withdrawals during the month (or other prescribed period), as permitted in the Banking Regulations. In embodiments, during a statement period, if there are 6 or less days in the statement cycle, a messenger may be unnecessary for any remaining withdrawals during that cycle, as taught by application Ser. No. 12/974,973, filed on Dec. 21, 2010, which is hereby incorporated by reference in its entirety for all purposes.

In embodiments, client account amounts are reallocated/reshuffled among the recipient depository institutions in the one or more databases to substantially match the one or more fund transfers and reflect the transfers to and/or from the one or more of the recipient depository institutions.

In embodiments, one or more programs may establish or have established or require establishment of an interest-bearing government-backed (e.g., FDIC, NCUSIF, etc.) insured aggregated deposit account, such as an aggregated money market deposit account (MMDA) at one or more depository institutions. In embodiments, one or more programs may optionally also establish or have established or require establishment of a like-titled (titled to the same entity as the interest-bearing aggregated deposit account) aggregated transaction account, such as a DDA, or NOW account, at each of one or more of the recipient depository institutions. The deposit management system may keep track of data related to such aggregated deposit accounts.

Figure 2:
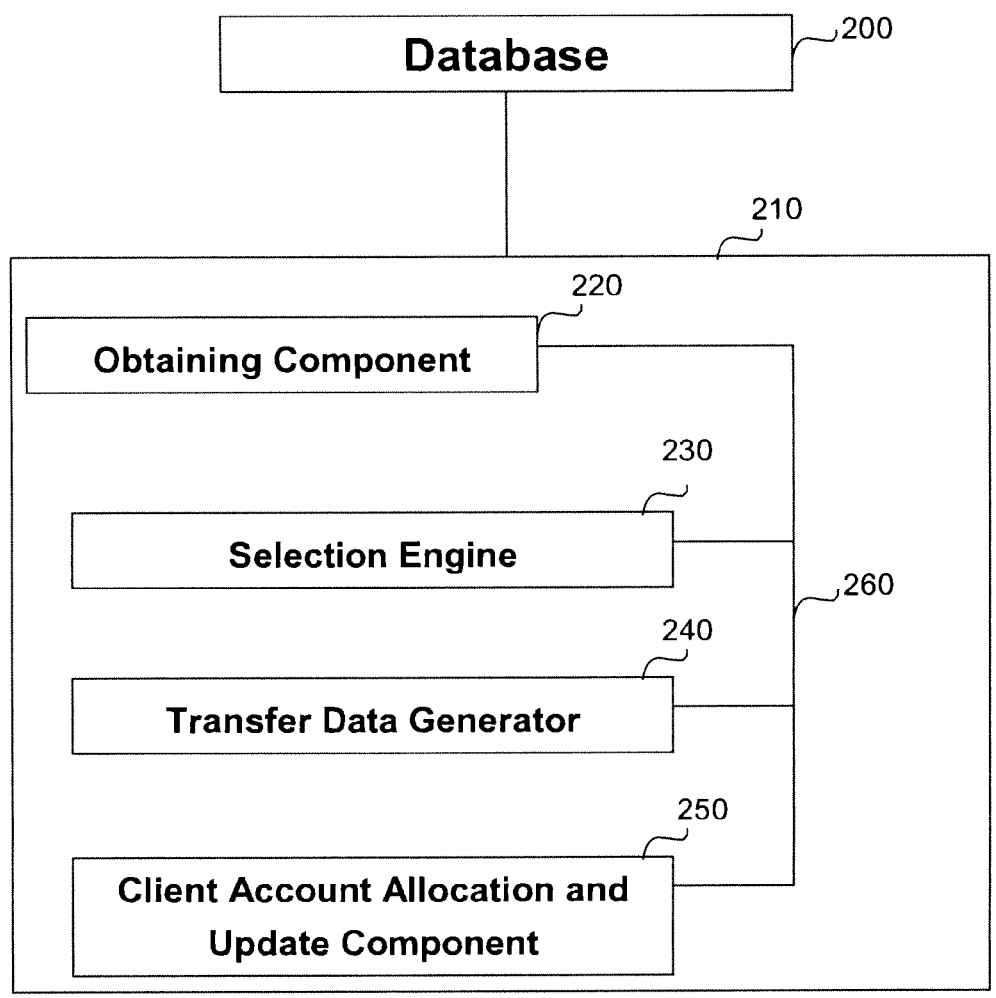
FIG. 2 is a schematic block diagram of an exemplary system in accordance with embodiments of the invention.

FIG. 2 illustrates exemplary embodiments, which comprise one or more electronic databases 200 and one or more computers 210.

In embodiments, the one or more electronic databases 200, stored on one or more computer-readable media, comprise: aggregated account information for a plurality of government-backed insured and interest-bearing aggregated deposit accounts held in a plurality of recipient depository institutions participating in a program, and also client account information.

The aggregated account information may comprise, in embodiments, information on a balance of funds in the respective aggregated deposit account, and/or identification information for the respective depository institution holding the aggregated deposit account, and/or source institution information (as described below) for the funds held by the aggregated deposit account, to name a few. In embodiments, each of multiple of the depository institutions in the deposit management system holds at least one of the government-backed insured interest-bearing aggregated deposit accounts, wherein funds from a plurality of client accounts are aggregated with funds of other client accounts in the aggregated deposit accounts.

As noted, in embodiments, the aggregated account information for each of a plurality of the recipient depository institutions that are source institutions, may further comprise a balance of source funds from the respective recipient depository institution, where the source funds comprise funds where the respective recipient depository institution is a source of the funds into the deposit management program. In embodiments, the source funds comprise funds of the respective institution held in one or more of the aggregated deposit accounts in the other recipient depository institutions in the program, and/or may be held in other investment vehicle accounts managed by the deposit management system 160 for a given program.

In embodiments, the client account information in the one or more databases may comprise, for each of a plurality of the respective client accounts, one or more or all of: (a) a respective balance in the respective client account; (b) deposit/transfer and/or withdrawal/transfer data for the respective client account, which may include individual credit and debit data and/or nets of such credit and debit data for the client account, as previously described; and (c) a respective balance of funds from the respective client account held in each of one or more banks or other recipient depository institutions in the interest-bearing aggregated deposit accounts holding funds of the respective client account. In embodiments, the client account represents funds of a client held in one or more of the interest-bearing aggregated deposit accounts held by the depository institutions in the program and any other investment vehicle accounts managed by the program.

In embodiments, the one or more computers 210 for the deposit management system may be operatively connected/accessible to computer-readable program code stored in memory, and may be capable of executing program code uploaded therefrom to configure the one or more computers into one or more special-purpose machines. The code, in embodiments, may be comprised of programming modules or other software forms that implement functional components in the one or more computers. These modules or other software forms may be stored separately or in combination.

The one or more computers 210 may be configured, in embodiments, with program code to form an obtaining component 220. The obtaining component, in embodiments, may optionally obtain client account information for each of multiple of the client accounts, where the client account information comprises credit information and/or debit information applied to or against a respective client account for one or more sub periods of time and/or other transfer information. The obtaining component 220 obtains a respective net transfer amount for the one or more sub-periods of time for each of one or more of the respective source institutions.

As noted, the client account information for each of multiple of the client accounts may in embodiments, comprise information regarding transactions applied to client accounts at source institutions 100, 110, 140-150, such as over a particular time period, such as a range of hours, days, weeks, month or the like. Such information may be in the form of detailed individual transactions, summary transactions (e.g., nets) or combinations thereof. Transactions may include sweeps, checks, transfers to cover, e.g., securities transactions or margin accounts, debit card transactions, credit card transactions, on-line bill paying transactions, touch tone bill paying data, ACH transactions, wire transactions, to name a few. In embodiments, such information may be obtained directly by processing one or more transactions, or indirectly by other means. In embodiments, such information may be received electronically in the form of a sweep file or data transmission which may comprise either detailed or summary information for each client account which has activity in the given time period. In embodiments, such information may be received in person, over the telephone, by fax or other distribution means, and entered by keying or scanning or other means of entry of such information. One or more items of information may be obtained by one or more of these exemplary methods. The other transfer information may comprise information generated by the deposit management system 160 or another entity as part of a fund reallocation, or may be generated by another entity, and may comprise depository institution opt-in or opt-outs, depository institution minimum caps and/or maximum caps, depository institution target balances, the addition or deletion of depository institutions based on various parameters, to name a few.

In embodiments, the obtaining component 220, may be configured to perform a netting operation to calculate the respective net transfer amount for one or more sub-periods of time for one or more of the respective source institutions. Note that in embodiments the net transfer amount may be received for other of the source institutions.

In embodiments, the obtaining component 220 may comprise a communication component, configured on one or more computers, for receiving electronically, via one or more electronic networks, the information on the respective one or more net fund withdrawal/transfer amounts and/or one or more net fund deposit/transfer amounts, to be transferred to or from one or more recipient depository institutions, to or from one or more source institutions, and/or directly to credit card or other payment entities.

The one or more computers 210 for the deposit management system may be further configured with program code to comprise a selection engine 230 for selecting at least one aggregated deposit account in one or more of the depository institutions to which to deposit/transfer or to withdraw/transfer funds to or from their respective one or more aggregated deposit accounts.

In embodiments, the selection engine 230 may perform the selection and allocation based at least in part on the fact of, and/or an amount of funds that the prospective recipient depository institution, when operating as a source institution, has provided to the program to be held in aggregated deposit accounts of other recipient depository institutions in the program. In embodiments, the selection engine 230 may perform the selection based at least in part on this source amount of the respective financial institution relative to amounts sourced to the program from other prospective recipient depository institutions, and/or relative to one or more threshold amounts. In embodiments, an operation is performed of comparing an updated amount of source funds of the prospective recipient depository institution (when operating as a source institution) to the updated source fund amounts of other prospective recipient depository institutions (when operating as source institutions). One or more other parameters may also be used in selecting the one or more recipient depository institutions, such as an amount of funds already held in the prospective recipient depository institution by one or more of the client accounts, based at least in part on such considerations as insurance limits, and/or client designated amounts, and/or percentages to be held in a given recipient depository institution. Another parameter may comprise complying with a respective minimum cap and/or a respective maximum cap associated in the one or more databases with a respective depository institution. Another parameter may comprise complying with a respective target balance associated in the one or more databases with a respective depository institution.

The one or more computers 210 for the deposit management system may be further configured, in embodiments, with program code for a transfer data generator 240 for generating recommended and/or actual withdrawal/transfer amount(s) and/or instructions and/or deposit/transfer amount(s) and/or instructions, to and/or from source institutions and/or recipient depository institutions. In embodiments, the system may generate recommended and/or actual instructions to be carried out by source institutions, agents of source institutions, intermediaries and/or others. In embodiments, intermediaries may up-load or provide instructions to be approved, executed and/or performed by others.

The one or more computers 210 for the deposit management system may be further configured, in embodiments, with program code to comprise an allocation and update component 250, for allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account. In embodiments, the allocation information may be calculated based at least in part on one or more criteria. The component 250 may also perform book transfers of ownership interests, and update the one or more of the electronic databases with allocation information regarding funds of particular client accounts held in particular aggregated accounts at recipient institutions. In embodiments, a record keeper may perform such allocations and/or allocation calculations in accordance with one or more parameters.

A system bus 260 may further be provided to facilitate electronic data communication among the components.

As noted above, an allocation modeling tool is disclosed which allows a program manager and/or a provider of deposit sweep services to predict program capacity based on different actual and/or hypothetical scenarios. In embodiments, the allocation tool uses as an input the recipient depository institution information and client information.

In embodiments, depository institution information comprises: (i) information used to identify the respective institution (such as a name and identification number, as well as program information where multiple programs are being modeled), and (ii) capacity information (such as a maximum deposit cap or target deposit cap) for each respective institution.

TABLE I

| WITH EXEMPLARY DEPOSITORY INSTITUTION INFORMATION | | |
|---|---|---|
| BANK_ID | BANK_NAME | MAX_CAP |
| 1 | BANK 1 | $22,000,000.00 |
| 2 | BANK 2 | $10,000,000.00 |
| 3 | BANK 3 | $250,000.00 |
| 4 | BANK 4 | $8,000,000.00 |
| 5 | BANK 5 | $17,000,000.00 |
| 6 | BANK 6 | $10,000,000.00 |
| 7 | BANK 7 | $12,000,000.00 |
| 8 | BANK 8 | $1,000,000.00 |
| 9 | BANK 9 | $2,000,000.00 |
| 10 | BANK 10 | $10,000,000.00 |
| 11 | BANK 11 | $1,500,000.00 |
| 12 | BANK 12 | $800,000.00 |
| 13 | BANK 13 | $700,000.00 |
| 14 | BANK 14 | $500,000.00 |
| 15 | BANK 15 | $1,000,000.00 |
| 16 | BANK 16 | $1,000,000.00 |
| 17 | BANK 17 | $1,000,000.00 |

In embodiments, client information comprises for each client in the program (or programs) being modeled: (i) source institution information (e.g., the name or other identification information identifying the source institution associated with the respective client); (ii) client identification information (e.g., such as tax identification number ("TIN") and/or account number); (iii) balance information (e.g., the total amount of assets on deposit in the program). In certain embodiments, it may be preferable to use TIN instead of account numbers to lower the risk of uninsured deposits, when the same client has multiple accounts in a program. Other forms of identification like account number may be used consistent with the letter and spirit of the invention.

TABLE II

WITH EXEMPLARY CLIENT DATA

| BANK | Client TIN | BALANCE |
|---|---|---|
| B 1 | 01-0000001 | $1,00000.00 |
| B 1 | 01-0000002 | $400,000.00 |
| B 1 | 01-0000003 | $1,000,000.00 |
| B 1 | 01-0000004 | $900,000.00 |
| B 1 | 01-0000005 | $1,900,000.00 |

In the allocation modeling tool, actual or hypothetical depository institution information and client information may be used to generate the model. For purposes of the analysis an actual and/or hypothetical program will be specified including such parameters as the amount of insurance to be provided by the program (e.g., $2 million of FDIC insurance per client), the number of unique clients (e.g., TINs) in the program, and the total balance in the program (e.g., the sum of balance information for all the actual or hypothetical clients in the program).

In embodiments, clients in the actual or hypothetical program may then be divided into two or more classes or stratifications. For example, in a program offering $2.0 million of FDIC insurance, the clients may be broken into three classes/stratifications (e.g., High, Medium and Low). Each stratification represents a tier of clients having a range of deposits. In this example, the "High" stratification may include clients with balances between $1.3 million and $2 million, the "Medium" stratification may include clients with balances between $0.6 million and $1.3 million, and the "Low" stratification may include client with balances of less than $0.6 million. Any number of desired classes/stratifications may be used, and the ranges may be set to be evenly spaced, or based on other criteria as desired by the particular program.

Actual client deposits may then be categorized based on where those assets fall within the various stratification ranges. Information including one or more or all of a number of clients (or TINs) falling in each stratification, and a total balance of assets on deposit by such clients in each stratification and the average assets per client in each stratification, may be calculated using actual data, or may be hypothecated. When actual data is used, the percent of clients in each stratification may be calculated in embodiments by taking the total number of clients in the stratification and dividing it by the total number of clients in the program and determining an appropriate percentage. Likewise, an average balance in each stratification may be calculated in embodiments by taking the total amount of assets held by members of that stratification and dividing by the number of members in the stratification. The total number of banks required for a given program may be calculated in embodiments by taking the total amount of insurance being offered (e.g., $2 million in this example) and dividing it by the total insurable amount that may be held at any single institution (e.g., $250,000, or perhaps a lower limit like $245,000 to provide for a margin or error), and adding the source institution, when the source institution is a bank and is not also receiving the client's assets sent into the program. The total number of banks required for a given stratification may be calculated in embodiments by taking the top limit for the range of balances in the given stratification and dividing it by the total insurable amount that may be held at any single institution.

TABLE III

SHOWING EXAMPLE OF INFORMATION ANALYZED, WHERE THE SOURCE INSTITUTION IS ALSO A BANK IN THE PROGRAM.

| Variable | Actual |
|---|---|
| Program Insurance Limit | $2,000,000 |
| # of TINs in Program | 69 |
| Total Program Balance | $46,000,000 |

| Stratification | Upper Limit | Lower Limit | # of TINs | % | Total Balance | Average Balance | # of Banks Req. |
|---|---|---|---|---|---|---|---|
| High | $2,000,000 | $1,333,333 | 8 | 12% | $15,600,000 | $1,900,000 | 10 |
| Medium | $1,333,333 | $666,667 | 17 | 25% | $16,000,000 | $970,000 | 7 |
| Low | $666,667 | $0 | 44 | 64% | $14,000,000 | $300,000 | 4 |

A hypothetical program to be analyzed may be considered by the allocation tool. In defining the hypothetical program, some or none of the actual program characteristics may be used, with none or some or all of the actual program characteristics being modified for analysis. For example, the amount of insurance offered by the program, and/or a number of clients participating in the program may be varied. In addition or alternatively, the number of clients in each stratification may be varied. Any of the variables considered in the actual program discussed above may be varied to generate a hypothetical program to be analyzed. Actual program information may be used to generate anticipated hypothetical program characteristics.

In embodiments, an example modeling parameter may comprise a programming rule that when the number of participants in the program are increased, the number of anticipated participants in each stratification may be estimated to increase consistent with the relative number of participants in each stratification in the actual program. Alternatively, other hypotheticals may be considered, such as adding or subtracting participants in any particular stratification. For example, only clients in a given stratification range may be offered an opportunity to participate in a given program. Using the actual or hypothetical information the modeling tool may then be used to estimate a desired or necessary capacity of each depository institution in the program and the program as a whole.

In embodiments, for each of the actual (or hypothetical) depository institutions in a program, capacity information is obtained or set, and amounts of deposits from actual (or hypothetical) clients in each stratification are allocated to each institution up to the amount of the capacity information obtained or set.

tory institutions capacity limits (e.g., maximum cap at one or more depository institutions) or add additional hypothetical banks to the program, indicated as PROS. 1, PROS. 2, AND PROS. 3 in Table IV.

Accordingly, a method, system and program product is disclosed for setting up a new government backed insured interest-bearing program, and/or revising an existing government backed insured interest-bearing program with the variables comprising one or more or all of an insurance limit per client account (TIN) in the program, a number of client accounts in each of multiple account classes/stratifications, with each stratification covering a different range of account balances permitted under the program, a number of recipient depository institutions required to provide government

TABLE IV

PROVIDES A NON-LIMITING EXAMPLE:

| Bank ID | Bank Name | Max Cap | High Strat. | Medium Strat. | Low Strat. | Total Balance | Excess Capacity |
|---|---|---|---|---|---|---|---|
| 1 | BANK 1 | $22,000,000 | $2,450,000 | $5,550,000 | $12,900,000 | $20,900,000 | $1,100,000 |
| 2 | BANK 2 | $18,000,000 | $2,450,000 | $5,550,000 | $10,000,000 | $18,000,000 | $0 |
| 3 | BANK 3 | $12,300,000 | $2,450,000 | $5,550,000 | $4,300,000 | $12,300,000 | $0 |
| 4 | BANK 4 | $10,000,000 | $2,450,000 | $5,550,000 | $2,000,000 | $10,000,000 | $0 |
| 5 | BANK 5 | $10,000,000 | $2,450,000 | $5,550,000 | $2,000,000 | $10,000,000 | $0 |
| 6 | BANK 6 | $10,000,000 | $2,450,000 | $5,550,000 | $2,000,000 | $10,000,000 | $0 |
| 7 | BANK 7 | $8,400,000 | $2,450,000 | $550,000 | $2,800,000 | $5,800,000 | $2,600,000 |
| 8 | BANK 8 | $2,800,000 | $2,450,000 | $0 | $0 | $2,450,000 | $350,000 |
| 9 | BANK 9 | $1,500,000 | $1,500,000 | $0 | $0 | $1,500,000 | $0 |
| 10 | BANK 10 | $1,000,000 | $1,000,000 | $0 | $0 | $1,000,000 | $0 |
| 11 | BANK 11 | $1,000,000 | $1,000,000 | $0 | $0 | $1,000,000 | $0 |
| 12 | BANK 12 | $1,000,000 | $190,000 | $0 | $0 | $170,000 | $800,000 |
| 13 | BANK 13 | $1,000,000 | $0 | $0 | $0 | $0 | $1,000,000 |
| 14 | BANK 14 | $860,000 | $0 | $0 | $0 | $0 | $800,000 |
| 15 | BANK 15 | $600,000 | $0 | $0 | $0 | $0 | $700,000 |
| 16 | BANK 16 | $500,000 | $0 | $0 | $0 | $0 | $500,000 |
| 17 | BANK 17 | $250,000 | $0 | $0 | $0 | $0 | $250,000 |
|  | PROS. 1 | $0 | $0 | $0 | $0 | $0 | $0 |
|  | PROS. 2 | $0 | $0 | $0 | $0 | $0 | $0 |
|  | PROS. 3 | $0 | $0 | $0 | $0 | $0 | $0 |
|  | Remaining |  | $0 | $0 | $0 | $0 | $8,100,000 |

Embodiments of the allocation modeling tool allow approximations regarding deposit interchange or other program capacity limits. In embodiments, it allows (1) a determination of the additional clients (e.g., TINs) that may be introduced into an existing program with current insurance limits and/or modified insurance limits and an existing number of recipient depository institutions in the program; (2) a determination of a number of existing recipient depository institution caps required to be modified in order to support the number of added TINs/new program insurance limit and/or new recipient depository institutions required to be added in order to support a number of added TINs/new program insurance limit (e.g., offering $2.5 million of FDIC insurance instead of $2.0 million of FDIC insurance).

In addition to TIN's and Insurance limits, embodiments of the tool may allow a user to modify a balance stratification within the program for purposes of forecasting a benefit or impact of revising/changing program insurance limits and/or recipient depository institutions caps. In embodiments, a user may select an existing account balance stratification (e.g., percentage of clients in each stratification to remain the same) which may be derived by examining the current program balance by client, or alternatively or in addition, a user may adjust a balance stratification (e.g., percentage of clients in each stratification) as needed in order to forecast program capacity. Further, in embodiments, in order to forecast future capacity, a user may be able to adjust current recipient deposibacked insurance for each stratification of client accounts and the program as a whole, and a maximum or target or other capacity cap for each of the recipient depository institutions in the program. In embodiments, an ability for the program to add new client accounts and/or new client accounts in selected stratifications may be determined from adding a new recipient depository institution and/or a new higher government backed insurance level, and/or increasing capacity caps for one or more of the depository institutions. This may accommodate changes to the number of client accounts in the different classes, and/or balance changes over a period of time for client accounts in one or more of the classes.

Figure 3:
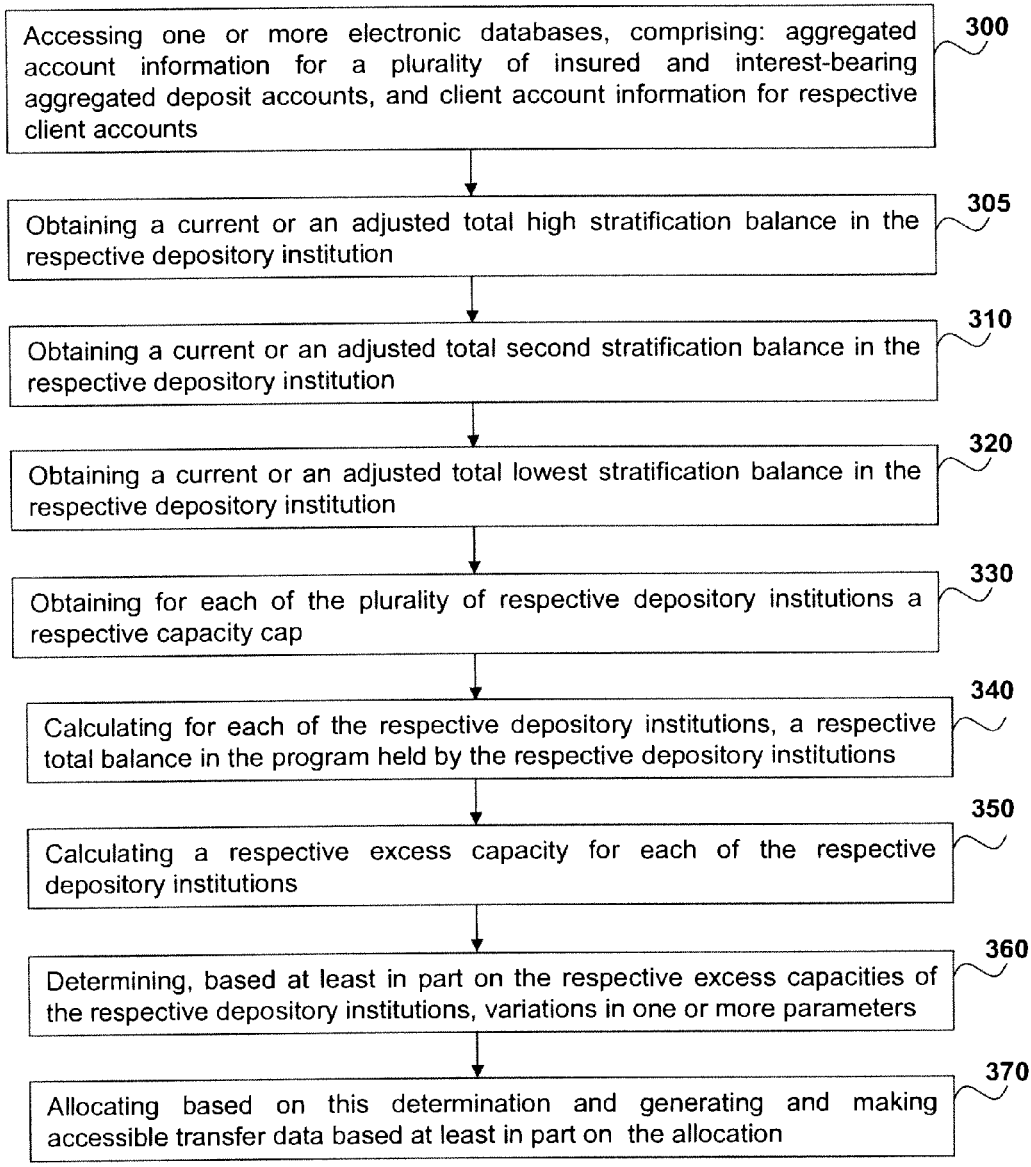
FIG. 3 is a schematic flow chart of an exemplary method in accordance with embodiments of the invention.

FIG. 3 illustrates exemplary embodiments of implementing the modeling engine and method and program product in accordance with the invention.

Block 300 comprises accessing, using one or more computers, one or more electronic databases, stored on one or more computer-readable media, as described previously, for assisting in carrying out one or more of the various operations of the system. In embodiments, the one or more databases may comprises (i) aggregated account information for a plurality of government-backed insured and interest-bearing aggregated deposit accounts held in a plurality of recipient depository institutions, comprising a balance of funds held in each of the aggregated deposit accounts, wherein funds from a plurality of client accounts are aggregated with funds of other client accounts in the aggregated deposit accounts. The one or more databases may further comprise (ii) client account information for each of a plurality of the respective client accounts comprising at least a respective balance of funds from the respective client account held in each of one or more recipient depository institutions in the interest-bearing aggregated deposit accounts holding funds of the respective client account. Note that in embodiments, one institution may be both a source institution and a recipient depository institution, but every institution in the program need not be both a source institution and a recipient depository institution. Similarly more than one institution could play both roles. In embodiments, one or more institution may also play other roles, such as operating as a clearance bank holding a control operating account.

Block 305 comprises an operation of obtaining, using the one or more computers, obtaining a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions. In embodiments, client account information of client accounts for this may be received by the deposit management system, or may be generated by the deposit management system. In embodiments, the client account information may comprise data for individual transactions, and/or may comprise one or more nets of data for each of a plurality of client accounts, with the data for a respective client account comprising a net of credit information and/or debit information applied to or against the respective client account for one or more sub periods of time and/or may include other transfer information. Note that the client account information may be based at least in part on data from one or more respective source institutions. In embodiments, the obtaining operation comprises receiving electronically a sweep file or data transmission, and/or receiving client account information in person, over the telephone, by fax or other distribution means and entering such information in the one or more databases by keying or scanning, and/or the information may be calculated, and/or it may be verified by the deposit management system 160. In embodiments, the client account information may comprise a net of withdrawal/transfer amounts and/or deposit/transfer amounts from an individual client account over a period of time. Other transfer information may comprises transfer information from the management computer of the deposit management system 160 as part of a fund reallocation, or from another entity, for example. Note that in some embodiments, this step may not be performed.

In embodiments, block 310 comprises an operation of obtaining, using the one or more computers, a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range, i.e., the upper limit for the second range is not within the highest range.

In embodiments, block 320 comprises an operation of obtaining a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range is has a lower upper limit than the second range i.e., the upper limit for the lowest range is not within the third range.

In embodiments, block 330 comprises obtaining for each of the plurality of respective depository institutions a respective capacity cap. The capacity cap may be determined, in embodiments, by accessing a database, and/or obtained manually and keyed or scanned into one or more of the databases and/or the system.

In embodiments, block 340 comprises calculating or having calculated, using the one or more computers, for each of the respective depository institutions, a respective total balance in the program. In embodiments, the total balance may be calculated by summing the balances of the aggregated deposit accounts held in the depository institutions participating in the program. In embodiments, the total balance may be calculated by summing the total high stratification balance, the total second stratification balance, and the total lowest stratification balance, held in the respective depository institutions.

In embodiments, block 350 comprises calculating or having calculated, using the one or more computers, a respective excess capacity for each of the respective depository institutions based at least in part on a difference between the capacity cap for the respective depository institution and the total balance for the respective depository institution. In embodiments, this excess capacity may be determined by subtracting the current balance (obtained from the one or more databases 200) in the one or more aggregated deposit accounts held by the respective depository institution from the capacity cap for the respective depository institution.

In embodiments, block 360 comprises an operation of determining, based at least in part on the respective excess capacities of the respective depository institutions, one or more of a number of additional client accounts and/or additional client account funds that may be added to the program and may receive government backed insurance, and/or a number of additional depository institutions that may be needed to obtain government backed insurance for additional client account funds, and/or a number of additional depository institutions that may be needed in order to increase the program insurance limit and thereby increase a top limit for the highest range, and/or a benefit to modifying the capacity cap for one or more of the depository institutions based on current deposits of funds or projected future deposit of funds. This determination may be performed electronically in whole or in part using the one or more computers. Note that one or more of the steps in the determination may be performed manually.

In embodiments, data for or derived from Table IV may be provided or made accessible for viewing on a display. In embodiments, various parameters of the Table may be changed and an excess capacity resulting from the changes determined, which may be indicative of additional client accounts and client account balances that may be added to the program. In embodiments, an additional number of hypothetical client accounts may be added. In embodiments, a projected additional client account balance resulting from the addition of the theoretical new client accounts may be calculated based on the percentage of current client accounts in each stratification and an average client account balance in each stratification. In embodiments, such a calculation may comprise the hypothetical number of new client accounts multiplied by the different stratification percentages, e.g., high stratification percentage, medium stratification percentage, lowest stratification percentage, to obtain a respective number of hypothetical new client accounts in the high stratification, the medium stratification, and the lowest stratification. In embodiments, the projected additional client account balances resulting from the addition of the new client accounts in each of the stratifications may be calculated. In embodiments, such a calculation may comprise multiplying the respective stratification average account balance by the number of additional client accounts in that stratification. The additional client accounts balances in each stratification may then be summed to obtain a total additional client account balance. In other embodiments, the hypothetical number of new client accounts in each stratification may be added to the current number of client accounts in that respective stratification, and the result multiplied by the respective stratification average account balance to obtain the client accounts balance for the respective stratification.

In embodiments, an operation may be performed of allocating funds to one or more of the recipient depository institutions based, at least in part, on one or more of the parameter determinations of block 360. In embodiments, one or more other of the selection rules previously described may also be used for selecting the one for more recipient depository institutions for part of all of the allocation. For example, a selection rule may comprises obtaining a partial or substantially full reciprocity for source contributions of funds to the program, as described above. Another selection rule may comprise maintaining an amount of client account funds in a respective recipient depository institution at or below an insurance limit, or maintaining the client amount relative to a prescribed amount or percentage of client funds to be held in a respective recipient depository institution. Another selection rule may comprise client account instructions. Another rule may comprise making a selection based on when transfer information is received and/or processed relative to a cutoff time of the recipient depository institutions for fund transfers, and/or relative to one or more threshold times, and/or relative to the cutoff times of one or more other depository institutions or entities involved in the fund transfer chain. Another selection rule may comprise selecting a recipient depository institution for a withdrawal/transfer or a deposit/transfer in order to comply with a respective minimum cap and/or a respective maximum cap associated in the one or more databases with the respective insured and interest-bearing aggregated deposit accounts or associated with the respective depository institution or associated with another of the recipient depository institutions. Another selection rule may comprise minimizing a number of withdrawals/transfers and/or deposits/transfers in a month period to hold balances held in one or more of the insured and interest-bearing aggregated deposit accounts substantially stable for some period of time. Another selection rule may comprise complying with a Federal Banking regulation 6 withdrawal/transfer limit per month for one or more of the respective depository institutions. Another selection rule may comprise a selection or de-selection of one or more of the recipient depository institutions by one or more of the clients and/or by one or more of the source institutions, or by the depository institutions, or by another entity. Note that one or more of these rules may be used, or may be used in conjunction with one or more other rules, or may be used with one or more different rules.

In embodiments, an operation of allocating, using the one or more computers, amounts of funds from multiple of the client accounts among multiple of the recipient depository institutions, so that the respective balance of funds for the one or more sub periods of time in each of the aggregated deposit accounts of the depository institutions, after taking into consideration the fund transfer amounts for the one or more sub periods of time, will substantially match a sum of the respective balances of funds from the multiple of the respective client accounts allocated to this respective aggregated deposit account. This operation may be considered, in embodiments, a re-shuffling of client account amounts to substantially match the one or more transfers to the aggregated deposit accounts.

In embodiments, an operation of updating or having updated, using the one or more computers, one or more of the electronic databases to update the respective balances of client account funds held in one or more of the recipient depository institutions in one or more aggregated deposit accounts therein based on the allocations based on the transfers.

In embodiments, an operation of generating and making accessible, using the one or more computers, transfer data based at least in part on the allocations.

Note that the embodiments above may be implemented with any combination or all of the following features.

Figure 4:
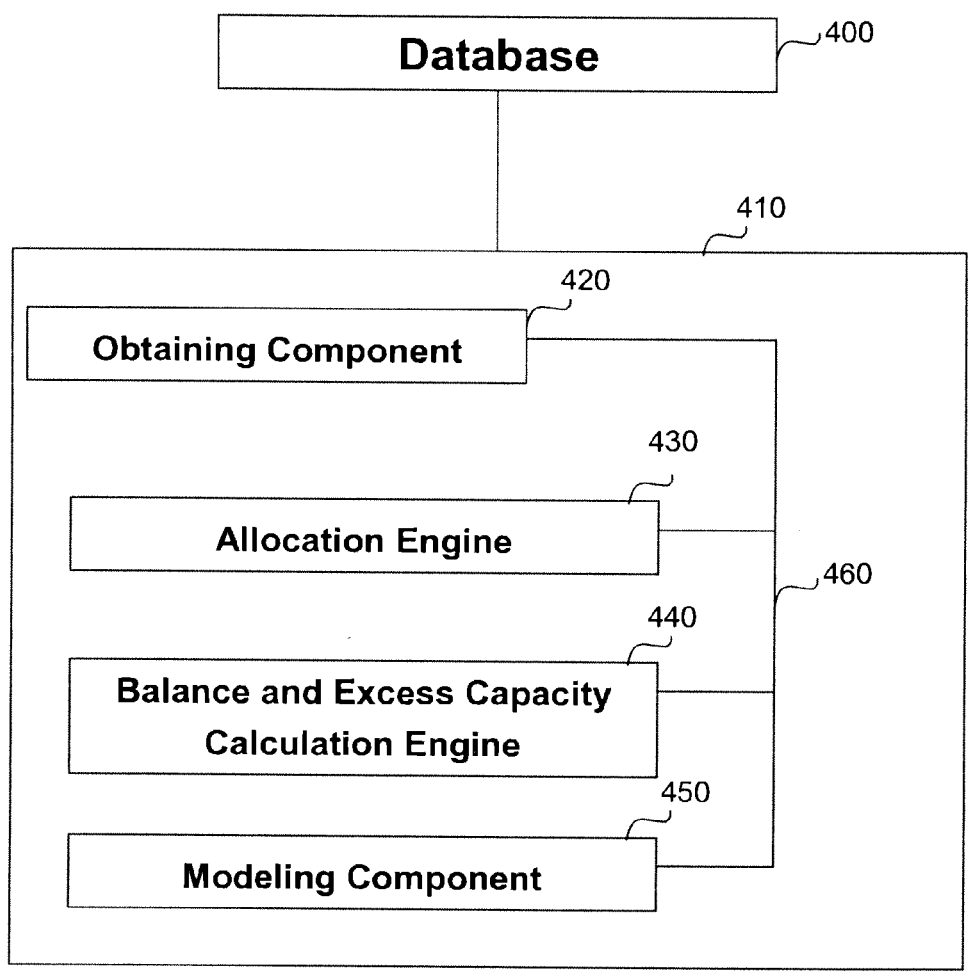
FIG. 4 is a schematic block diagram of an exemplary system in accordance with embodiments of the invention.

FIG. 4 is a schematic block diagram of a computer system configuration for implementing an embodiment of the process of FIG. 3. The computer system configuration comprises one or more databases 400 that may include aggregated deposit account information and client account information, as discussed previously.

The computer system configuration of FIG. 4 comprises one or more computers 410, that are programmed to implement various computer components. One component is the obtaining component 420, for obtaining client account data, recipient depository institution maximum caps, and other information used to make the one or more determinations of block 360.

The one or more computers further comprise a stratification balance and excess capacity calculation engine 440 for performing calculations to obtain the various stratification balances and the excess capacities for the respective recipient depository institutions.

The one or more computers further comprise a modeling component 450 for selecting and varying one or more of the parameters of the determination process of block 360 and using the allocation engine 430 to allocate funds among the recipient depository institutions, based at least in part on one or more of such factors as obtaining government backed insurance and meeting maximum caps, and client instructions, to name a few.

The one or more computers further comprise an allocation engine 430 for allocating funds among the recipient depository institutions based on an output from the modeling component 450.

In embodiments, the client account information comprises information for at least funds of one or more client accounts. In embodiments, the client account information may comprise information for at least bank funds, or only for bank funds. In embodiments, the client account information may comprise information for at least municipal or other governmental funds, or for only municipal or other governmental funds.

In embodiments, where there may be a reciprocity target for at least one of the recipient depository institutions, and where one of the one or more selection rules comprises determining whether a prospective withdrawal/transfer or a deposit/transfer will comply with a respective capacity cap and/or a respective minimum cap associated with the prospective recipient depository institution or with another of the respective recipient depository institutions, the one or more computers 410 may be configured with programming code for performing a pseudo allocation of a proposed transfer to determine whether the reciprocity target for the at least one recipient depository institution will be met by the proposed transfer. If the reciprocity target will not be met by the pseudo allocation and the resulting pseudo end balances that would be held in the respective recipient depository institutions, then modifying one or more of the respective capacity caps and/or the respective minimum caps. In embodiments, this operation may be performed manually. This operation may be advantageous for the embodiments where transfer to the interest-bearing aggregated deposit accounts held in the respective recipient depository institutions is controlled at least in part by capacity caps and/or minimum caps.

As noted, one or more of these variables are changed, display data for or derived from Table IV may be made accessible for display. In embodiments, the excess capacities of the different depository institutions will change as variables such as the capacity caps and the number of depository institutions in the program are changed. Likewise, the excess capacities will change as one or more of the stratification balances are changed for one or more of the depository institutions. In embodiments, the excess capacity may be negative, where one or more of the stratification balances for a given depository institution are increased with no corresponding increase in the capacity cap for the respective depository institution. Thus, for example with this display, the number of depository institutions affected by adding a given number of client accounts (using the average client account balance values for each of the stratifications to calculate the balance increase in each of the stratifications) will be displayed for multiple of the depository institutions. Likewise, in embodiments, the number of depository institutions affected by adding a given number of client accounts in just one or just two of the stratifications (using the average client account balance values for the respective stratifications to calculate the balance increase in the respective stratifications) will be displayed for multiple of the depository institutions. In embodiments, such a display may also provide an indication, e.g., from the number of depository institutions with a negative excess capacity, of a need for adding one or more additional depository institutions to the program. In embodiments, such a display may also provide an indication of the additional one or more depository institutions required to be added to the program if the insurance limit for the program or for a selected group of the client accounts is increased.

In embodiments, the one or more computers 410 may be configured with programming code for receiving a selection of an allocation based on one or more modeling parameters, e.g., a new program insurance limit, one or more new recipient depository institution capacity caps, a number of new client accounts, a change in average balance of one or more stratifications, a change in percentage of client accounts in each stratification, a variation of the ranges of the stratifications, a new number of recipient depository institutions participating in a program, to name a few.

In embodiments, the one or more computers 410 may be configured with programming code for generating and sending one or more instructions to a source institution to withdraw/transfer funds from the control operating account 125 held by the clearance bank 120 and to transfer those funds to one or more of the program source institutions and/or to one or more of the recipient depository institutions in accordance with the selected allocation determined by the modeling operation. In embodiments, a communication to the clearance bank by telephone, or by Fax, or in person, or other non-automated communication, may be performed.

In embodiments, the one or more computers may be configured by programming code for making direct electronic communication with the control operating account 125 held by the clearance bank 120 to provide instructions to withdraw/transfer funds from the control operating account 125, and to send/transfer funds to one or more of the source institutions and/or to one or more of the recipient depository institutions and/or to one or more payment entities. In another embodiment, a communication to the clearance bank by telephone, or by Fax, or in person, or other non-automated communication, may be performed.

In embodiments, the transfer data generator 240 may be configured with programming code for sending the transfer data to a source institution for subsequent transfer to one or more recipient depository institutions. In embodiments, this operation may be performed manually.

Some example embodiments comprise:
An allocation modeling method in a depository program with a government backed insurance limit, comprising:
  accessing, using one or more computers, one or more electronic databases, stored on one or more computer-readable media, comprising:
    (i) aggregated account information for a plurality of government backed-insured and interest-bearing aggregated deposit accounts held in a plurality of depository institutions in a program, wherein funds from a plurality client accounts are held in the aggregated deposit accounts in the depository institutions in the program, the aggregated account information for a respective one of the aggregated deposit accounts comprising a balance of funds held in the respective aggregated deposit account; and
    (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account; and
  for each respective one of a plurality of depository institutions participating in the program:
    obtaining, using the one or more computers, for a high stratification a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions;
    obtaining, using the one or more computers, for a second stratification a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range;

obtaining, using the one or more computers, for a lowest stratification a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range has a lower upper limit than the second range;

obtaining for each of the plurality of respective depository institutions a respective capacity cap;

calculating or having calculated, using the one or more computers, for each of the respective depository institutions, a respective total balance in the program, based at least in part on the total high stratification balance, the total second stratification balance, and the total lowest stratification balance, held in the respective depository institution;

calculating or having calculated, using the one or more computers, a respective excess capacity for each of the respective depository institutions based at least in part on a difference between the capacity cap for the respective depository institution and the total balance for the respective depository institution; and determining, based at least in part on the respective excess capacities of the respective depository institutions, a number of additional client accounts and/or additional client account funds that may be added to the program and may receive government backed insurance, and/or a number of additional depository institutions that may be needed to obtain government backed insurance for additional client account funds, and/or a number of additional depository institutions that may be needed in order to increase the program insurance limit and thereby increase a top limit for the highest range, and/or a need to modifying the capacity cap for one or more of the depository institutions based on current deposits of funds or projected future deposit of funds.

In embodiments, the determining step may comprise modifying, based at least in part on the respective excess capacities of the respective depository institutions, one or more of parameters selected from the group of a number of client accounts, additional client account funds, a total number of the depository institutions participating in the program, and the capacity caps for one or more of the depository institutions.

In embodiments, the method may further comprise:
allocating, using the one or more computers, funds of each of the high stratification client accounts, the second stratification client accounts and the lowest stratification client accounts across one or more of the depository institutions to obtain government backed insurance for the funds;

summing for each of the depository institutions, using the one or more computers, the funds of the high stratification client accounts allocated to the respective depository institution, to obtain the total high stratification balance for the respective depository institution;

summing for each of the depository institutions, using the one or more computers, the funds of the second stratification client accounts allocated to the respective depository institution, to obtain the total second stratification balance for the respective depository institution; and summing for each of the depository institutions, using the one or more computers, the funds of the lowest stratification client accounts allocated to the respective depository institution, to obtain the total lowest stratification balance for the respective depository institution.

In embodiments, the method may further comprise:
determining, using the one or more computers, a current respective percentage of the high stratification client accounts, a current respective percentage of the second stratification client accounts, and a current respective percentage of the lowest stratification client accounts, relative to a total number of client accounts managed by the program, and determining an average balance of client accounts for the high stratification client accounts, an average balance of client accounts for the second stratification client accounts, and an average balance of client accounts for the lowest stratification client accounts; and modifying, using the one or more computers, one or more of the respective percentage and/or the average balance of client accounts in one or more of the stratifications to determine a need to change capacity caps for one or more of the depository institutions, and/or a need to change a number of depository institutions in the program, and/or a government backed insurance limit for the program, so that a change in the percentage of the client accounts in one or more of the stratifications and/or a change in the average balance of client accounts in one or more of the stratifications will receive government-backed insurance.

In embodiments, the method may further comprise:
determining, using the one or more computers, a current respective percentage of the high stratification client accounts, a current respective percentage of the second stratification client accounts, and a current respective percentage of the lowest stratification client accounts, relative to a total number of client accounts in the program;

determining an average balance of client accounts for the high stratification client accounts, an average balance of client accounts for the second stratification client accounts, and an average balance of client accounts for the lowest stratification client accounts; and calculating a projected new total balance of funds managed by the program for a given number of new client accounts to be added, based at least in part on the given number of new client accounts, the current number of client accounts, the percentage of the high stratification client accounts and the average balance for the high stratification client accounts, the percentage of the second stratification client accounts and the average balance for the second stratification client accounts, and the percentage of the lowest stratification client accounts and the average balance for the lowest stratification client accounts.

In embodiments, the method may further comprise:
modifying one of the current respective percentages of the client accounts in the stratifications or the average balance of the client accounts in one or more of the stratifications; and computing the other of the one or more of the stratifications or the average balance of client accounts in the respective stratifications using algorithms embedded in a first spreadsheet; and computing the excess capacity for respective ones of the depository institutions using algorithms embedded in a second spreadsheet.

In embodiments, the method may further comprise:

revising one or more selected from the group of capacity cap, insurance limit for the program, and number of depository institutions participating in the program, based at least in part on the determining step; and calculating an allocation of funds, using the one or more computers, among the government backed insured, interest bearing aggregated deposit accounts of the depository institutions, based at least in part on the capacity cap, insurance limit for the program, and number of depository institutions participating in the program.

In embodiments, the method may further comprise:

allocating, using the one or more computers, amounts of funds from multiple of the client accounts among multiple of the recipient depository institutions, so that a respective balance of funds allocated to each of the aggregated deposit accounts of the depository institutions substantially matches a sum of the respective balances of funds from the multiple of the respective client accounts allocated to this respective aggregated deposit account; and updating, using the one or more computers, one or more of electronic databases to update the respective balances of client account funds held in one or more of the recipient depository institutions in one or more aggregated deposit accounts therein based on the allocations.

In embodiments, the method may further comprise:

generating and making accessible, using the one or more computers, transfer data based at least in part on the allocations.

In embodiments, the method may further comprise:

generating data for a table, using the one or more computers, that lists for each of a plurality of the stratifications, an upper limit for the respective stratification, a lower limit for the respective stratification, a number of clients in the respective stratification, an average total balance of funds in the stratification, a percentage of a total balance managed by the program that is represented by the average total balance of funds in the respective stratification; and generating and providing or making accessible display data, using the one or more computers, based at least in part on the data in the table. For example, see Table III. In embodiments, these operations may be performed by machine-executable instructions/programming code implementing algorithms embedded in Excel or other spreadsheets.

In embodiments, the method may further comprise:

generating data for a table, using the one or more computers, that lists for each of the depository institutions participating in the program, the capacity cap, a measure derived from the total high stratification balance, a measure derived from the total second stratification balance, a measure derived from the total lowest stratification balance, a measure of the respective total balance in the program for the respective depository institution, and the excess capacity for the respective depository institution; and generating and providing or making accessible display data, using the one or more computers, based at least in part on the data in the table. For example, see Table IV. In embodiments, the measure may be an average. In embodiments, the measure may be the current total stratification balance for the respective stratification.

The present invention may be used in various kinds of deposit management programs and deposit sweep programs, as well as programs hereinafter developed. The present invention may also be used in the demand deposit marketplace, with insured deposit bank sweep products.

The allocation modeling tool allows the making of approximations regarding capacity limit for a program for obtaining government backed insurance for amounts over the account limit for a single account using a plurality of depository institutions and a plurality of aggregated deposit accounts. In embodiments, it allows (1) a determination of additional client TINs that can be introduced into an existing program with current insurance limits/modified insurance limits (2) a determination of a number of existing banks required to be modified (increase max insurance limit) or new banks required to be added in order to support the number of new TINs/new program insurance limit. In addition to TIN's and Insurance limit, the tool in embodiments, allows a user to modify a balance stratification within a program for purposes of forecasting program insurance. A user can select an existing account balance stratification which is derived by examining the current program balance by client, or alternatively the relative balance of stratifications can be adjusted as needed in order to forecast program capacity. Further, in order to forecast future capacity, a user in embodiments is able to adjust current bank capacity limits and/or add additional hypothetical banks to or remove banks from the program.

In embodiments, each of the stratifications may consist of a multiple of the FDIC insurance limit, e.g., $250,000, $500,000, $750,000, $1,000,000, $1,250,000, $1,500,000, etc., or some fraction thereof. Note also that the FDIC or other government-backed insurance limit for an account may change, this example would change accordingly.

In other embodiments, there may be multiple source institutions that are not depository institutions, each associated in the one or more databases, with a different respective insured and interest-bearing aggregated deposit account. In embodiments, one or more of these sources may be self-clearing broker-dealers. Thus, in modeling, problems may arise due to the same depository institutions being used by multiple different source entities, e.g., self-clearing broker-dealers.

In embodiments, there may be only one source institution (serving only as a source and not as a depository institution). In embodiments, modeling may be directed to determining an impact of adding more deposits from the single source, e.g., the impact of adding $100 million more deposits due to bringing in a new large client. In embodiments, modeling of the funds may comprise grouping the clients and allocating clients based on a number of depository institutions that they require in order to obtain government-backed insurance, e.g., with FDIC insurance per depository institution being $245,000, and rounding up. For example, in a 2.5 million insurance program, there would be 11 different groups, beginning with customers who require one depository institution, all the way up to customers who require 11 depository institution to obtain FDIC insurance for their funds.

In embodiments, the program allocation may operate to allocate beginning with the largest customer balance and proceeding down to allocate the smallest balance at the end. In embodiments, the program operation may not group clients, but rather just allocate in this manner.

Figure 5A:
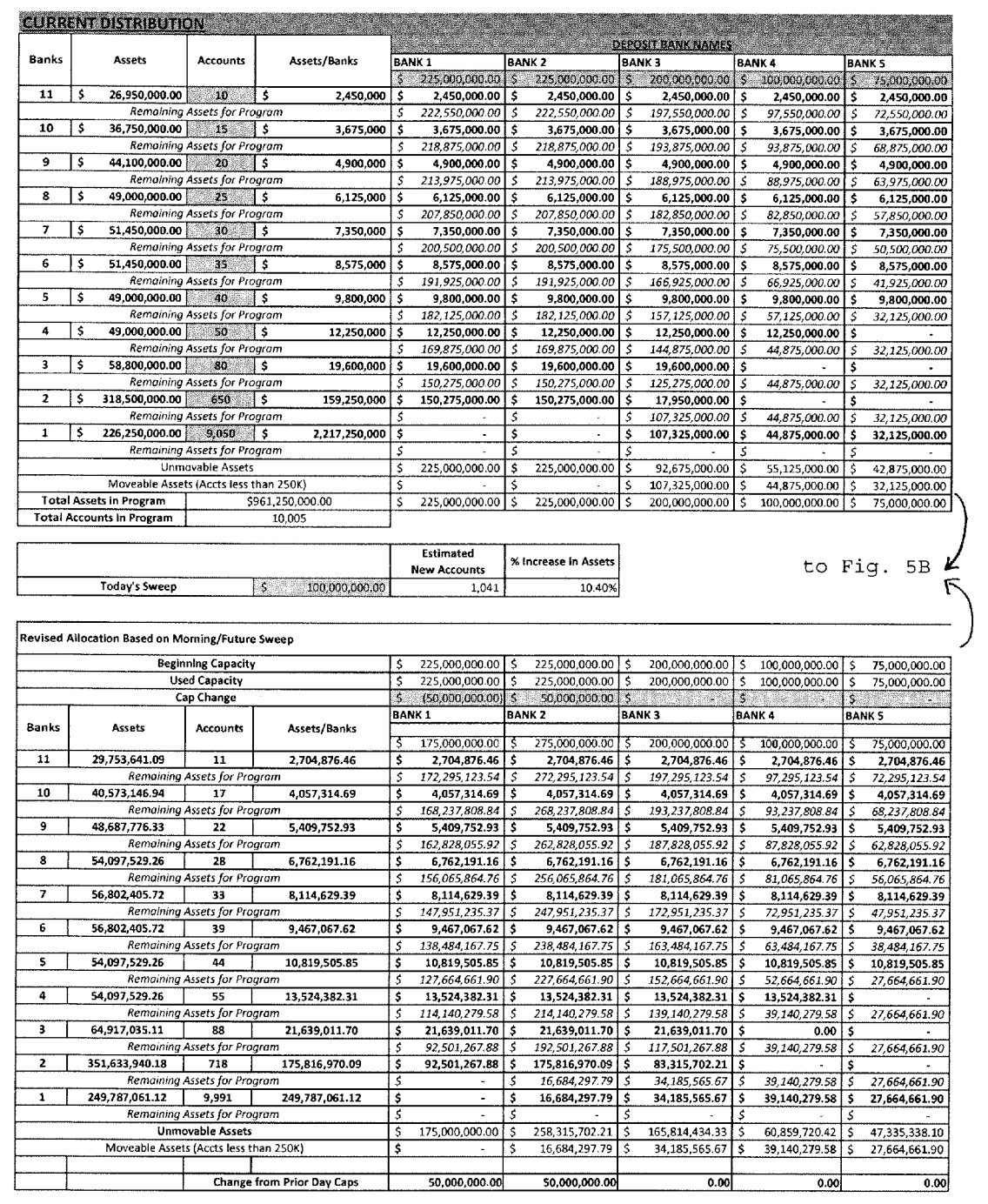
Figure 5B:
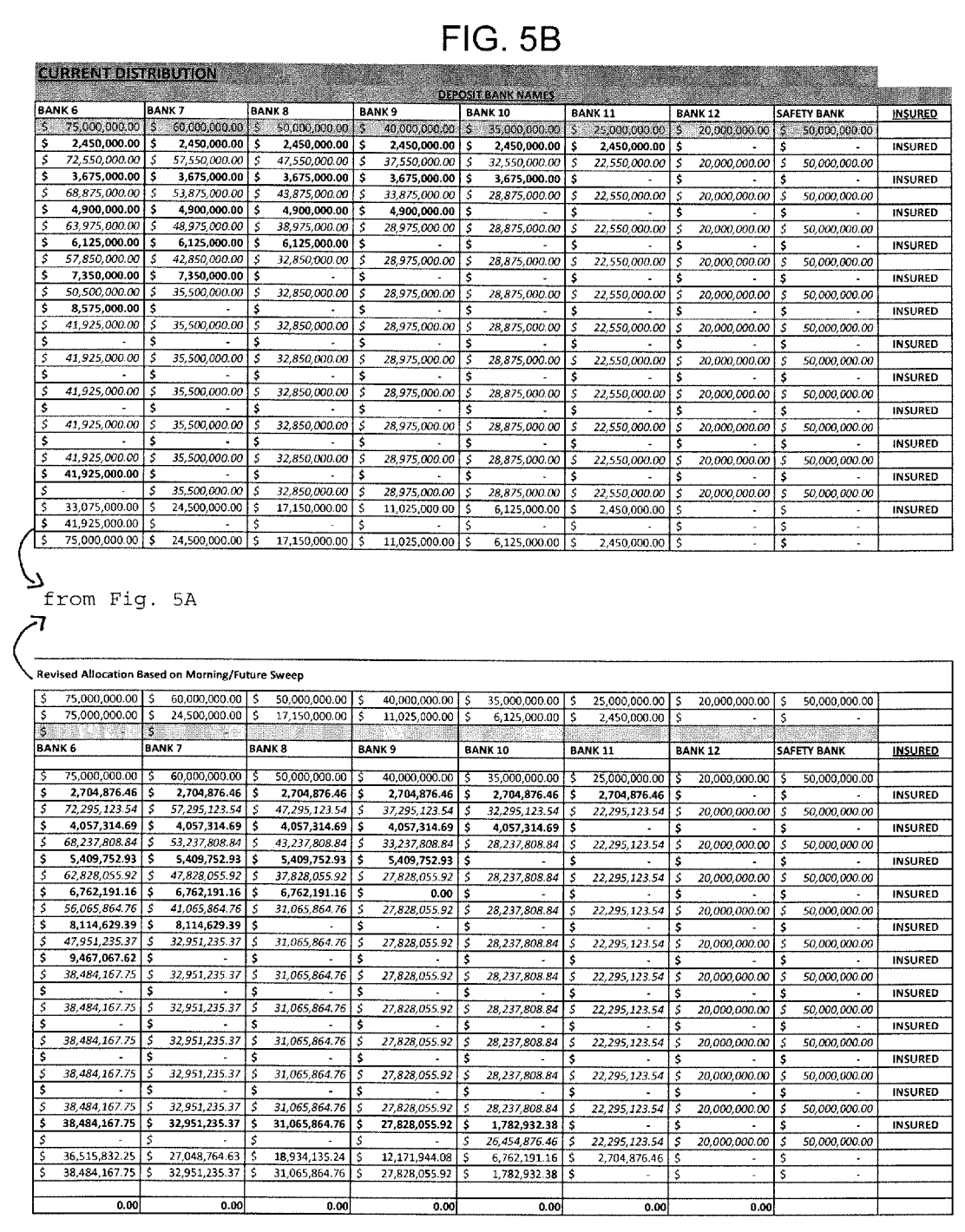

In embodiments, the program may model client deposits based on unrestrained movement assets ("moveable" in FIG. 5.) and restrained movement assets ("unmoveable" in FIG. 5). Unrestrained movement assets is defined as a customer client with a balance of the FDIC insurance limit or less, e.g., $250K or less. Such assets cannot become uninsured by movement into a bank that already holds assets of the client. In embodiments, since these assets cannot become uninsured, (so long as 1 bank has capacity), these balances may be spread across multiple banks, and in some embodiments, across as many program banks as possible. Such spreading may help eliminate some of the volatility that banks might otherwise have, and in embodiments, may be useful in a wire minimization program. Conversely, restrained movement assets are customer clients who have more than the FDIC insurance limit, e.g., $250K, which requires a proper allocation, taking into account client funds already held by the banks in order to avoid exceeding the $FDIC insurance limit. Otherwise, such a restricted movement assets may have a portion of their balance become uninsured.

Accordingly, in embodiments, the program allocation may operate to allocate beginning with the largest customer balance and proceeding down to allocate the smallest balance at the end, as noted, and then allocating the balances that are below the FDIC limit at the end of the allocation.

A modeling chart is illustrated in FIG. 5. FIG. 5 illustrates a top portion indicating a current distribution of client funds across 11 banks, plus a safety bank. A bottom portion of the chart illustrates how the fund distribution would change if there was an increase into the program of $100,000,000 from 1041 new client accounts. In embodiments, the chart may comprise an Excel spreadsheet, with the values in individual cells in the spreadsheet determined by pre-set equations, to be discussed.

Referring to the left columns in the top portion of the chart of FIG. 5, the left-most column is a stratification based on the number of banks required to obtain FDIC insurance for client accounts in a certain balance range. The top listing is for a balance stratification range that requires 11 banks to obtain insurance, e.g., as an example, $2,750,000 for an FDIC insurance limit of $250,000 per account, or if a lower amount per client account per bank is used, $2,250,000. In the next column to the right, the total balance of client account funds in this stratification range is listed, e.g., $26,950,000. The next column to the right lists the number of client accounts in this stratification range, e.g., 10 client accounts. The next column to the right indicates a cap for each client account in order to obtain FDIC insurance, e.g., $245,000 per account in order to provide some flexibility.

Referring to the horizontal listing of banks 1-12 across the top portion of the chart, the row immediately below the bank number is the cap for that bank for that period of time, e.g., a day, which may be set by the program, and/or by the bank, and/or by another entity, e.g., for bank 1, $225,000,000, meaning that bank 1 can hold $225,000,000 in the program that day. Note that bank 2 has the same cap level, while bank 3 has a lower cap for that period of time of $200,000,000.

The next row down indicates the funds from this top stratification range which are allocated to bank 1, e.g., the cell might have an equation of the number of bank accounts at that stratification level times the limit per client account, in this case 10 accounts times $245,000=$2,450,000. The next row down indicates the remaining cap space for bank 1 after $2,450,000 has been subtracted, e.g., the cell may comprise an equation that subtracts the amount allocated from that stratification level to bank 1 from the cap for bank 1, in this case $225,000,000 minus $2,450,000=$222,550,000.

The next row down indicates the funds from the stratification range that requires 10 banks. Referring to bank 1, the amount from this 10 bank stratification range allocated to bank 1 is $3,675,000, e.g., the cell would perform the equation of the number of accounts in this stratification range (15) times the limit per client account of $245,000. The next row down indicates the remaining cap space for bank 1 after $3,675,000 has been subtracted from the remaining cap, e.g., the remaining cap of bank 1 of $222,550,000 minus $3,675,000=$218,875,000.

The rows below indicate the number of banks in each lower stratification range, the total assets in that stratification range, the number of accounts in that stratification range, the client account limit per bank, the assets from this stratification range to be allocated to each of the banks in this stratification range, the amount allocated to each of the banks in its stratification, and the remaining cap space left after this amount has been allocated to the respective bank in this stratification level.

Note that bottom stratification level that requires only one bank per account has $226,250,000 in assets from 9,050 accounts. These assets are considered to be moveable freely (unrestrained movement) without concern for exceeding the FDIC limit for the respective client. The assets in this stratification range were allocated to banks 3-6, and the row listing moveable assets lists these assets as moveable. The unmoveable (restrained movement) assets row lists clients funds that require more that one bank to obtain FDIC insurance.

The bottom portion of the chart is similar, but designed to project allocations for additional assets coming into the program, to accommodate changes in bank caps, the addition or removal of banks in the program, and changes to the asset limit per client account per bank. In the bottom chart illustrated in FIG. 5, a projected allocation for a sweep of $100,000,000 of new assets from 1,041 new accounts is determined. In embodiments, an assumption is used for determining the spreadsheet cell equations that the same percentage of accounts and assets will hold for each of the bank stratification ranges for these new assets. For example, if the current percentage of client accounts in the 11 bank stratification range is Y %, and they have an average account balance of $XX, then a cell calculation may be performed to determine Y % of the new client accounts, and to multiple that resulting number of client accounts by the average account balance of $XX for this stratification range, to obtain the total new assets in that stratification range to be allocated across 11 banks. In the bottom portion of the chart, the total assets in the 11 bank stratification range to be distributed is $29,753,641.09 from 11 accounts. It can be seen that a distribution of this amount across 11 banks requires $2,704,876 per bank in this stratification.

This $2,704,876 amount is subtracted from the cap for bank 1, per the example. Note that there is a row labeled "Cap Change," which indicates any change to the previous cap for the respective bank in the column. Thus, the chart shows that bank 1 has had a reduction of $50,000,000 in its cap, so that the new cap for bank 1 is computed in the bank cap cell to be the previous bank cap plus/minus the cap change, e.g., $175,000,000 in the case of bank 1. In computing the remaining cap space available for bank 1, the allocated amount of $2,704,876 is subtracted from this new cap of $175,000,000, resulting in $172,295,123,54 of remaining cap space for bank 1.

This same operation is performed for each of the bank stratification ranges to determine the total new assets in that respective stratification range to be allocated. Thus, it is possible to forecast the ability of the program to take in additional deposits, and/or the changes (banks caps, number of banks in the program, limit per client account in each program bank, to name a few) needed in order to take in additional deposits at a certain level.

Note that in embodiments, there may be a single source self clearing entity such as a broker-dealer. In embodiments, that single source self clearing entity may be affiliated with one or more depository institutions. In embodiments, that single source self clearing entity may be aggregating funds from multiple source entities, with one or more of these source entities being affiliated with one or more banks. The single self-clearing entity, and/or these source entities may require that their client funds be allocated first to their affiliated one or more banks, with an allocation to each of these one or more banks up to some limit, e.g., the FDIC insurance limit per account, before allocating excess funds to non-affiliated banks participating in the program. In embodiments, a waterfall approach may be used, with a particular order to allocate to each of the affiliated banks, up to the designated limit, e.g., the FDIC limit per account, and/or up to some total deposit cap associated with the respective bank, before allocating to the next affiliated bank, and then to non-affiliated banks. In embodiments, instead of a waterfall, there may be an allocation requirement that all of the affiliated banks of a group of the affiliated banks receive equal allocations until the FDIC limit per account is reached, and/or up until some total deposit cap associated with the respective bank is reached. In embodiments, the particular order may be based on a designated priority level, and/or may be based on an interest rate offered by the respective affiliated or non-affiliated banks, e.g., with a priority given to depository institutions offering higher interest rates.

In embodiments, the foregoing examples directed to an allocation may be applied also where no affiliated banks are involved. For example, a waterfall priority order may be used until the FDIC limit per account, and/or up to some total deposit cap associated with the respective bank is reached. In embodiments, the allocation be equally made to a priority group of banks, up to a limit, before allocating to non-priority or lower priority groups of banks. In embodiments, the particular order of allocation may be based on an interest rate offered by the respective non-affiliated banks.

Embodiments within the scope of the present invention include program products comprising machine-readable media for carrying or having machine-executable instructions or data structures stored thereon, but do not include signals propagating on a carrier wave. Such machine-readable media may be any available storage media which may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other storage medium which may be used to store desired program code in the form of machine-executable instructions or data structures and which may be accessed by a general purpose or special purpose computer or other machine with a processor. Combinations of the above are also included within the scope of machine-readable media. Machine-executable instructions comprise, for example, instructions and data which cause a general purpose computer, special purpose computer, or special purpose processing machine to perform a certain function or group of functions. Note that the machine-executable instructions/programming code may comprise algorithms embedded in Excel or other spreadsheets.

Embodiments of the invention have been described in the general context of method steps which may be implemented in embodiments by a program product including machine-executable instructions, such as program code, for example in the form of program modules executed by machines in networked environments. Generally, program modules include routines, programs, objects, components, data structures, etc., that perform particular tasks or implement particular data types. Multi-threaded applications may be used, for example, based on Java or C++. Machine-executable instructions, associated data structures, and program modules represent examples of program code for executing steps of the methods disclosed herein. The particular sequence of such executable instructions or associated data structures represent examples of corresponding acts for implementing the functions described in such steps. The machine-executable instructions/programming code may comprise algorithms embedded in Excel or other spreadsheets.

Embodiments of the present invention may be practiced with one or multiple computers in a networked environment using logical connections to one or more remote computers (including mobile devices) having processors. Logical connections may include a local area network (LAN) and a wide area network (WAN) that are presented here by way of example and not limitation. Such networked environments are commonplace in office-wide or enterprise-wide computer networks, and include intranets and the Internet, and may use a wide variety of different communication protocols. Those skilled in the art will appreciate that such network computing environments will typically encompass many types of computer system configurations, including personal computers, hand-held devices, multi-processor systems, microprocessor-based or programmable consumer electronics, network PCs, minicomputers, mainframe computers, and the like. Embodiments of the invention may also be practiced in distributed computing environments where tasks are performed by local and remote processing devices that are linked (either by hardwired links, wireless links, or by a combination of hardwired and wireless links) through a communications network. In a distributed computing environment, program modules may be located in both local and remote memory storage devices.

It should be noted that although the flow charts provided herein show a specific order of method steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with programming techniques with rule based logic and other logic to accomplish the various database searching steps, correlation steps, comparison steps and decision steps. It should also be noted that the word "component" as used herein and in the claims is intended to encompass implementations using one or more lines of software code, and/or hardware implementations. It should also be noted that the phrase "a plurality" is intended to mean more than one, and is not intended to refer to any previous recitation of the word "plurality," unless preceded by the word "the."

All components, modes of communication, and/or processes described heretofore are interchangeable and combinable with similar components, modes of communication, and/or processes disclosed elsewhere in the specification, unless an express indication is made to the contrary. It is intended that any structure or step of an embodiment disclosed herein may be combined with other structure and or method embodiments to form further embodiments with this added element or step While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

I claim:

1. An allocation modeling method in a depository program with a government backed insurance limit, comprising:

accessing, using one or more computers, one or more electronic databases, stored on one or more computer-readable media, comprising:

(i) aggregated account information for a plurality of government backed-insured and interest-bearing aggregated deposit accounts held in a plurality of depository institutions in a program, wherein funds from a plurality client accounts are held in the aggregated deposit accounts in the depository institutions in the program, the aggregated account information for a respective one of the aggregated deposit accounts comprising a balance of funds held in the respective aggregated deposit account;

(ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account;

(iii) depository institution information for respective of the depository institutions in the program, the depository information for a respective one of the depository institutions comprising a capacity cap for funds held therein from the program, and for each respective one of a plurality of depository institutions participating in the program performing the steps:

obtaining, using the one or more computers, for a high stratification a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions;

obtaining, using the one or more computers, for a second stratification a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range;

obtaining, using the one or more computers, for a lowest stratification a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range has a lower upper limit than the second range;

calculating or having calculated, using the one or more computers, for each of the respective depository institutions, a respective total balance in the program, based at least in part on the total high stratification balance, the total second stratification balance, and the total lowest stratification balance, held in the respective depository institution;

calculating or having calculated, using the one or more computers, a respective excess capacity for each of the respective depository institutions based at least in part on a difference between the capacity cap for the respective depository institution and the total balance for the respective depository institution; and modifying, based at least in part on the respective excess capacities of the respective depository institutions, one or more of parameters selected from the group of a number of client accounts, additional client account funds, a total number of the depository institutions participating in the program, and the capacity caps for one or more of the depository institutions.

2. The method as defined in claim 1, further comprising:

allocating, using the one or more computers, funds of each of the high stratification client accounts, the second stratification client accounts and the lowest stratification client accounts across one or more of the depository institutions to obtain government backed insurance for the funds;

summing for each of the depository institutions, using the one or more computers, the funds of the high stratification client accounts allocated to the respective depository institution, to obtain the total high stratification balance for the respective depository institution;

summing for each of the depository institutions, using the one or more computers, the funds of the second stratification client accounts allocated to the respective depository institution, to obtain the total second stratification balance for the respective depository institution; and summing for each of the depository institutions, using the one or more computers, the funds of the lowest stratification client accounts allocated to the respective depository institution, to obtain the total lowest stratification balance for the respective depository institution.

3. The method as defined in claim 1, may further comprising:

determining, using the one or more computers, a current respective percentage of the high stratification client accounts, a current respective percentage of the second stratification client accounts, and a current respective percentage of the lowest stratification client accounts, relative to a total number of client accounts managed by the program, and determining an average balance of client accounts for the high stratification client accounts, an average balance of client accounts for the second stratification client accounts, and an average balance of client accounts for the lowest stratification client accounts; and modifying, using the one or more computers, one or more of the respective percentage and/or the average balance of client accounts in one or more of the stratifications to determine a need to change capacity caps for one or more of the depository institutions, and/or a need to change a number of depository institutions in the program, and/or a government backed insurance limit for the program, so that a change in the percentage of the client accounts in one or more of the stratifications and/ or a change in the average balance of client accounts in one or more of the stratifications will receive government-backed insurance.

4. The method as defined in claim 1, may further comprising:
determining, using the one or more computers, a current respective percentage of the high stratification client accounts, a current respective percentage of the second stratification client accounts, and a current respective percentage of the lowest stratification client accounts, relative to a total number of client accounts in the program;
determining an average balance of client accounts for the high stratification client accounts, an average balance of client accounts for the second stratification client accounts, and an average balance of client accounts for the lowest stratification client accounts; and
calculating a projected new total balance of funds managed by the program for a given number of new client accounts to be added, based at least in part on the given number of new client accounts, the current number of client accounts, the percentage of the high stratification client accounts and the average balance for the high stratification client accounts, the percentage of the second stratification client accounts and the average balance for the second stratification client accounts, and the percentage of the lowest stratification client accounts and the average balance for the lowest stratification client accounts.

5. The method as defined in claim 4, further comprising:
modifying one of the current respective percentages of the client accounts in the stratifications or the average balance of the client accounts in one or more of the stratifications; and
computing the other of the one or more of the stratifications or the average balance of client accounts in the respective stratifications using algorithms embedded in a first spreadsheet; and
computing the excess capacity for respective ones of the depository institutions using algorithms embedded in a second spreadsheet.

6. The method as defined in claim 1, comprising:
revising one or more selected from the group of capacity cap, insurance limit for the program, and number of depository institutions participating in the program, based at least in part on the determining step; and
calculating an allocation of funds, using the one or more computers, among the government backed insured, interest bearing aggregated deposit accounts of the depository institutions, based at least in part on the capacity cap, insurance limit for the program, and number of depository institutions participating in the program.

7. The method as defined in claim 6, comprising:
allocating, using the one or more computers, amounts of funds from multiple of the client accounts among multiple of the recipient depository institutions, so that a respective balance of funds allocated to each of the aggregated deposit accounts of the depository institutions substantially matches a sum of the respective balances of funds from the multiple of the respective client accounts allocated to this respective aggregated deposit account; and
updating, using the one or more computers, one or more of electronic databases to update the respective balances of client account funds held in one or more of the recipient depository institutions in one or more aggregated deposit accounts therein based on the allocations.

8. The method as defined in claim 6, comprising:
generating and making accessible, using the one or more computers, transfer data based at least in part on the allocations.

9. The method as defined in claim 6, comprising:
generating data for a table, using the one or more computers, that lists for each of a plurality of the stratifications, an upper limit for the respective stratification, a lower limit for the respective stratification, a number of clients in the respective stratification, an average total balance of funds in the stratification, a percentage of a total balance managed by the program that is represented by the average total balance of funds in the respective stratification; and
generating and providing or making accessible display data, using the one or more computers, based at least in part on the data in the table.

10. The method as defined in claim 6, comprising:
generating data for a table, using the one or more computers, that lists for each of the depository institutions participating in the program, the capacity cap, a measure derived from the total high stratification balance, a measure derived from the total second stratification balance, a measure derived from the total lowest stratification balance, a measure of the respective total balance in the program for the respective depository institution, and the excess capacity for the respective depository institution; and
generating and providing or making accessible display data, using the one or more computers, based at least in part on the data in the table.

11. The method as defined in claim 10, wherein the measure is an average.

12. The method as defined in claim 10, wherein the measure is the current total stratification balance for the respective stratification.

13. The method as defined in claim 9, further comprising the wherein machine-executable instructions/programming code may comprise algorithms embedded in Excel or other spreadsheets.

14. The method as defined in claim 1, wherein each of the stratifications consists of a multiple of the FDIC insurance limit.

15. The method as defined in claim 14, wherein there are a plurality of source entities providing clients funds for allocation to depository institutions participating in the program.

16. The method as defined in claim 14, there is a single source entity providing clients funds for allocation to depository institutions participating in the program.

17. The method as defined in claim 14, there is a single self-clearing entity providing clients funds from multiple source entities for allocation to depository institutions participating in the program.

18. The method as defined in claim 17, wherein one of the multiple source entities is affiliated with one or more of the depository institutions, and further comprising allocating finds of client accounts of that one source entity first to the one or more of the depository institutions with which it is affiliated.

19. A system, comprising:
  one or more computers configured to perform the following steps:
    accessing, using one or more computers, one or more electronic databases, stored on one or more computer-readable media, comprising:
      (i) aggregated account information for a plurality of government backed-insured and interest-bearing aggregated deposit accounts held in a plurality of depository institutions in a program, wherein funds from a plurality client accounts are held in the aggregated deposit accounts in the depository institutions in the program, the aggregated account information for a respective one of the aggregated deposit accounts comprising a balance of funds held in the respective aggregated deposit account;
      (ii) client account information for each of the respective client accounts, wherein the client account represents funds of the respective client held in the one or more aggregated deposit accounts holding funds of the respective client, the client account information comprising a respective balance of funds from the respective client account held in each of the one or more insured and interest-bearing aggregated deposit accounts holding funds of the respective client account;
      (iii) depository institution information for respective of the depository institutions in the program, the depository information for a respective one of the depository institutions comprising a capacity cap for funds held therein from the program, and
  for each respective one of a plurality of depository institutions participating in the program, performing the steps:
    obtaining, using the one or more computers, for a high stratification a current or an adjusted total high stratification balance in the respective depository institution, comprising a total of balances held or that may be held in the respective depository institution of high stratification client accounts, each of the high stratification client accounts having a total balance managed by the program within a highest range of balances that may be fully insured with government backed insurance through an allocation across government backed-insured interest-bearing aggregated deposit accounts in a first number of depository institutions;
    obtaining, using the one or more computers, for a second stratification a current or an adjusted total second stratification balance in the respective depository institution, comprising a total of balances held or that may be held in the respective depository institution of second stratification client accounts, each of the second stratification client accounts having a total balance managed by the program within a second range of balances that may be fully insured with government backed insurance through an allocation across government backed-insured interest-bearing aggregated deposit accounts in a second number of depository institutions, wherein the second range has a lower upper limit than the highest range;
    obtaining, using the one or more computers, for a lowest stratification a current or an adjusted total lowest stratification balance in the respective depository institution, comprising a total of balances held or that may be held in the respective depository institution of lowest stratification client accounts, each of the lowest stratification client accounts having a total balance managed by the program within a third range of balances that may be fully insured with government backed insurance through an allocation across government backed-insured interest-bearing aggregated deposit accounts in a third number of depository institutions, wherein the lowest range has a lower upper limit than the second range;
    calculating or having calculated, using the one or more computers, for each of the respective depository institutions, a respective total balance in the program, based at least in part on the total high stratification balance, the total second stratification balance, and the total lowest stratification balance, held in the respective depository institution;
    calculating or having calculated, using the one or more computers, a respective excess capacity for each of the respective depository institutions based at least in part on a difference between the capacity cap for the respective depository institution and the total balance for the respective depository institution; and
  modifying, based at least in part on the respective excess capacities of the respective depository institutions, one or more of parameters selected from the group of a number of client accounts, additional client account funds, a total number of the depository institutions participating in the program, and the capacity caps for one or more of the depository institutions.

* * * * *